(12) United States Patent
De Witte et al.

(10) Patent No.: US 12,296,621 B2
(45) Date of Patent: May 13, 2025

(54) SYSTEMS AND METHODS FOR MONITORING WHEEL ASSEMBLIES

(71) Applicant: CAMSO INC., Magog (CA)

(72) Inventors: Tim De Witte, Brno (CZ); Salvatore Messina, Magog (CA); Loic Meier, St-Lazare (CA)

(73) Assignee: Camso Inc., Magog (CA)

( * ) Notice: Subject to any disclaimer, the term of this patent is extended or adjusted under 35 U.S.C. 154(b) by 0 days.

(21) Appl. No.: 17/782,823

(22) PCT Filed: Dec. 7, 2020

(86) PCT No.: PCT/CA2020/051687
§ 371 (c)(1),
(2) Date: Jun. 6, 2022

(87) PCT Pub. No.: WO2021/108930
PCT Pub. Date: Jun. 10, 2021

(65) Prior Publication Data
US 2023/0001749 A1 Jan. 5, 2023

Related U.S. Application Data

(60) Provisional application No. 62/944,536, filed on Dec. 6, 2019.

(51) Int. Cl.
*B60C 11/24* (2006.01)

(52) U.S. Cl.
CPC .......... *B60C 11/246* (2013.01); *B60C 11/243* (2013.01); *B60C 2200/06* (2013.01)

(58) Field of Classification Search
CPC . B60C 11/246; B60C 11/243; B60C 2200/06; B60C 23/0493; B60C 23/061;
(Continued)

(56) References Cited

U.S. PATENT DOCUMENTS

| 6,327,904 B1 | 12/2001 | Oldenettel |
| 10,017,017 B2* | 7/2018 | Gyanani ................ G01K 1/024 |

(Continued)

FOREIGN PATENT DOCUMENTS

| DE | 102011052808 A1 | 1/2013 |
| DE | 102016221267 A1 | 5/2018 |

(Continued)

OTHER PUBLICATIONS

Extended European Search Report dated Jan. 2, 2024.

*Primary Examiner* — Daryl C Pope
(74) *Attorney, Agent, or Firm* — Hahn Loeser & Parks LLP

(57) ABSTRACT

A wheel assembly of a vehicle (e.g., a forklift or another material-handling vehicle) is monitored to obtain information regarding the vehicle, including information regarding the wheel assembly, which may be indicative of how the vehicle including the wheel assembly is used (e.g., a duty cycle of the vehicle and/or the wheel assembly), a state (e.g., a degree of wear) of the wheel assembly, loading and shocks on the wheel assembly, and/or a state of an environment (e.g., environmental temperature, a profile, compliance, or other condition of an underlying surface beneath the wheel assembly), and which may be, for example, conveyed to a user (e.g., an operator of the vehicle), transmitted to a remote party (e.g., a provider), and/or used to control the vehicle (e.g., a speed of the vehicle). This may improve use, maintenance, safety and/or other aspects of the vehicle, including the wheel assembly.

14 Claims, 30 Drawing Sheets

(58) Field of Classification Search
CPC ........... B60C 23/20; B60C 7/00; B60C 7/102; B60C 23/0408; B60C 23/0483; B60C 23/064; B60C 2019/004; B60C 7/24; B60C 23/0479; B60C 11/0311; B60C 2007/005; B60C 2011/0388; B60C 2200/02; B60K 2370/152; B60K 2370/195; B60K 2370/566; B60K 35/00; G01P 15/18; B66F 17/003; G01M 17/013; G01M 17/02; H04W 4/38
See application file for complete search history.

(56) References Cited

U.S. PATENT DOCUMENTS

| | | |
|---|---|---|
| 2003/0187555 A1 | 10/2003 | Lutz et al. |
| 2004/0162680 A1 | 8/2004 | Shiraishi |
| 2005/0235744 A1 | 10/2005 | Ogawa |
| 2015/0053487 A1 | 2/2015 | Cash |
| 2015/0336435 A1 | 11/2015 | Laird et al. |
| 2016/0375733 A1 | 12/2016 | Lesesky et al. |
| 2017/0282657 A1 | 10/2017 | Gyanani |
| 2019/0154491 A1 | 5/2019 | Bunner et al. |
| 2019/0187027 A1* | 6/2019 | Lin .................. B60C 23/0408 |
| 2019/0227205 A1 | 7/2019 | Gubela |
| 2022/0055699 A1 | 2/2022 | Desmarais et al. |

FOREIGN PATENT DOCUMENTS

| | | |
|---|---|---|
| DE | 102017221142 A1 | 5/2019 |
| EP | 2746061 A1 | 6/2014 |
| JP | 2003252191 A | 9/2003 |
| JP | 2004132864 A | 4/2004 |
| JP | 2005335589 A | 2/2005 |
| JP | 2006335233 A | 12/2006 |
| JP | 2009161053 A | 7/2009 |
| JP | 2009535699 A | 10/2009 |
| JP | 2010254240 A | 11/2010 |
| JP | 2014109566 A | 6/2014 |
| JP | 2015230255 A | 12/2015 |
| JP | 2017531825 A | 10/2017 |
| JP | 2018505088 A | 2/2018 |
| JP | 2018083458 A | 5/2018 |
| WO | 2007127220 A3 | 11/2007 |
| WO | 2009070065 A1 | 6/2009 |
| WO | 2016053933 A1 | 4/2016 |
| WO | 2016105687 A1 | 6/2016 |
| WO | 2019227205 | 12/2019 |

* cited by examiner

SYSTEMS AND METHODS FOR MONITORING WHEEL ASSEMBLIES

CROSS-REFERENCE TO RELATED APPLICATIONS

This application is a National Phase Entry of international PCT patent application no. PCT/CA2020/051687 filed on Dec. 7, 2020, which claims the benefit of U.S. Provisional Patent Application No. 62/944,536 filed Dec. 6, 2019. The contents of the above-noted applications are incorporated by reference herein.

FIELD

This disclosure relates generally to wheel assemblies for vehicles, such as material-handling vehicles (e.g., forklifts) or other vehicles, and, more particularly, to systems and methods for monitoring such wheel assemblies, including those with non-pneumatic tires.

BACKGROUND

Wheel assemblies for vehicles may comprise pneumatic tires or non-pneumatic tires, depending on uses of these vehicles.

Non-pneumatic tires, which can sometimes also be referred to as "solid" or "resilient" tires, are not supported by gas (e.g., air) pressure. This may provide certain benefits, such as allowing them to be flat-proof.

Tires of vehicles can be selected, perform, and/or wear differently depending on how, where, when, etc. the vehicles are used. For example, material-handling vehicles such as forklifts may be used in different ways, over different periods of time, at different sites, which may be indoor or outdoor. This may sometimes cause issues for work or other activities done with these vehicles (e.g., due to suboptimal tire selection, replacement or other maintenance, etc.).

For these and other reasons, there is a need to improve wheel assemblies comprising tires, including non-pneumatic tires.

SUMMARY

According to various aspects, this disclosure relates to monitoring a wheel assembly of a vehicle (e.g., a forklift or another material-handling vehicle) to obtain information regarding the vehicle, including information regarding the wheel assembly, which may be indicative of how the vehicle including the wheel assembly is used (e.g., a duty cycle of the vehicle and/or the wheel assembly), a state (e.g., a degree of wear) of the wheel assembly, loading and shocks on the wheel assembly, and/or a state of an environment (e.g., environmental temperature, a profile, compliance, or other condition of an underlying surface beneath the wheel assembly), and which may be, for example, conveyed to a user (e.g., an operator of the vehicle), transmitted to a remote party (e.g., a provider such as a manufacturer or distributor of the wheel assembly and/or of the vehicle), and/or used to control the vehicle (e.g., a speed of the vehicle). This may improve use, maintenance, safety and/or other aspects of the vehicle, including the wheel assembly For example, in accordance with one aspect, this disclosure relates to a wheel assembly for a vehicle. The wheel assembly comprises a wheel configured to connect the wheel assembly to an axle of the vehicle, a tire disposed around the wheel and a sensor mounted to the wheel.

In accordance with another aspect, the disclosure relates to a system for use in respect of a vehicle. The vehicle comprises a wheel assembly comprising a wheel configured to connect the wheel assembly to an axle of the vehicle and a non-pneumatic tire disposed around the wheel. The wheel is configured to connect the wheel assembly to an axle of the vehicle. The system comprises a sensor configured to be mounted to the wheel and a processing apparatus external to the wheel assembly and configured to receive information from the sensor.

In accordance with another aspect, the disclosure relates to a system for use in respect of a vehicle. The vehicle comprises a wheel assembly comprising a wheel configured to connect the wheel assembly to an axle of the vehicle and a non-pneumatic tire disposed around the wheel. The wheel is configured to connect the wheel assembly to an axle of the vehicle. The system comprises a first sensor configured to be mounted to the wheel, a second sensor configured to be mounted to the vehicle and spaced from the first sensor and a processing apparatus external to the wheel assembly and configured to wirelessly receive information from the first sensor and information from the second sensor.

In accordance with another aspect, the disclosure relates to a sensor for a wheel assembly of a vehicle. The wheel assembly comprises a wheel configured to connect the wheel assembly to an axle of the vehicle and a non-pneumatic tire disposed around the wheel. The sensor comprises a base configured to be mounted to the wheel and a sensing unit configured to transmit information regarding the wheel assembly to a processing apparatus external to the wheel assembly.

In accordance with another aspect, the disclosure relates to a wheel assembly for a vehicle. The wheel assembly comprises a wheel configured to connect the wheel assembly to an axle of the vehicle and a non-pneumatic tire disposed around the wheel. The wheel assembly also comprises a sensor mounted to the wheel and configured to transmit first information to a processing apparatus external to the wheel assembly. The wheel assembly also comprises a tag mounted to the non-pneumatic tire and configured to wirelessly transmit second information to the processing apparatus.

In accordance with another aspect, the disclosure relates to a wheel assembly for a vehicle. The wheel assembly comprises a wheel configured to connect the wheel assembly to an axle of the vehicle, a non-pneumatic tire disposed around the wheel and a sensor configured to transmit information to a processing apparatus external to the wheel assembly. The processing apparatus is configured to obtain information indicative of a duty cycle of at least one of the wheel assembly and the vehicle based on the information transmitted by the sensor.

In accordance with another aspect, the disclosure relates to a system for use in respect of a vehicle, the vehicle comprising a wheel assembly comprising a wheel and a non-pneumatic tire disposed around the wheel. The wheel is configured to connect the wheel assembly to an axle of the vehicle. The system comprise a sensor configured to be mounted to the wheel assembly and a processing apparatus external to the wheel assembly and configured to obtain information indicative of a duty cycle of at least one of the wheel assembly and the vehicle based on output of the sensor.

In accordance with another aspect, the disclosure relates to a wheel assembly for a vehicle. The wheel assembly comprises a wheel configured to connect the wheel assembly to an axle of the vehicle, a non-pneumatic tire disposed around the wheel and a sensor configured to transmit information to a processing apparatus external to the wheel assembly. The processing apparatus is configured to obtain information indicative of a degree of wear of the non-pneumatic tire based on the information transmitted by the sensor.

In accordance with another aspect, the disclosure relates to a system for use in respect of a vehicle, the vehicle comprising a wheel assembly comprising a wheel and a non-pneumatic tire disposed around the wheel. The wheel is configured to connect the wheel assembly to an axle of the vehicle. The system comprises a sensor configured to be mounted to the wheel assembly and a processing apparatus external to the wheel assembly and configured to obtain information indicative of a degree of wear of the non-pneumatic tire based on output of the sensor.

In accordance with another aspect, the disclosure relates to a wheel assembly for a vehicle. The wheel assembly comprises a wheel configured to connect the wheel assembly to an axle of the vehicle, a non-pneumatic tire disposed around the wheel and a sensor configured to sense pressure between the wheel and the non-pneumatic tire.

In accordance with another aspect, the disclosure relates to a wheel assembly for a vehicle. The wheel assembly comprises a wheel configured to connect the wheel assembly to an axle of the vehicle, a tire disposed around the wheel and a sensor mounted to the wheel.

In accordance with another aspect, the disclosure relates to a system for use in respect of a vehicle. The vehicle comprises a wheel assembly comprising a wheel and a tire disposed around the wheel. The wheel is configured to connect the wheel assembly to an axle of the vehicle. The system comprises a sensor configured to be mounted to the wheel and a processing apparatus external to the wheel assembly and configured to receive information from the sensor.

In accordance with another aspect, the disclosure relates to a system for use in respect of a vehicle. The vehicle comprises a wheel assembly comprising a wheel and a tire disposed around the wheel. The wheel is configured to connect the wheel assembly to an axle of the vehicle. The system comprises a first sensor configured to be mounted to the wheel, a second sensor configured to be mounted to the vehicle and spaced from the first sensor and a processing apparatus external to the wheel assembly and configured to wirelessly receive information from the first sensor and information from the second sensor.

In accordance with another aspect, the disclosure relates to a sensor for a wheel assembly of a vehicle. The wheel assembly comprising a wheel configured to connect the wheel assembly to an axle of the vehicle and a tire disposed around the wheel. the sensor comprises a base configured to be mounted to the wheel and a sensing unit configured to transmit information regarding the wheel assembly to a processing apparatus external to the wheel assembly.

In accordance with another aspect, the disclosure relates to a wheel assembly for a vehicle. The wheel assembly comprises a wheel configured to connect the wheel assembly to an axle of the vehicle, a tire disposed around the wheel, a sensor mounted to the wheel and configured to transmit first information to a processing apparatus external to the wheel assembly and a tag mounted to the tire and configured to wirelessly transmit second information to the processing apparatus.

In accordance with another aspect, the disclosure relates to a wheel assembly for a vehicle. The wheel assembly comprises a wheel configured to connect the wheel assembly to an axle of the vehicle, a tire disposed around the wheel and a sensor configured to transmit information to a processing apparatus external to the wheel assembly. The processing apparatus is configured to obtain information indicative of a duty cycle of at least one of the wheel assembly and the vehicle based on the information transmitted by the sensor.

In accordance with another aspect, the disclosure relates to a system for use in respect of a vehicle. The vehicle comprises a wheel assembly comprising a wheel and a tire disposed around the wheel. The wheel is configured to connect the wheel assembly to an axle of the vehicle. The system comprises a sensor configured to be mounted to the wheel assembly and a processing apparatus external to the wheel assembly and configured to obtain information indicative of a duty cycle of at least one of the wheel assembly and the vehicle based on output of the sensor.

In accordance with another aspect, the disclosure relates to a wheel assembly for a vehicle. The wheel assembly comprises a wheel configured to connect the wheel assembly to an axle of the vehicle, a tire disposed around the wheel and a sensor configured to transmit information to a processing apparatus external to the wheel assembly. The processing apparatus is configured to obtain information indicative of a degree of wear of the tire based on the information transmitted by the sensor.

In accordance with another aspect, the disclosure relates to a system for use in respect of a vehicle. The vehicle comprising a wheel assembly comprising a wheel and a tire disposed around the wheel. The wheel is configured to connect the wheel assembly to an axle of the vehicle. The system comprises a sensor configured to be mounted to the wheel assembly and a processing apparatus external to the wheel assembly and configured to obtain information indicative of a degree of wear of the tire based on output of the sensor.

In accordance with another aspect, the disclosure relates to a wheel assembly for a vehicle. The wheel assembly comprises a wheel configured to connect the wheel assembly to an axle of the vehicle, a tire disposed around the wheel and a sensor configured to sense pressure between the wheel and the tire.

In accordance with another aspect, the disclosure relates to a system for use in respect of a vehicle. The vehicle comprises a plurality of wheel assemblies, each wheel assembly of the vehicle comprising a wheel configured to connect the wheel assembly to an axle of the vehicle and a tire disposed around the wheel. The system comprises a sensor configured to be mounted to the vehicle and spaced from every wheel assembly of the vehicle and a processing apparatus configured to obtain information indicative of a degree of wear of the tire of a given one of the plurality of wheel assemblies based on output of the sensor.

In accordance with another aspect, the disclosure relates to a system for use in respect of a vehicle. The vehicle comprises a wheel assembly, the wheel assembly comprising a wheel configured to connect the wheel assembly to an axle of the vehicle and a tire disposed around the wheel. The system comprises a first sensor configured to be mounted to the wheel assembly, a second sensor configured to be mounted to the vehicle and spaced from the wheel assembly and a processing apparatus external to the wheel assembly. The processing apparatus is configured to obtain information indicative of a duty cycle of at least one of the wheel assembly and the vehicle based on output of the first sensor and information indicative of a degree of wear of the tire based on output of the second sensor.

In accordance with another aspect, the disclosure relates to a sensor for a vehicle having a wheel assembly. The wheel assembly comprises a wheel configured to connect the wheel assembly to an axle of the vehicle and a tire disposed around the wheel. The sensor comprises a sensing unit configured to transmit information regarding the vehicle to a processing apparatus external to the wheel assembly. The processing apparatus is configured to obtain information indicative of a degree of wear of the tire based on the information regarding the vehicle.

In accordance with another aspect, the disclosure relates to a system for use in respect of a vehicle. The vehicle comprises a plurality of wheel assemblies, each wheel assembly of the vehicle comprising a wheel configured to connect the wheel assembly to an axle of the vehicle and a tire disposed around the wheel. The system comprises a sensor configured to be mounted to the vehicle and spaced from every wheel assembly of the vehicle and configured to obtain vehicle acceleration information. The system also comprises a processing apparatus configured to filter the vehicle acceleration information at a first time interval and identify a zero-speed state based on the filtered vehicle acceleration information.

In accordance with another aspect, the disclosure relates to a system for use in respect of a vehicle. The vehicle comprises a wheel assembly, the wheel assembly comprising a wheel configured to connect the wheel assembly to an axle of the vehicle and a tire disposed around the wheel. The system also comprises a first sensor configured to be mounted to the wheel assembly and configured to obtain wheel assembly acceleration information. The system also comprises a second sensor configured to be mounted to the vehicle and spaced from the wheel assembly and configured to obtain vehicle acceleration information. The system also comprises a processing apparatus external to the wheel assembly. The processing apparatus is configured to derived information indicative of a degree of wear of the tire based on a ratio of the vehicle acceleration information to the wheel assembly acceleration information.

In accordance with another aspect, the disclosure relates to a system for use in respect of a vehicle. The vehicle comprises a plurality of wheel assemblies, each one of the plurality of wheel assemblies comprising a wheel configured to connect the wheel assembly to an axle of the vehicle and a tire disposed around the wheel. The system comprises a first sensor configured to be mounted to a driving wheel assembly and configured to obtain a first percentile of revolution speed of the driving wheel assembly. The system also comprises a second sensor configured to be mounted to a free-rolling wheel assembly and configured to obtain a first percentile of revolution speed of the free-rolling wheel assembly. The system also comprises a processing apparatus external to the driving wheel assembly and to the free-rolling wheel assembly. The processing apparatus is configured to derive information indicative of a degree of wear of the tire of the free-rolling wheel assembly based on a ratio of the first percentile of revolution speed of the driving wheel assembly to the first percentile of revolution speed of the free-rolling wheel assembly.

In accordance with another aspect, the disclosure relates to a system for use in respect of a vehicle. The vehicle comprises a plurality of wheel assemblies, each wheel assembly of the vehicle comprising a wheel configured to connect the wheel assembly to an axle of the vehicle and a tire disposed around the wheel. The system comprises a sensor configured to be mounted to the vehicle and spaced from every wheel assembly of the vehicle and configured to obtain sensor acceleration information. The system comprises a processing apparatus configured to obtain reference information, compare the sensor acceleration information to the reference information and derive a degree wear of the tire of a given one of the plurality of wheel assemblies based on the comparison.

In accordance with another aspect, the disclosure relates to a system for use in respect of a vehicle. The vehicle comprises at least a front wheel assembly and a rear wheel assembly, each one of the wheel assemblies comprising a wheel configured to connect the wheel assembly to an axle of the vehicle and a tire disposed around the wheel. The system comprises a sensor configured to be mounted to the vehicle and spaced from each one of the wheel assemblies and configured to acquire vehicle speed information. The system comprises a processing apparatus external to each one of the wheel assemblies, the processing apparatus being configured to derive information indicative of a degree of wear of at least one of the front and rear wheel assembly based on a frequency analysis of a subset of the vehicle speed information.

In accordance with another aspect, the disclosure relates to a system for use in respect of a vehicle. The vehicle comprises a wheel assembly, the wheel assembly of the vehicle comprising a wheel configured to connect the wheel assembly to an axle of the vehicle and a tire disposed around the wheel. The system comprises a sensor mounted to the wheel and configured to obtain information indicative of a pressure between the wheel and the tire. The system comprises a processing apparatus configured to derive data representative of a load on the wheel assembly based on the information indicative of the pressure between the wheel and the tire.

In accordance with another aspect, the disclosure relates to a system for use in respect of a vehicle. The vehicle comprising a wheel assembly, the wheel assembly of the vehicle comprising a wheel configured to connect the wheel assembly to an axle of the vehicle and a tire disposed around the wheel. The system comprises a sensor configured to be mounted to the vehicle and spaced from every wheel assembly of the vehicle and configured to obtain vehicle acceleration information. The system also comprises a processing apparatus configured to derive eigenfrequency information based on the vehicle acceleration information and derive data representative of either one of a wear or a load of the wheel assembly based on the derived eigenfrequency information.

In accordance with another aspect, the disclosure relates to a system for use in respect of a vehicle. The vehicle comprises a wheel assembly, the wheel assembly of the vehicle comprising a wheel configured to connect the wheel assembly to an axle of the vehicle and a tire disposed around the wheel. The system comprises a sensor mounted to the wheel and configured to acquire information indicative of a pressure between the wheel and the tire. The system also comprises a processing apparatus configured to derive data representative of a surface on which the wheel assembly rolls based on the information indicative of the pressure between the wheel and the tire.

In accordance with another aspect, the disclosure relates to a system for use in respect of a vehicle. The vehicle comprising a plurality of wheel assemblies, each wheel assembly of the vehicle comprising a wheel configured to connect the wheel assembly to an axle of the vehicle and a tire disposed around the wheel. The system comprises a sensor configured to be mounted to the vehicle and spaced from every wheel assembly of the vehicle and configured to obtain vehicle acceleration information. The system also comprises a processing apparatus configured to derive information indicative of a degree of vibration of the vehicle based on the vehicle acceleration information.

In accordance with another aspect, the disclosure relates to a system for use in respect of a vehicle. The vehicle comprising a plurality of wheel assemblies, each wheel assembly of the vehicle comprising a wheel configured to connect the wheel assembly to an axle of the vehicle and a tire disposed around the wheel. The system comprises a sensor mounted to the wheel, the sensor comprising an IMU and being configured to obtain vehicle acceleration information. The system also comprises a processing apparatus configured to derive a trajectory of the vehicle based on the vehicle acceleration information.

In accordance with another aspect, the disclosure relates to a system for use in respect of a vehicle. The vehicle comprises a plurality of wheel assemblies, each wheel assembly of the vehicle comprising a wheel configured to connect the wheel assembly to an axle of the vehicle and a tire disposed around the wheel. The system comprises a sensor configured to be mounted to the vehicle and spaced from every wheel assembly of the vehicle and configured to obtain vehicle acceleration information. The system also comprises a processing apparatus configured to derive a wear of the wheel assembly based on the vehicle acceleration information obtained during a zero-speed state of the vehicle.

In accordance with another aspect, the disclosure relates to a system for use in respect of a vehicle. The vehicle comprises a wheel assembly, the wheel assembly comprising a wheel configured to connect the wheel assembly to an axle of the vehicle and a tire disposed around the wheel. The system comprises a sensor disposed on the vehicle and spaced from the wheel assembly such that the wheel assembly is sensor-free. The system also comprises a processing apparatus configured to obtain information indicative of a state of the tire based on output of the sensor.

In accordance with another aspect, the disclosure relates to a system for use in respect of a vehicle. The vehicle comprises a wheel assembly, the wheel assembly comprising a wheel configured to connect the wheel assembly to an axle of the vehicle and a tire disposed around the wheel. The system comprises a sensor disposed on the vehicle and spaced from the wheel assembly such that the wheel assembly is sensor-free. The system also comprises a processing apparatus configured to obtain information indicative of a degree of wear of the tire based on output of the sensor.

In accordance with another aspect, the disclosure relates to a system for use in respect of a vehicle. The vehicle comprises a wheel assembly, the wheel assembly comprising a wheel configured to connect the wheel assembly to an axle of the vehicle and a tire disposed around the wheel. The system comprises a sensor disposed on the vehicle and spaced from the wheel assembly such that the wheel assembly is sensor-free. The system also comprises a processing apparatus configured to obtain information indicative of a duty cycle of at least one of the wheel assembly and the vehicle based on output of the sensor.

These and other aspects of this disclosure will now become apparent to those of ordinary skill in the art upon reviewing a description of embodiments that follows in conjunction with accompanying drawings.

BRIEF DESCRIPTION OF THE DRAWINGS

A detailed description of embodiments is provided below, by way of example only, with reference to the accompanying drawings, in which:

FIG. 32b is a plot acceleration=f (acceleration) for the two runs of FIG. 32a;

FIG. 33b is a plot acceleration=f (acceleration) for the two runs of FIG. 33a.

It is to be expressly understood that the description and drawings are only for the purpose of illustrating certain embodiments and are an aid for understanding. They are not intended to be limitative.

DETAILED DESCRIPTION OF EMBODIMENTS

Figure 1:
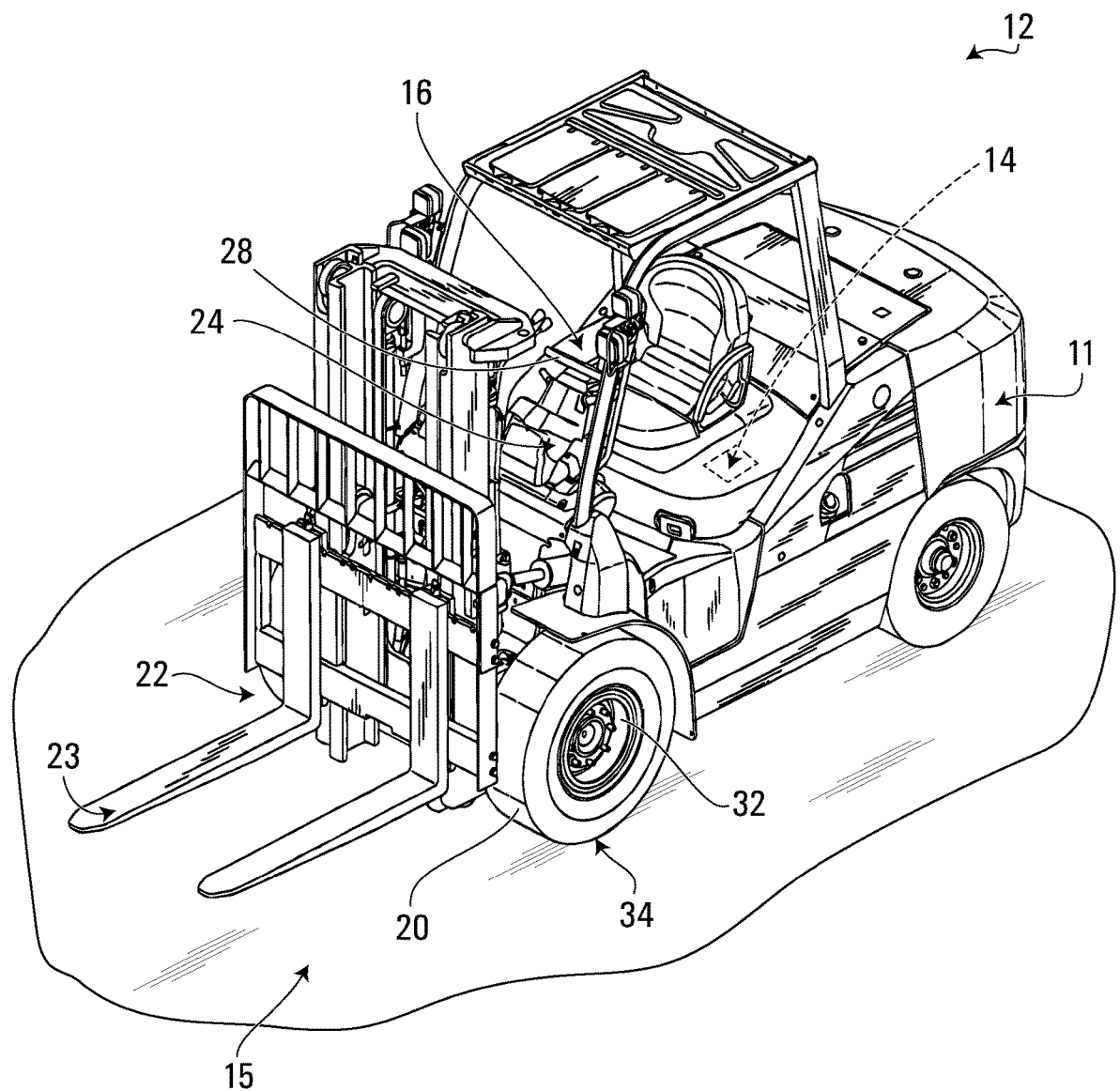
FIG. 1 shows a vehicle comprising wheel assemblies in accordance with an embodiment.
Figure 2:
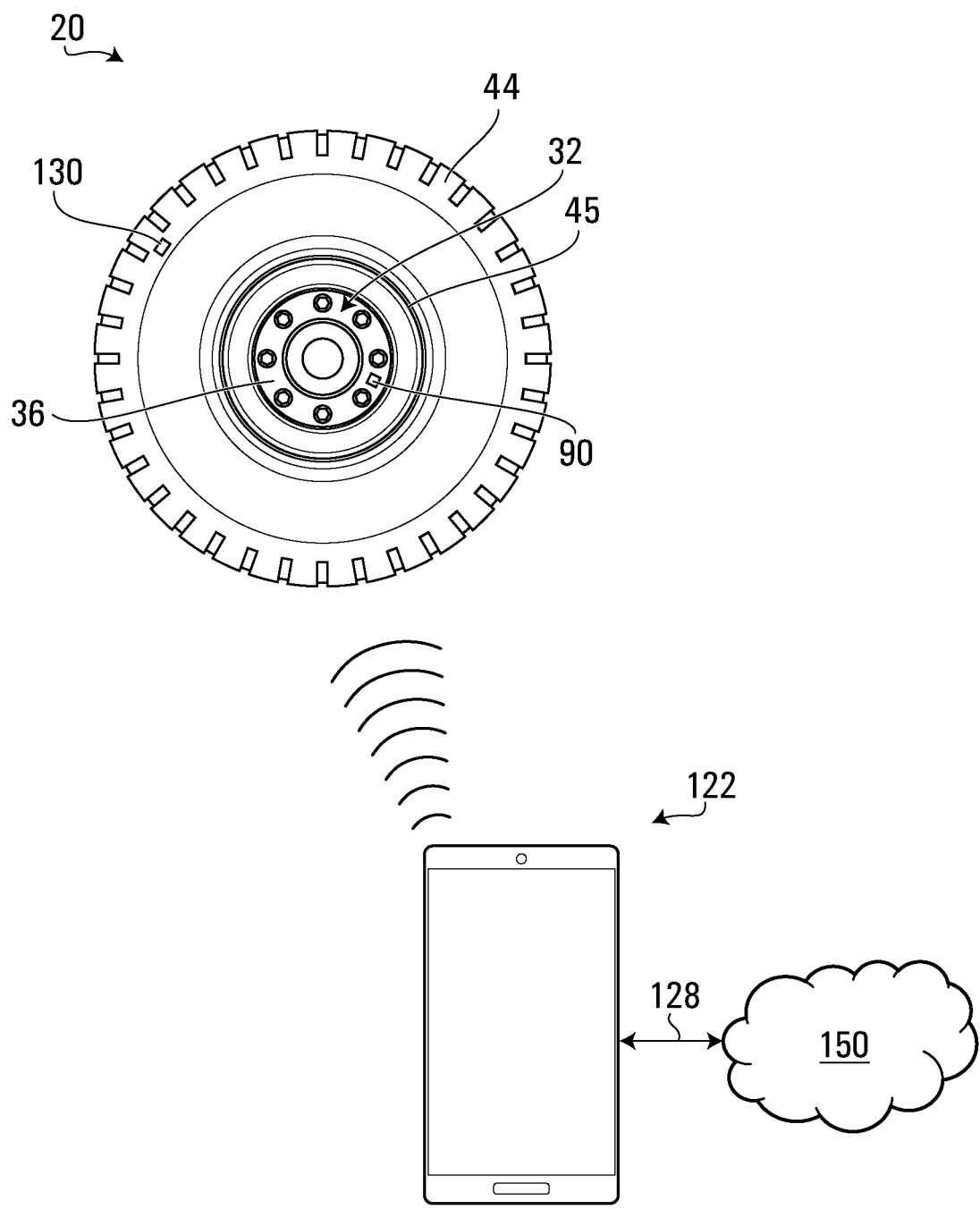
FIG. 2 shows an embodiment of a monitoring system in accordance with an embodiment.
Figure 9:
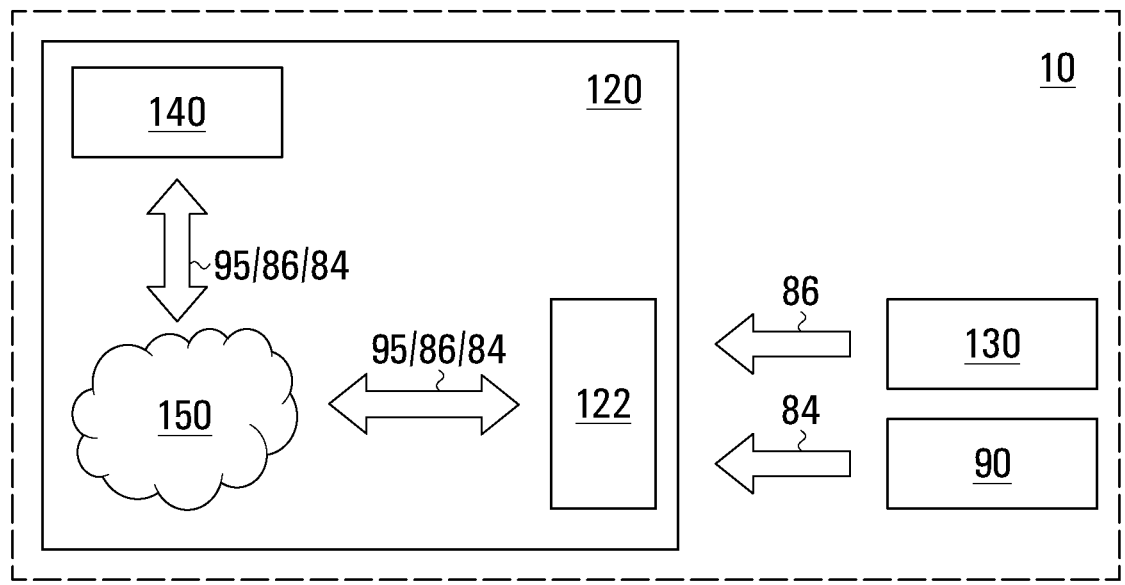
FIG. 9 is a block diagram of the monitoring system comprising a wheel assembly sensor, a tag and a processing apparatus in accordance with an embodiment.

FIGS. 1, 2 and 9 show an embodiment of a monitoring system 10 for a vehicle 12 comprising wheel assemblies 20 and moving on an underlying surface 15 (e.g., a ground or floor). In this embodiment, the vehicle 12 is a material-handling vehicle, which is an industrial vehicle designed to travel to move (e.g., transport) and/or otherwise handle materials (e.g., goods and products), such as during their manufacturing, storage, distribution, consumption, and/or disposal. More particularly, in this embodiment, the material-handling vehicle 12 is a forklift.

As further discussed below, in this embodiment, the monitoring system 10 is configured to monitor the material-handling vehicle 12, including the wheel assemblies 20, to obtain information regarding the vehicle 12, including information regarding the wheel assemblies 20, which may be indicative of how the vehicle 12 including the wheel assemblies 20 is used (e.g., a duty cycle of the vehicle 12 and/or the wheel assemblies 20), a state (e.g., a degree of wear) of the wheel assemblies 20, loading and shocks on the wheel assemblies 20, and/or a state of an environment (e.g., environmental temperature, a profile, compliance, or other condition of the underlying surface 15 beneath the wheel assemblies 20), and which may be, for example, conveyed to a user (e.g., an operator of the vehicle 12), transmitted to a remote party (e.g., a provider such as a manufacturer or distributor of the wheel assemblies 20 and/or of the vehicle 12), and/or used to control the vehicle 12 (e.g., a speed of the vehicle 12). This may improve use, maintenance, safety and/or other aspects of the vehicle 12, including the wheel assemblies 20.

In this embodiment, the material-handling vehicle 12 comprises a frame 11, a powertrain 14, a steering system 16, the wheel assemblies 20, a work implement 22, and a user interface 24, which enable the user of the vehicle 12 to control the vehicle 12 on the underlying surface 15, including to steer the vehicle 12 and perform work using the work implement 22. The vehicle 12 has a longitudinal direction, a widthwise direction, and a heightwise direction.

The powertrain 14 is configured for generating motive power and transmitting motive power to respective ones of the wheels 20 to propel the vehicle 12 on the underlying surface 15. To that end, the powertrain 14 comprises a prime mover which is a source of motive power that comprises one or more motors. For example, in this embodiment, the prime mover comprises an electric motor. The vehicle 12 is thus an electric vehicle. In other embodiments, the prime mover may comprise another type of motor (e.g., an internal combustion engine) or a combination of different types of motor (e.g., an internal combustion engine and an electric motor). The prime mover is in a driving relationship with respective ones of the wheel assemblies 20. That is, the powertrain 14 transmits motive power generated by the prime mover to respective ones of the wheel assemblies 20 (e.g., via a transmission and/or a differential) in order to drive (i.e., impart motion to) them.

The steering system 16 is configured to enable the user to steer the vehicle 12 on the underlying surface 15. To that end, the steering system 16 comprises a steering device 28 that is operable by the user to direct the vehicle 12 along a desired course on the underlying surface 15. In this embodiment, the steering device 28 comprises a steering wheel. The steering device 28 may any other steering component that can be operated by the user to steer the vehicle 12 in other embodiments. The steering system 16 responds to the user interacting with the steering device 28 by turning respective ones of the wheel assemblies 20 to change their orientation relative to the frame 12 of the vehicle 12 in order to cause the vehicle 12 to move in a desired direction, however in other embodiments the vehicle 12 may be an autonomous vehicle. In this example, rear ones of the wheel assemblies 20 are turnable in response to input of the user at the steering device 28 to change their orientation relative to the frame 12 of the vehicle 12 in order to steer the vehicle 12. More particularly, in this example, each of the rear ones of the wheel assemblies 20 is pivotable about a steering axis of the vehicle 12 in response to input of the user at the steering device 28 in order to steer the vehicle 12 on the underlying surface 15. Front ones of the wheel assemblies 20 are not turned relative to the frame 12 of the vehicle 12 by the steering system 16.

The work implement 22 is used to perform work. In this embodiment, the work implement 22 comprises a fork 23 that can be raised and lowered to lift or lower objects to be transported or otherwise handled. In other embodiments, for other types of vehicles, the work implement 22 may comprise a platform, an arm, a grapple, or any other type of implement.

The user interface 24 allows the user to interact with the material-handling vehicle 12. More particularly, the user interface 24 comprises an accelerator, a brake control, and the steering device 28 that are operated by the user to control motion of the vehicle 12 on the underlying surface 15 and operate the work implement 22. The user interface 24 may also comprise an instrument panel (e.g., a dashboard) which provides indicators (e.g., a speedometer indicator, a tachometer indicator, etc.) to convey information to the user.

The wheel assemblies 20 engage the underlying surface 15 for traction of the material-handling vehicle 12. Each wheel assembly 20 comprises a wheel 32 for connecting the wheel assembly 20 to an axle of the vehicle 12 and a tire 34 disposed around the wheel 32 for contacting the underlying surface 15.

Figure 3:
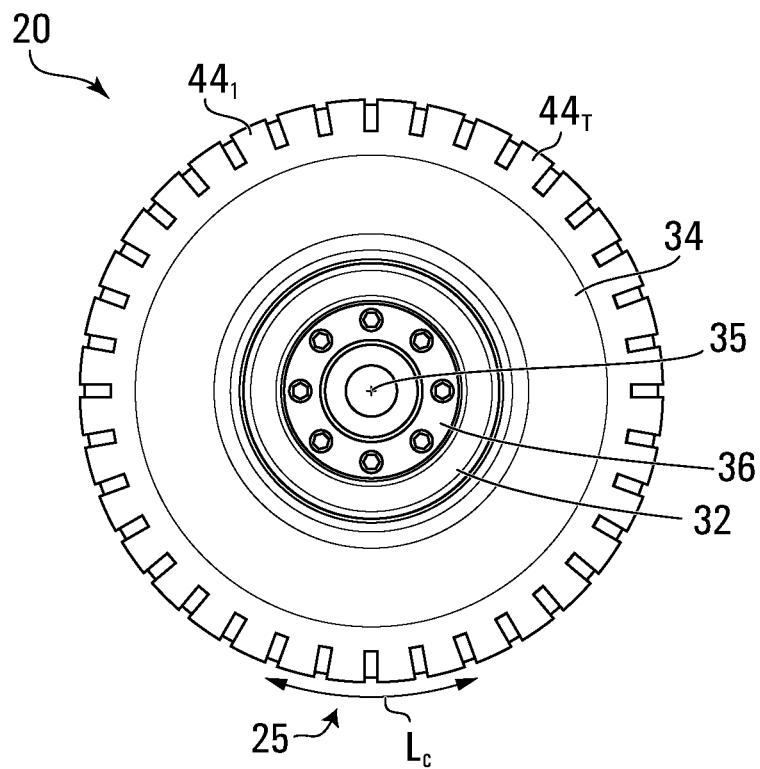
FIGS. 3 and 4 show a side view and a front view of a wheel assembly comprising a wheel and a tire in accordance with an embodiment.
Figure 4:
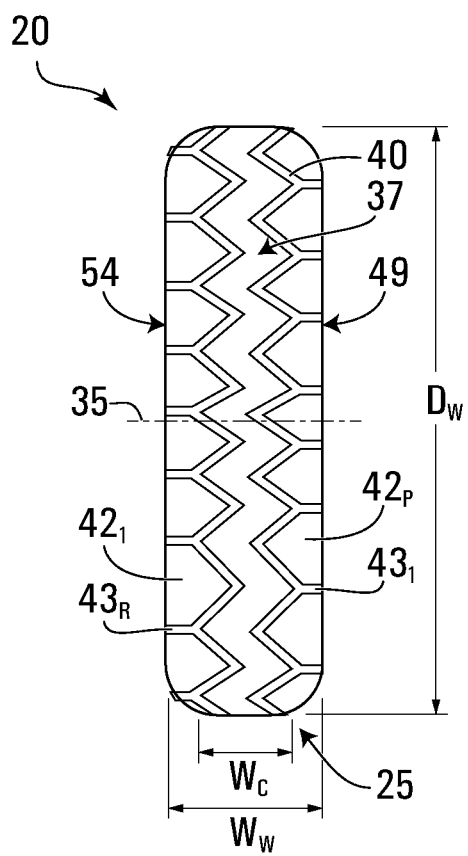

With additional reference to FIGS. 3 and 4, the wheel assembly 20 has: an axial direction defined by an axis of rotation 35 of the wheel assembly 20, which may also be referred to as a lateral, widthwise, or "Y" direction; a radial direction, which may also be referred to as a "Z" direction; and a circumferential direction, which may also be referred to as a "X" direction. The axis of rotation 35 of the wheel assembly 20 corresponds to an axis of rotation of the tire 34 and an axis of rotation of the wheel 32, and the axial direction, the radial direction and the circumferential direction of the wheel assembly 20 respectively correspond to an axial (i.e., lateral or widthwise) direction, a radial direction, and a circumferential direction of each of the tire 34 and the wheel 32. The wheel assembly 20 has an outer diameter $D_W$ and a width $W_W$. It comprises an inboard lateral side 54 for facing a center of the vehicle 12 in the widthwise direction of the vehicle 12 and an outboard lateral side 49 opposite the inboard lateral side 54. The wheel assembly 20 has an area of contact 25 with the underlying surface 15, which may be referred to as a "contact patch" of the wheel assembly 20 with the underlying surface 15. The contact patch 25 of the wheel assembly 20, which is a contact interface between the tire 34 and the underlying surface 15, has a dimension $L_C$, referred to as a "length", in the circumferential direction of the wheel assembly 20 and a dimension $W_C$, referred to as a "width", in the lateral direction of the wheel assembly 20.

The wheel 32 is a central structure of the wheel assembly 20 disposed radially inwardly of the tire 34. It is rigid, i.e., comprises rigid material, such as metallic material (e.g., steel), providing strength to the wheel assembly 20. In this example, the wheel 32 comprises a hub region 36 to secure the wheel assembly 20 to the axle 17 of the vehicle 12 and a rim 45 about which the tire 34 is mounted. For instance, the hub 36 region may be fastened to the axle 17 of the vehicle 12 via fasteners (e.g., bolts or screws).

The tire 34 comprises an outer surface 37 for contacting the underlying surface 15, an inner surface 39 for facing the wheel 32 and the axis of rotation 35 of the wheel assembly 20, and lateral surfaces 41 opposite one another and spaced from one another in the lateral direction of the tire 34. It has an outer diameter $D_T$, an inner diameter $d_T$ and a width $W_T$.

The outer surface 37 of the tire 34 comprises a tread 40. In this example, the tread 40 comprises a pattern of traction elements 44 to enhance traction on the underlying surface 15. The pattern of traction elements 44 comprises traction projections 42 and traction recesses 43 between the traction projections 42. Any suitable design for the pattern of traction elements 44 may be used. In other examples, the tread 40 may be smooth, i.e., with no pattern of traction elements such as the pattern of traction elements 44.

Figure 5A:
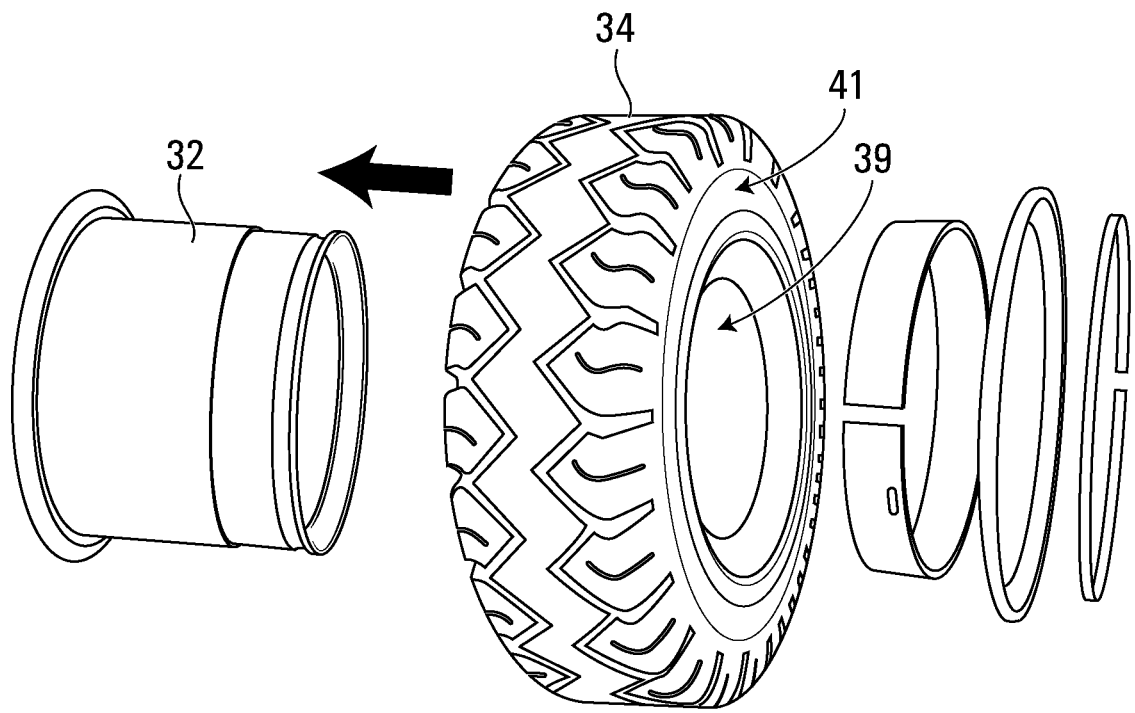
FIGS. 5a and 5b show the tire being secured to the wheel via one or more locking elements in accordance with an embodiment.
Figure 5B:
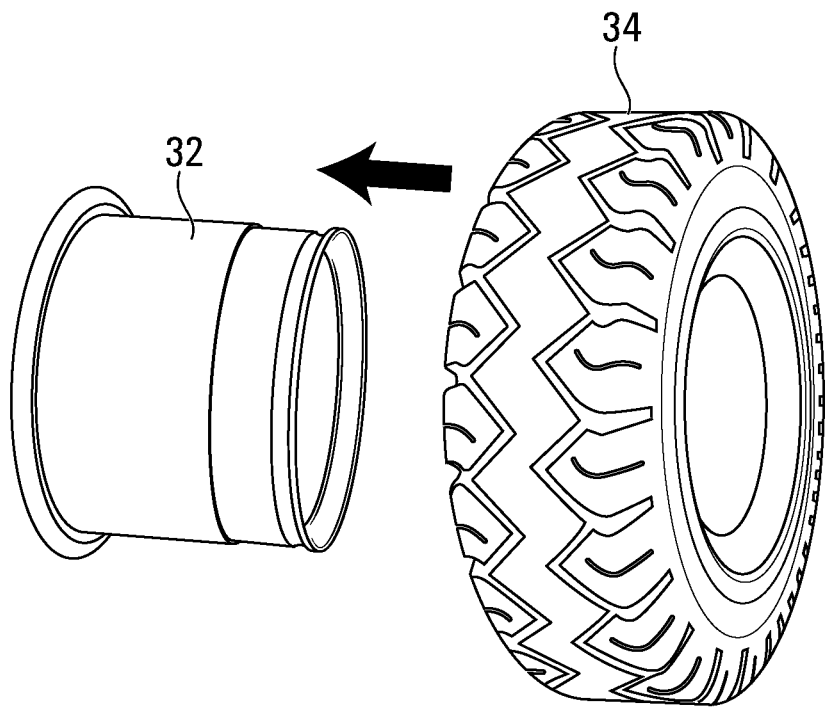
Figure 6:
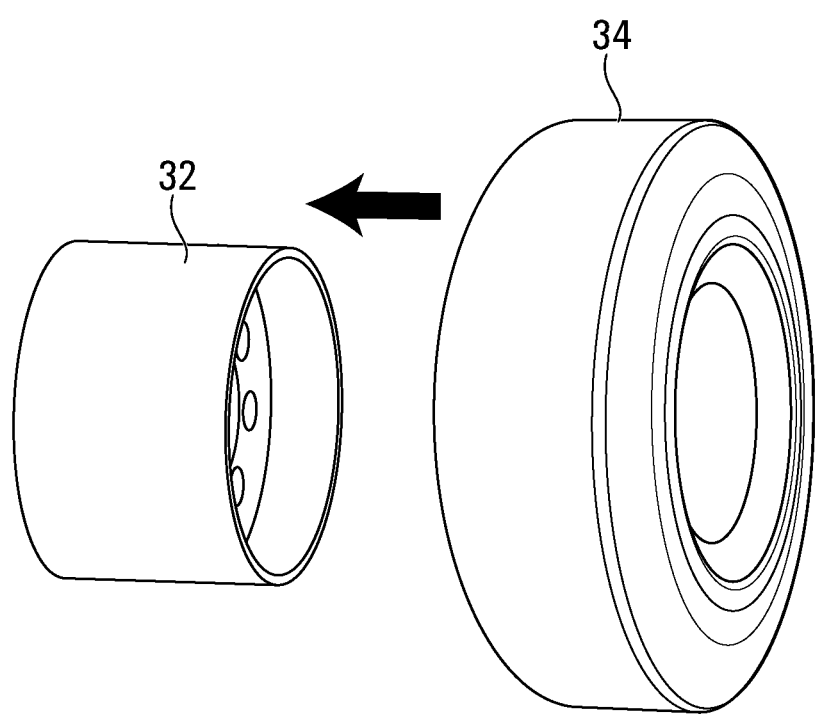
FIG. 6 shows the tire being secured to the wheel via a press-fit in accordance with an embodiment.

The tire 34 is mounted around the wheel 32. For example, in some embodiments, the tire 34 may be moved laterally relative to the wheel 32 to press-fit the tire 34 onto the wheel 32 (e.g., using a press such as a hydraulic press). In some embodiments, as shown in FIGS. 5a and 5b, the inner surface 39 of the tire 34 that is configured to contact the wheel 32 comprises an elastomeric material (e.g., rubber) such that an interface between the wheel 32 and the tire 34 is a metallic-elastomeric interface. For instance, in some embodiments, the tire 34 can be secured to the wheel 32 by one or more locking elements (e.g., side ring and/or lock rings) of the wheel 32, as shown in FIG. 5a, or by a locking element of the tire 34 such as a locking nose 55 configured to fit into a corresponding groove in the wheel 32, as shown in FIG. 5b. In other embodiments, as shown in FIG. 6 the inner surface 39 of the tire 34 comprises metallic material such that the interface between the wheel 32 and the tire 34 is a metallic-metallic interface, and the tire 34 may be press-fit onto the wheel 32 and secured to the wheel 32 via metal-to-metal interference between the tire 34 and the wheel 32 achieved by the press-fit. In such examples, the tire 34 may be referred to as a "press-on" tire.

In this embodiment, the tire 34 is a non-pneumatic tire. The non-pneumatic tire 34 is a compliant wheel structure that is not supported by gas (e.g., air) pressure and that is resiliently deformable (i.e., changeable in configuration) as the wheel assembly 20 contacts the underlying surface 15. In this example, the tire 34 may also be referred to as a "solid" or "resilient" tire.

Figure 7:
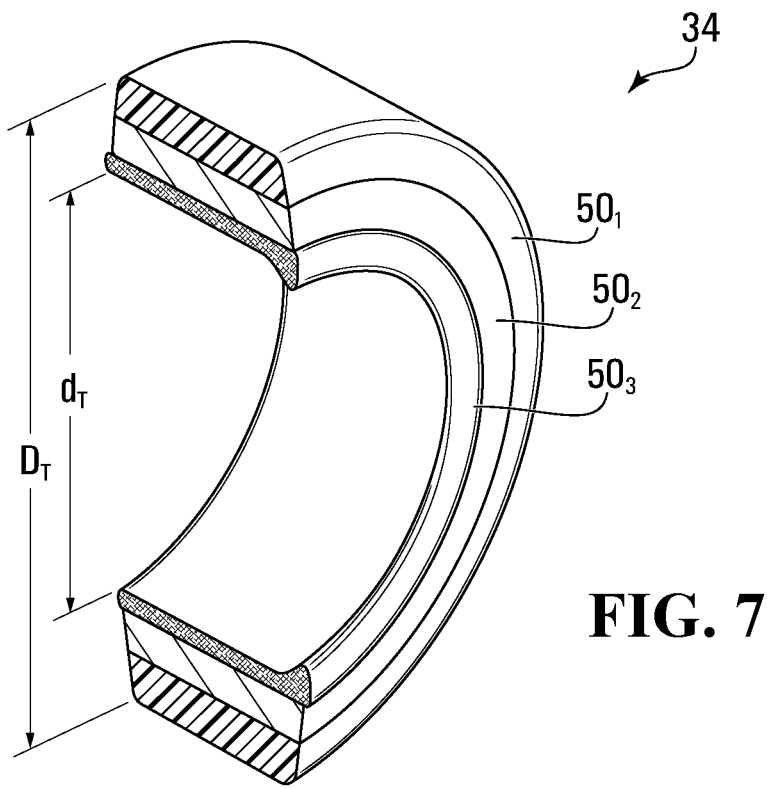
FIG. 7 is a perspective view of a cross-sectional cut of the tire in which an interface between the wheel and the tire is a metallic-elastomeric interface in accordance with an embodiment.
Figure 8:
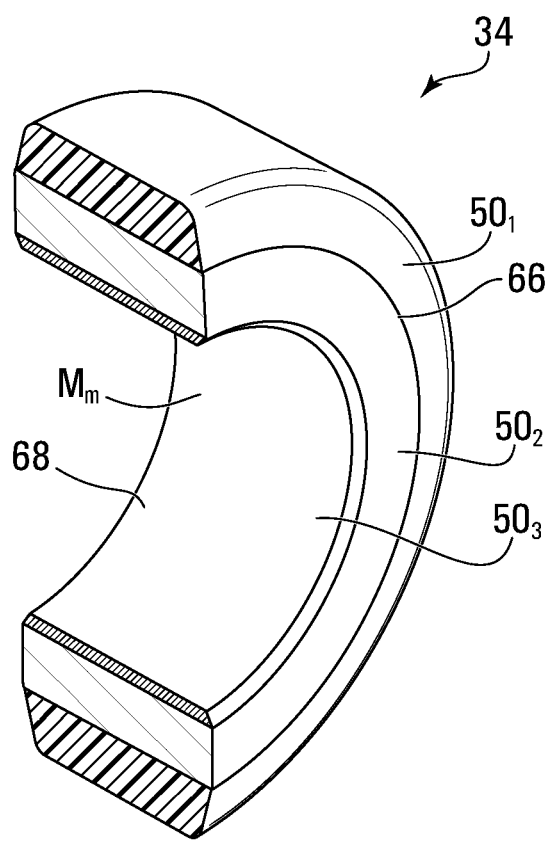
FIG. 8 is a perspective view of a cross-sectional cut of the tire in which an interface between the wheel and the tire is a metallic-metallic interface in accordance with an embodiment.

More particularly, in this embodiment, as shown in FIGS. 7 and 8, the tire 34 comprises a plurality of layers $50_1$, $50_2$, $50_3$ that may be structurally different and arranged in the radial direction of the tire 34. For example, in various embodiments, respective ones of the layers $50_1$, $50_2$, $50_3$ of the tire 34 may include different structures, such as structures comprising different materials and/or having different shapes.

An outer one of the layers $50_1$, $50_2$, $50_3$ namely the layer $50_1$, comprises the outer surface 37 and the tread 40 of the tire 34. In that sense, the outer layer $50_1$ can be referred to as a "tread layer". An inner one of the layers $50_1$, $50_2$, $50_3$ namely the layer $50_3$, comprises the inner surface 39 of the tire 34. In some cases, depending on how the tire 34 is constructed, the inner surface 39 of the tire 34 may be part of a "heel" or "inner heel" of the tire 34, and thus the inner layer $50_3$ can be referred to as a "heel layer" or "inner heel layer". In some embodiments, there may be one or more intermediate ones of the layer $50_2$, between the tread layer $50_1$ and the inner layer $50_3$.

Each of the one or more of the layers $50_1$, $50_2$, $50_3$ of the tire 34 may comprise elastomeric material. The elastomeric material of a given one of the layers $50_1$, $50_2$, $50_3$ of the tire 34 can include any polymeric material with suitable elasticity. For example, the elastomeric material may include rubber. Any suitable rubber compound may be used. As another example, in some cases, the elastomeric material may include another elastomer in addition to or instead of rubber (e.g., a thermoplastic elastomer (TPE), such as thermoplastic polyurethane (TPU)).

In various embodiments, the inner layer $50_3$ of the tire 34 may be made of an elastomeric material (i.e., an interface between the wheel 32 and the tire 34 is a metallic-elastomeric interface) or it may be made of a metallic material (i.e., the interface between the wheel 32 and the tire 34 is a metallic-metallic interface), as further described below.

In some embodiments, where it includes elastomeric material, given its proximity to the wheel 32 when the tire 34 is mounted about the wheel 32, the inner layer 52 may include reinforcements (e.g., cables) embedded in its elastomeric material which may provide tension about the wheel 32.

In other embodiments, as shown in FIG. 8 the tire 34 may be a press-on tire in which the inner layer $50_3$ comprises a mounting band 68 configured to mount the tire 34 onto the wheel 32. The mounting band 68 comprises rigid material that is stiffer than an elastomeric material of an adjacent one of the layers $50_1$, $50_2$, $50_3$ of the tire 34. For example, in this embodiment, the mounting band 68 is metallic (e.g., made of steel).

With further reference to FIG. 9, an embodiment of the monitoring system 10 is shown. As part of the monitoring system 10, the wheel assembly 20 comprises a wheel assembly sensor 90 and a tag 130 for interacting (e.g., communicating) with a processing apparatus 120 external to the wheel assembly 20.

Wheel Assembly Sensor

Figure 10:
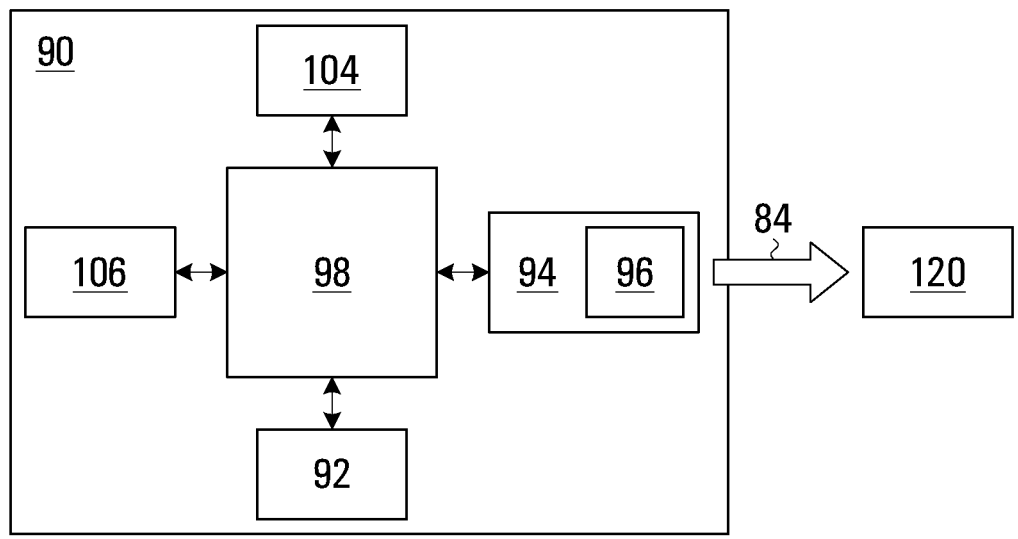
FIG. 10 is a block diagram of the sensor of FIG. 9 in accordance with an embodiment.

With further reference to FIG. 10, a block diagram of the sensor 90 of the wheel assembly 20, which may be referred to as wheel assembly sensor 90, is shown in accordance with an embodiment. The wheel assembly sensor 90 is configured to sense a physical aspect relating to the wheel assembly 20, such as of the wheel assembly 20 itself (e.g., the temperature of the wheel assembly 20) or of the environment of the wheel assembly 20 (e.g., of the underlying surface 15 onto which the wheel assembly 20 rolls), and to transmit a signal conveying information 84 regarding the wheel assembly 20 based on the physical aspect that is sensed, which may be referred to as a "wheel assembly sensor signal" or "wheel assembly sensor information" 84.

To that end, the wheel assembly sensor 90 comprises a sensing device 92 to sense the physical aspect relating to the wheel assembly 20 as well as an interface 94, which comprises a transmitter 96 configured to transmit the wheel assembly sensor information 84 to the processing apparatus 120. In this embodiment, the transmitter 96 is a wireless transmitter configured to wirelessly transmit the wheel assembly sensor information 84 to the processing apparatus 120. The transmitter 96 may use any suitable wireless communication protocol (e.g., involving one or more of Bluetooth, Bluetooth Low Energy (BLE) or other short-range or near-field wireless connection, WiFi or other wireless LAN, WiMAX or other wireless WAN, cellular, Universal Serial Bus (USB), etc.).

The sensing device 92 and the interface 94 of the wheel assembly sensor 90 are operatively coupled via a controller 98. The controller 98 is computer-based and as such may comprise a processing entity 2500 as described in connection with FIG. 26 The processing entity 2500 comprises an interface 2510, a processor 2520, and a memory 2530. The controller 98 may also be operatively coupled to a flash memory 104 which stores the wheel assembly sensor information 84, as further described below. The wheel assembly sensor 90 also comprises at least one battery 106 which is configured to provide electrical energy to the wheel assembly sensor 90, that is, at least to the sensing device 92, the interface 94, the controller 98 and the flash memory 104 of the wheel assembly sensor 90. Any suitable battery $106_i$ may be used, such as but not limited to 1000 mAh batteries, 1500 mAh batteries and the likes. In other examples, the wheel assembly sensor 90 may also comprise an energy harvesting unit which may be configured to derive energy from either one of a movement/rotation of the wheel assembly sensor 90, vibrations of the wheel assembly sensor 90, solar radiations and the likes.

In various embodiments, the physical aspect relating to the wheel assembly 20 that can be sensed by the wheel assembly sensor 90 may be (in other words, the wheel assembly sensor information 84 stored by the flash memory 104 of the wheel assembly sensor 90 may be related to), but is not limited to:

a rotational speed of the wheel assembly 20 $v_w$, in which case the sensing device 92 of the wheel assembly sensor 90 may comprise a rotational speed sensor (e.g., a gyroscope)—the rotational speed may correspond to a number of rotations of the wheel assembly 20 over a prescribed time period (e.g., rotation per minute—rpm), or to a rate of change of angular displacement of the wheel assembly 20 over a prescribed time period (e.g., radians per second, etc.). In other examples, the sensing device 92 of the wheel assembly sensor 90 may also be a pressure transducer or any other type of sensing device capable 92 of sensing pressure, in which case the rotational speed of the wheel assembly may be derived based on the frequency at which a pressure is detected by the sensing device 92 and the wheel assembly 20 rolls on the underlying surface 15, as further described below;

a pressure within the wheel assembly 20 (e.g., at an interface between the wheel 32 and the tire 34), in which case the sensing device 92 of the wheel assembly sensor 90 may comprise a pressure transducer or any other type of sensing device capable 92 of sensing pressure;

a vibration of the wheel assembly 20, in which case the sensing device 92 of the wheel assembly sensor 90 may comprise an accelerometer;

a load on the wheel assembly 20, in which case the sensing device 92 of the wheel assembly sensor 90 may be a pressure transducer, or any other type of sensing device capable 92 of sensing pressure, or an optical sensor or any other type of sensing device capable 92 of sensing tire deflection;

a temperature of the wheel assembly 20, in which case the sensing device 92 of the wheel assembly sensor 90 may comprise a thermocouple, a thermistor, a resistance temperature detector, an infrared sensor, or any other type of sensing device 92 capable of sensing temperature; or any other physical parameter pertaining to the wheel assembly 20 or its environment.

It will be readily appreciated that, in some embodiments, the wheel assembly sensor 90 may comprise more than one sensing device 92. Alternatively, more than one wheel assembly sensor 90 comprising each at least one sensing device 92 may be used concurrently in other embodiments. In one example, the wheel assembly may comprise a first wheel assembly sensor 90 with a sensing device 92 comprising a rotational speed sensor as well as a second wheel assembly sensor 90 with a sensing device 92 comprising a pressure sensor. Any other suitable configuration is possible in other examples.

In this embodiment, the wheel assembly sensor 90 is mounted to the wheel 32. More particularly, in this example, the wheel assembly sensor 90 is mounted to the hub region 36 (e.g., a nave plate) of the wheel 32, for example on a side of the hub region 36 corresponding to the outboard lateral side 49 of the wheel assembly 20. This may facilitate use and accessibility of the wheel assembly sensor 90. As the wheel 32 is rigid (e.g., metallic), it also provides stability for the wheel assembly sensor 90 and can allow better wireless communication with the processing apparatus 120. In contrast, mounting the wheel assembly sensor 90 to (e.g., inside the elastomeric material of the tire 34) the tire 34 may be more difficult, as the elastomeric material (e.g., rubber) of the tire 34 deforms in use, could wear and/or fail faster due to presence of the wheel assembly sensor 90, etc. In some embodiments, each wheel assembly 20 of the vehicle comprises the wheel assembly sensor 90 and the tag 130, whereas in other embodiments one, two or three of the wheel assemblies may not have any sensor and/or any tag like the wheel assembly sensor 90 and the tag 130. In yet further embodiments, each wheel assembly 20 may comprise a plurality of wheel assembly sensors 90.

Figure 11A:
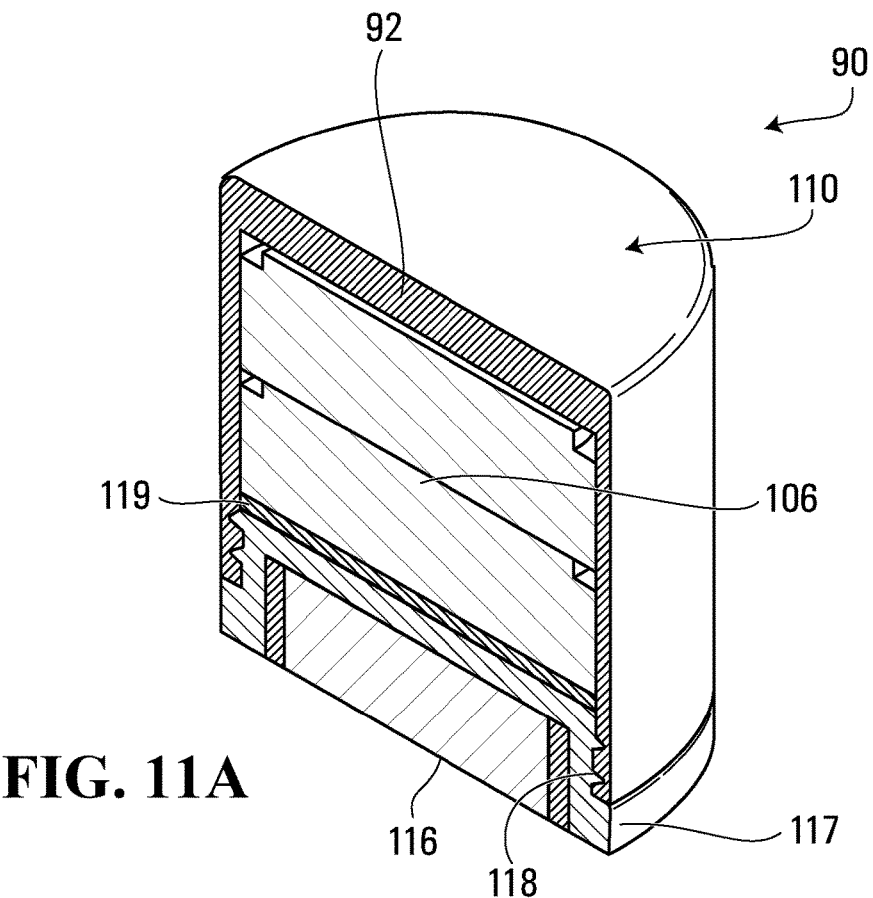
FIG. 11a is a perspective view of a cross-sectional cut of the sensor of FIG. 10 configured for magnetic engagement with the wheel of FIGS. 3 and 4 in accordance with an embodiment.

The wheel assembly sensor 90 comprising the sensing unit 92 may be mounted to the wheel assembly 20, specifically to the wheel 32, in a number of ways, for example via magnetic or mechanical engagement. In one example, with further reference to FIG. 11A, the wheel assembly sensor 90 may be encased in a housing 110. The housing 110 may be made of any suitable material that does not interfere with wireless communications from the wheel assembly sensor 90 to the processing apparatus 120, as further described below, such as, but not limited to plastic and the likes. The housing 110 defines a sealed compartment housing the sensing unit 92 and shielding the sensing unit 92 from any material or substance that may be in contact with the wheel assembly 20, notably as the wheel assembly 20 rolls on the underlying surface 15, and that may damage the sensing unit 92 or otherwise impede the operation of the wheel assembly sensor 90 and ultimately the operation of the monitoring system 10. In this example, the wheel assembly sensor 90, specifically the sensing device 92 of the wheel assembly sensor 90, may be magnetically mounted to the wheel 32, in which case the wheel assembly sensor 90 further comprises at least one magnet 116 secured to a base 117, the at least one magnet 116 being fastened to the wheel 32 via magnetic forces between the at least one magnet 116 and the metallic material of the wheel 32. Any suitable permanent magnet may be used in this embodiment. In this example, the sensing element 92 is secured to the base 117 via at least one threaded connection 118 between the base 117 and the housing 110, the at least one threaded connection 118 being established via engagement of corresponding threads present on both the base 117 and the housing 110. While in the example of FIG. 11 the corresponding threads have a circular configuration and a single threaded connection 118 is used, any other suitable configuration may be possible in other examples. In this example, the wheel assembly sensor 90 further comprises an insulation layer 119 positioned between the at least one battery 106 and the base 117, notably to prevent an exchange of thermal energy and/or prevent electrical connection between the at least one battery 106 and the base 117 during operation of the wheel assembly sensor 90. The insulation layer may be made of any suitable material, such as but not limited to polyurethane foam, rubber and the likes.

Figure 12A:
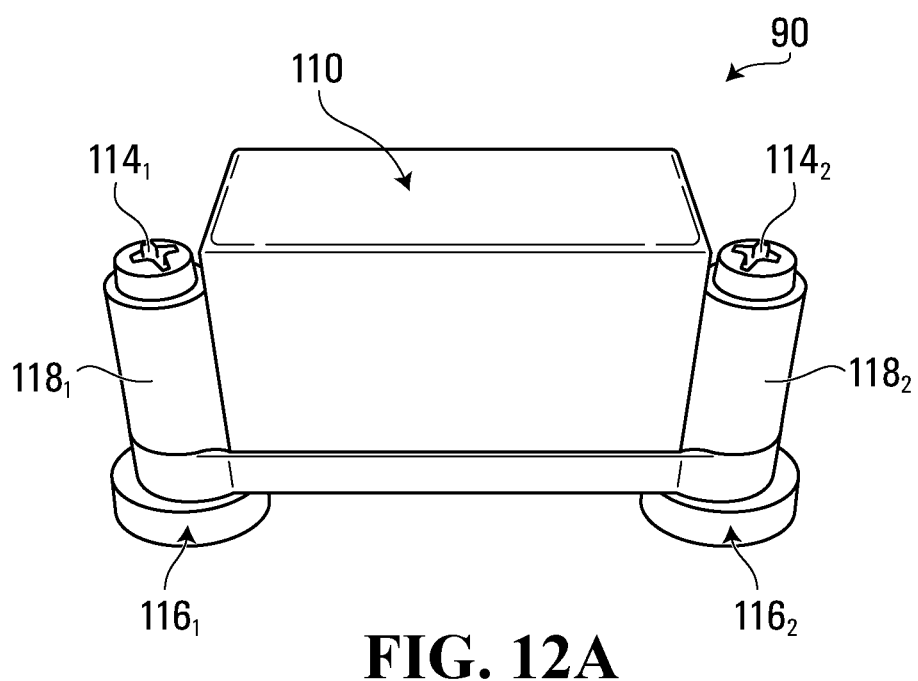
FIG. 12a is a perspective view of the sensor of FIG. 10 configured for magnetic engagement with the wheel of FIGS. 3 and 4 in accordance with another embodiment.
Figure 12B:
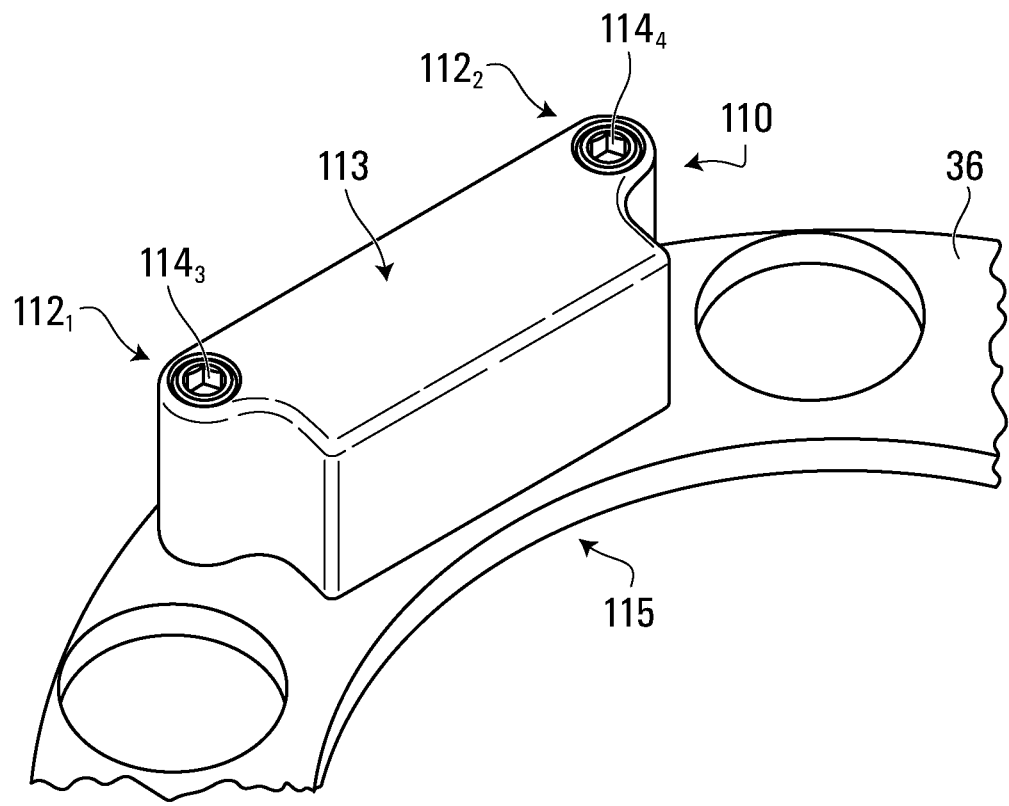
FIG. 12b is a perspective view of the sensor of FIG. 10 configured for mechanical engagement with the wheel of FIGS. 3 and 4 in accordance with another embodiment.

The wheel assembly sensor 90 and the housing 110 may have any other suitable configuration in other examples. With further reference to FIG. 12a, in this example the sensing unit 92 is magnetically mounted to the wheel 32 via two magnets $116_1$ and $116_2$ secured to the housing 110 by means of two threaded connection $118_1$ and $118_2$ involving two threaded fastener $114_1$ and $114_2$ (e.g., bolts or screws). The threaded fastener $114_1$ and $114_2$ are each configured to engage corresponding threads in either one of the magnets $116_1$ and $116_2$ and the housing 110. With further reference to FIG. 12b, in this example the wheel assembly sensor 90 is mounted to the wheel 32 via mechanical engagement between the housing 110 and the wheel 32, specifically via two threaded connections $112_1$ and $112_2$ that extend from a first side 113 to a second side 115 of the housing 110 and that each involve a threaded fastener ($114_3$ and $114_4$—e.g., bolts or screws) and a corresponding threads present on both the housing 110 and the wheel 32. While the threads present on the housing are integrally-formed with the housing 110 in the example of FIG. 12b, they may not be integrally formed in other examples. It will be readily appreciated that any other suitable configuration of the housing 110 may be used in other examples.

Figure 11B:
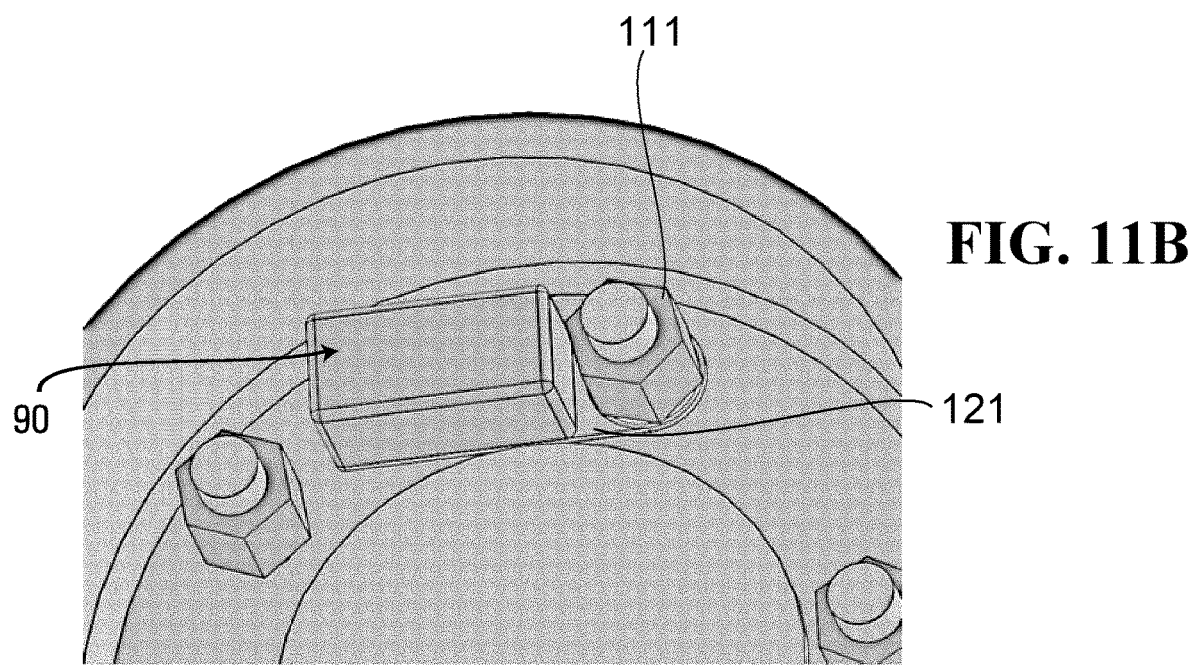
FIG. 11b is a perspective view of the sensor of FIG. 10 configured for mechanical engagement with the wheel of FIGS. 3 and 4 in accordance with an embodiment.

In some embodiments, and with further reference to FIG. 11b, the wheel-assembly sensor 90 may be fastened to the wheel 32 using existing fasteners (e.g., bolts) 111 that fasten the wheel 32 to the axle 17. For example, in this embodiment, the wheel-assembly sensor 90 comprises a base 121 that supports the sensing device 92, the housing 110, etc. and that includes an opening receiving the fastener 111. This allows the wheel-assembly sensor 90 to be readily mounted to the wheel 32 using available parts of the wheel assembly.

Figure 13:
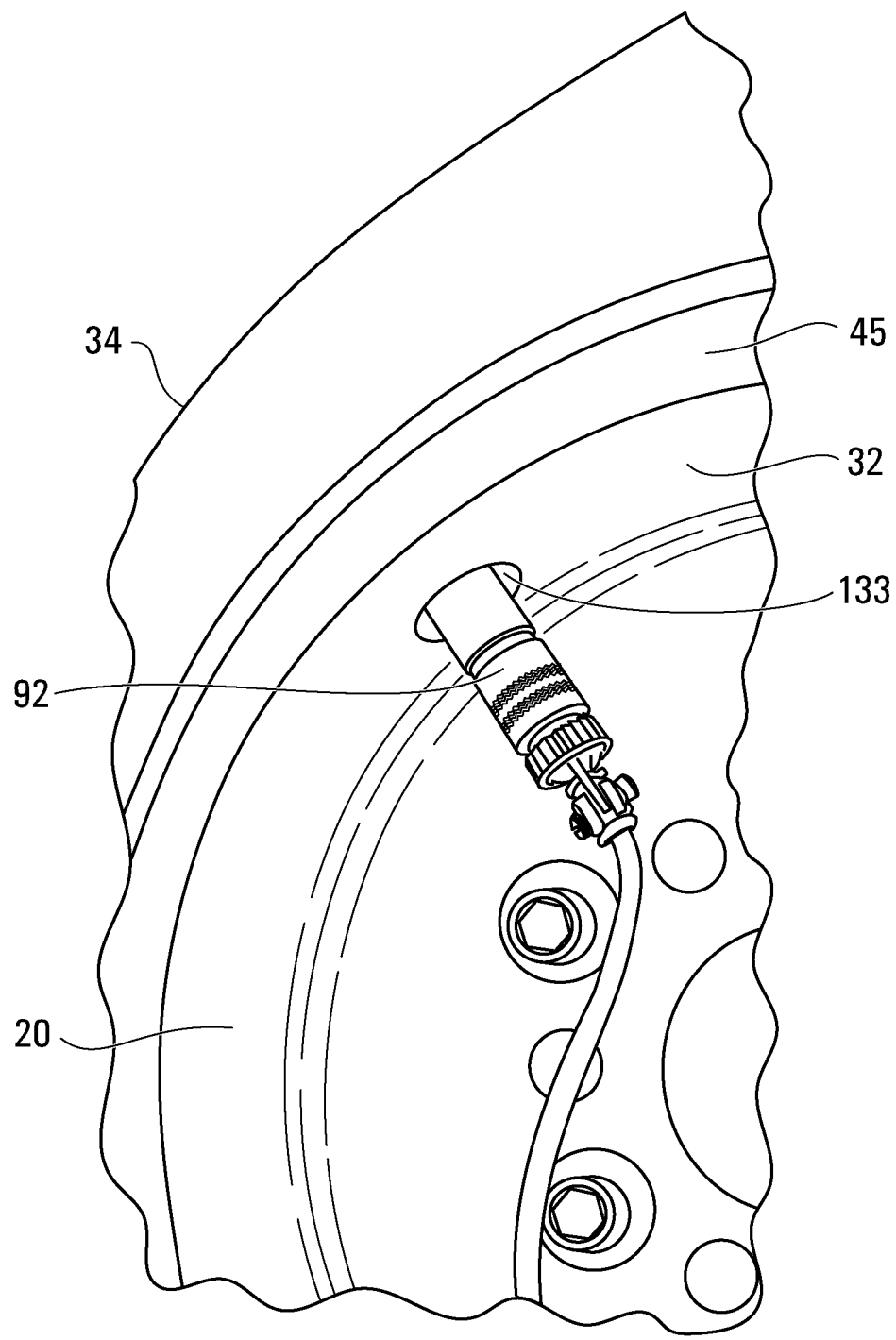
FIG. 13 is a perspective view of the sensor of FIG. 10 secured on the wheel in accordance with an embodiment.

With further reference to FIG. 13, another example of the wheel assembly sensor 90 is shown in which, while still mounted to the wheel 32, the wheel assembly sensor 90 is mounted to the rim 45 of the wheel 32, specifically at the interface between the rim 45 and the tire 34. It will be readily appreciated that the sensing device 92 of the wheel assembly sensor 90 may be any suitable device in this example however, the sensing device 92 mounted at the interface between the rim 45 and the tire 34 of the wheel 32 may preferably comprise a pressure transducer (or any other type of sensing device capable of sensing pressure) to measure pressure at the interface between the rim 45 and the tire 32. In this example, the sensing device 92 of the wheel assembly sensor 90 is mounted at the interface between the rim 45 and the tire 34 via a hole 133 in the rim 45 which enables the sensing device 92 to be positioned on an outer surface of the rim 45 where the outer surface of the rim 45 contacts the inner layer $50_3$ of the tire 34.

As such, pressure exerted onto the tire 34, specifically onto the outer surface 37/tread 40 of the tire 34 and substantially along a radial direction corresponding to that of the pressure transducer or other type of sensing device capable of sensing pressure is communicated via the elastomeric material of the tire 34 to the outer surface of the rim 45 where it contacts the inner layer $50_3$ of the tire 34. Any other suitable configuration of the wheel assembly sensor 90 is possible in other examples.

While in the embodiment above the wheel assembly sensor 90 is discrete, that is it is distinct from the vehicle 12, in another embodiment the wheel assembly sensor 90 may be integral with (i.e., a part of) the vehicle 12, such as built into or otherwise provided in the vehicle 12 during original manufacturing of the vehicle 12. In such an embodiment, the monitoring system 10 may thus obtain the information without any sensor in the wheel assembly 20—that is, the wheel assembly 20 may be sensor-free (i.e., free of any sensor). In this embodiment, the wheel assembly sensor 90 may be an "on-board" sensor of the vehicle 12, specifically a wheel encoder of the vehicle 12, as the wheel encoder of the vehicle 12 generally senses the same physical aspects relating to the wheel assembly 20 as the ones described above. It will be readily appreciated that, in this embodiment, the wheel assembly sensor 90 may communicate data acquired by the sensing device 92 to the processing apparatus 120 via a wired connection, that is in this embodiment the transmitter 96 is a wired transmitter and the on-board electronics of the vehicle 12 are used to relay the data acquired by the sensing device 90. Still in this embodiment, the wheel assembly sensor 90 may not store the wheel assembly sensor information 84 directly at the level of the wheel assembly sensor 90 (for example, where the wheel encoder does not comprise a flash memory 104), in which case the wheel assembly sensor information 84 may be communicated to and stored at the level of the processing apparatus 120. It will be readily appreciated that when the vehicle 12 is a vehicle without a clutch (e.g., a forklift) and when the wheel assembly sensor 90 is integral with the vehicle 12 (i.e., the wheel assembly sensor 90 is a wheel encoder of the vehicle 12), the data acquired by the wheel assembly sensor 90 (e.g., the speed/acceleration of the wheel assembly 20) may also be representative of data related to the vehicle 12 (e.g., the speed/acceleration of the vehicle 12, etc.).

Tag

Figure 14A:
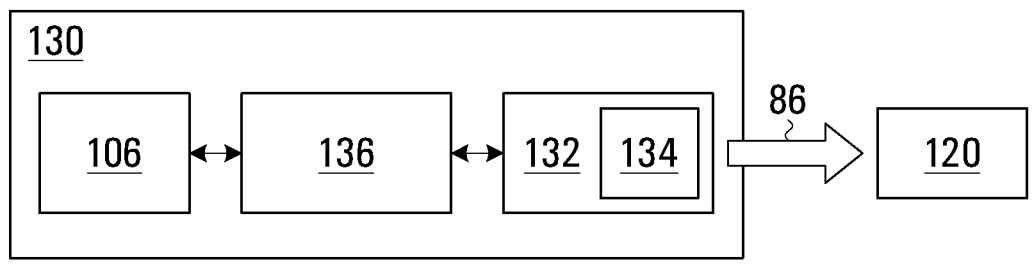
FIG. 14a is a block diagram of the tag of FIG. 9 in accordance with an embodiment.

With further reference to FIG. 14*a*, a block diagram of the tag 130 is shown in accordance with an embodiment. The tag 130 is configured to issue a signal conveying information 86 to identify a component (e.g., the tire 34 or the wheel 32) of the wheel assembly 20, which may be referred to as an "identification signal" or "identification information" (i.e., identification information 86). For instance, in various embodiments, the identification information 86 conveyed by the tag 130 may comprise a serial number, a make, a model, a type, a manufacturing date/time, an installation date/time, a distribution date/time, a disposal date/time and/or any other information identifying (i.e., indicating an identity of) that component of the wheel assembly 20 to allow an identification of that component of the wheel assembly 20 (e.g., the tire 34 or the wheel 32) as well as an association between the tire 34 and the wheel 32.

In this embodiment, the tag 130 comprises an interface 132 comprising a transmitter 134 configured to transmit the identification information 86 to the processing apparatus 120. The transmitter 134 is a wireless transmitter configured to wirelessly transmit the identification information 86 to the processing apparatus 120.

The transmitter 134 may use any suitable wireless communication protocol (e.g., involving radio-frequency identification (RFID) or other short-range or near-field wireless connection, etc.). To this end, in this example, the tag 130 may comprise an identification element 136 (i.e., RFID, etc.) configured to generate the tag signal conveying the identification information 86. While in the example of FIG. 14A the tag 130 further comprises a battery 106, that may not be the case in other examples.

Figure 14B:
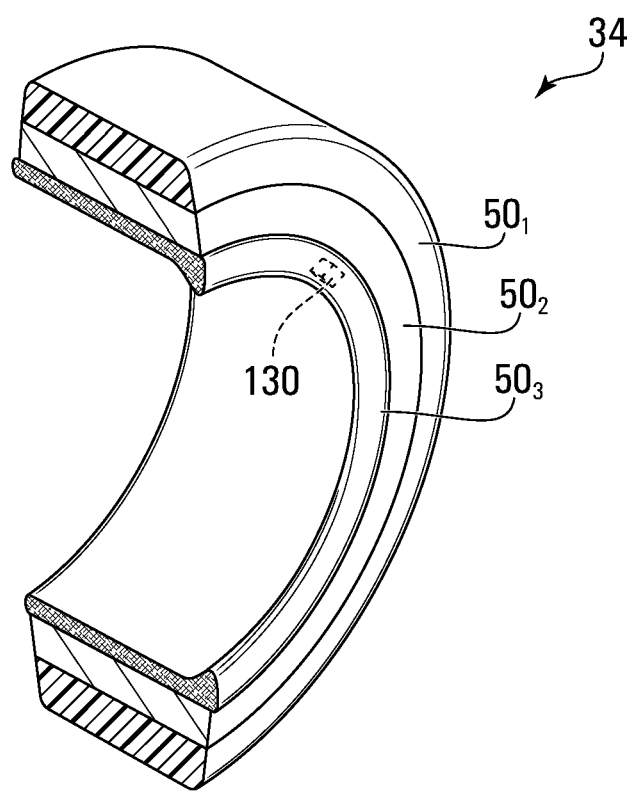
FIG. 14b is a perspective view of a cross-sectional cut of the tire of FIG. 7 in which the tag of FIG. 14a is embedded in the elastomeric material of the tire.

More particularly, in this embodiment, the tag 130 may be disposed inside the tire 34, i.e., within the elastomeric material of the tire 34. For instance, with further reference to FIG. 14*b*, the tag 130 may be embedded beneath an elastomeric portion of the tire 34 adjacent to a given one of the lateral surfaces 49 or 54 of the tire 34. In some examples, the tag 130 may be embedded within any one of the layers $50_1$, $50_2$, $50_3$ or between the layers $50_1$ and $50_2$, or between the layers $50_2$ and $50_3$ and the tag 130 may therefore be positioned at any suitable location along a radial direction of the elastomeric material of the tire 34.

For example, in some embodiments, a ratio of a thickness Tt of the elastomeric portion of the tire 34 covering the tag 130 over the width $W_T$ of the tire 34 may be no more than 0.2, in some cases no more than 0.1, and in some cases no more than 0.05.

Much like the sensing device 92 of the wheel assembly sensor 90, it will be readily appreciated that more than one tag 130 per wheel assembly 120 may be used concurrently in some embodiments.

Processing Apparatus

Figure 15:
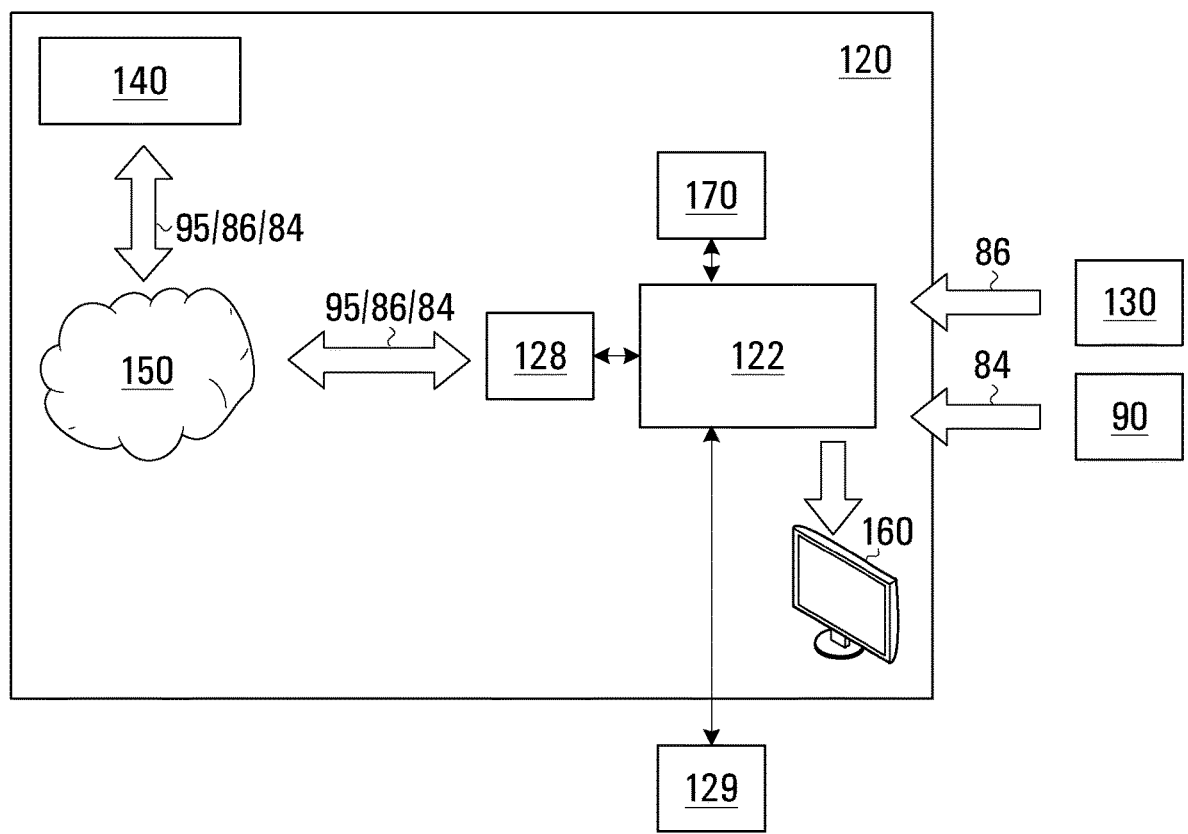
FIG. 15 is a block diagram of the processing apparatus of FIG. 9 in accordance with an embodiment.

With further reference to FIG. 15, a block diagram of the processing apparatus 120 is shown in accordance with an embodiment. The processing apparatus 120 is configured to receive and process the wheel assembly sensor information 84 from the wheel assembly sensor 90 of the wheel assembly 20 and the identification information 86 from the tag 130 of the wheel assembly 20 in order to obtain information regarding the vehicle 12 (i.e., vehicle information 95), which may comprise information regarding the wheel assembly 20 and/or the tire 34 may be indicative of how the vehicle 12 is used (e.g., the duty cycle of the vehicle 12), the state (e.g., the degree of wear) of the wheel assembly 20 such as the state (e.g., the degree of wear) of the tire 34, the loading and shocks on the wheel assembly 20, and/or the state of the environment (e.g., the environmental temperature, the profile, compliance, or other condition of the underlying surface 15 beneath the wheel assembly 20), and may be used in various ways, as discussed later.

Figure 16A:
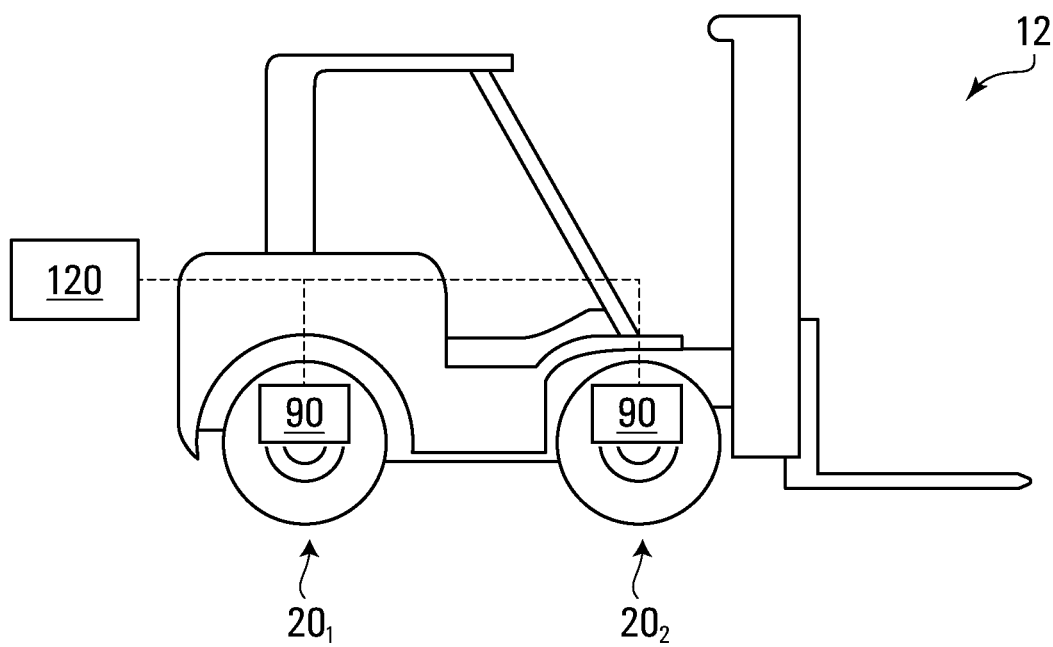
FIG. 16a is a block diagram of a mode of implementation of the processing apparatus of FIG. 15 in accordance with an embodiment.
Figure 16B:
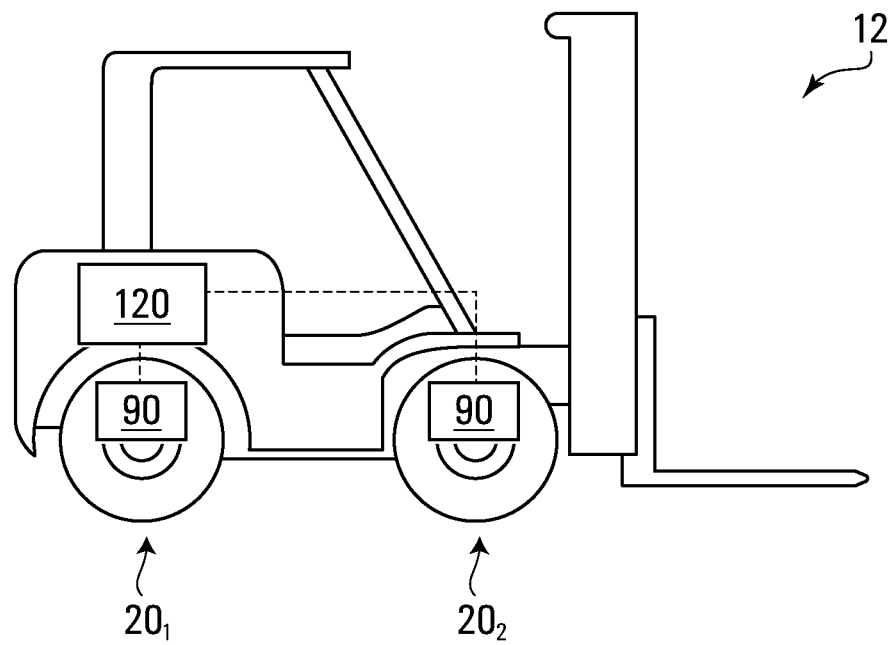
FIG. 16b is a block diagram of a mode of implementation of the processing apparatus of FIG. 15 in accordance with another embodiment.

In this embodiment, the processing apparatus 120 comprises a communication device 122 configured to wirelessly communicate with the wheel assembly sensor 90 and the tag 130 of the wheel assembly 20. More particularly, in this example, and with further reference to FIG. 16*a*, the communication device 122 may be a smartphone or tablet (e.g., with an RFID reader) carried by a user, such as the operator of the vehicle 12. In other examples, the communication device 122 may be a laptop computer, a smartwatch, head-mounted display, or other wearable device, or any other communication device carried, worn or otherwise associated with the user. In yet further examples, and with further reference to FIG. 16*b*, instead of being carried by the user such as the operator of the vehicle 12 the communication device 122 may be associated with (i.e., mounted to), or be part of, the vehicle 12 and configured to wirelessly communicate locally with the wheel assembly sensor 90 and the tag 130 of the wheel assembly 20, as further described below. In yet further examples, the communication device 122 may be associated with a fixed location in which the vehicle 12 operates (e.g., a warehouse, etc.). The monitoring system 10 may be implemented in various other ways in other embodiments.

In some examples, the processing apparatus 120 may further comprise another device 170, separate from the communication device 122, in order to interact with the tag 130 of the wheel assembly 20. For instance, where the tag 130 implements RFID technology, the device 170 may comprise an RFID reader. In some cases, the RFID reader 170 may be connected to the communication device 122 (e.g., smartphone), however any other suitable configuration is possible in other examples.

The communication device 122 is also configured to communicate with a remote computer 140 via a communication link 128, which may be wireless, wired, or partly wireless and partly wired and established over a cellular or other wide-area network 150 (e.g., involving one or more of Bluetooth, BLE, or other short-range or near-field wireless connection, WiFi or other wireless LAN, WiMAX or other wireless WAN, cellular, Universal Serial Bus (USB), etc.).

The communication device 122 is computer-based and as such may comprise a processing entity 2500 as described in connection with FIG. 26. In one example, the software encoded in the memory 2530 may enable the communication device 122 to derive the vehicle information 95 from at least the wheel assembly sensor information 84 (and optionally the tag information 86), as further described below. However, in other examples, the processing apparatus 120 may communicate at least the wheel assembly sensor information 84 (and optionally the tag information 86) to the remote computer 140 via the communication link 128 (and the network 150), the vehicle information 95 being derived at the level of the remote computer 140 in this example. Much like the communication device 122, the remote computer 140 is also computer-based and as such may also comprise a processing entity 2500 as described in connection with FIG. 26.

In some examples, the processing apparatus 120 may also be associated with a sensor 129 distinct from the wheel assembly sensor 90 and configured to sense a physical aspect relating to the vehicle 12. The sensor 129, which may be referred to as a "vehicle sensor", interacts with the processing apparatus 120 being itself configured to transmit a signal conveying vehicle information 95 regarding the vehicle 12 based on the physical aspect that is sensed by the vehicle sensor 129. The physical aspect relating to the vehicle 12 that can be sensed by the vehicle sensor 129 may be (in other words, the vehicle information 95 may be further related to), but is not limited to:

- a speed (e.g., linear speed) of the vehicle 12 $v_v$, in which case the vehicle sensor 129 may comprise a speed sensor associated with (i.e., mounted to) or being a part of the vehicle 12;
- an acceleration (e.g., linear acceleration) of the vehicle 12 $a_v$, in which case the vehicle sensor 129 may comprise an accelerometer and/or a gyroscope associated with (i.e., mounted to) or being a part of the vehicle 12. In some examples, the accelerometer and/or gyroscope may be a micro electromechanical system (MEMS) accelerometer and/or gyroscope, and the MEMS accelerometer and/or gyroscope may be combined with a magnetometer. It will be readily appreciated that the acceleration of the vehicle 12 $a_v$ may be measured by the vehicle sensor 129 in any suitable direction (i.e., a longitudinal, lateral and/or vertical direction of the vehicle 12, etc.); and
- information related to the prime mover (i.e., the motor) of the vehicle 12 (i.e., a rpm or other rotational speed of the prime mover, etc.).

It will be readily appreciated that in some embodiments, the vehicle information 95 obtained by the vehicle sensor 129 may also be representative of data related to the wheel assembly 20, as described above. It will also be readily appreciated that when the vehicle 12 comprises a global positioning system ("GPS") and a GPS signal is available (for example, when the vehicle 12 is operated outdoors), the GPS signal can also be used by the processing apparatus 120 to derive the vehicle information 95. That is, in some examples the speed of the vehicle 12 $v_v$ and/or the acceleration of the vehicle 12 $a_v$ may be derived at least in part based upon the GPS signal.

In some embodiments, an application ("app", i.e., software) may be installed on the communication device 122 to interact with the wheel assembly sensor 90 and the tag 130 of the wheel assembly 20 and the remote computer 140. For example, in some embodiments, such as where the communication device 122 is a smartphone or tablet, etc., the user (e.g., the operator) may download the app from a repository (e.g., Apple's App Store, Google Play, Android Market, etc.) or any other website onto the communication device 122. Upon activation of the app on the communication device 122, the user may access certain features relating to the monitoring system 10 locally on the communication device 122. In addition, a data connection can be established over the network (e.g., internet, cellular network and the likes) with the remote computer 140 which executes a complementary server-side application interacting with the app on the communication device 122.

The communication device 122 may be configured to present the vehicle information 95 to a user, as further described below. As such, the communication device 122 may be connected to a display 160 which may or may not be integral with the communication device 122.

While in the context of the embodiment of FIG. 15 the monitoring system 10 comprises the wheel assembly sensor 90, the tag 130 and the vehicle sensor 129, in which case the monitoring system 10 is capable of obtaining the wheel assembly sensor information 84, the identification information 86 as well as the vehicle information 95, this may not be the case in other embodiments and either one of the wheel assembly sensor 90, the tag 130 and the vehicle sensor 129 may be omitted from the monitoring system 10. That is, in some embodiments, the monitoring system 10 may comprise only the wheel assembly sensor 90, both the wheel assembly sensor 90 and the vehicle sensor 129 or only the vehicle sensor 129.

Figure 26:
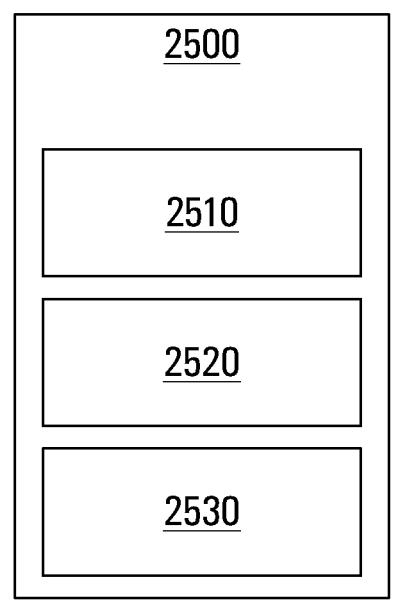
FIG. 26 shows a block diagram of a processing entity comprising an interface, a processor and a memory.
Figure 27:
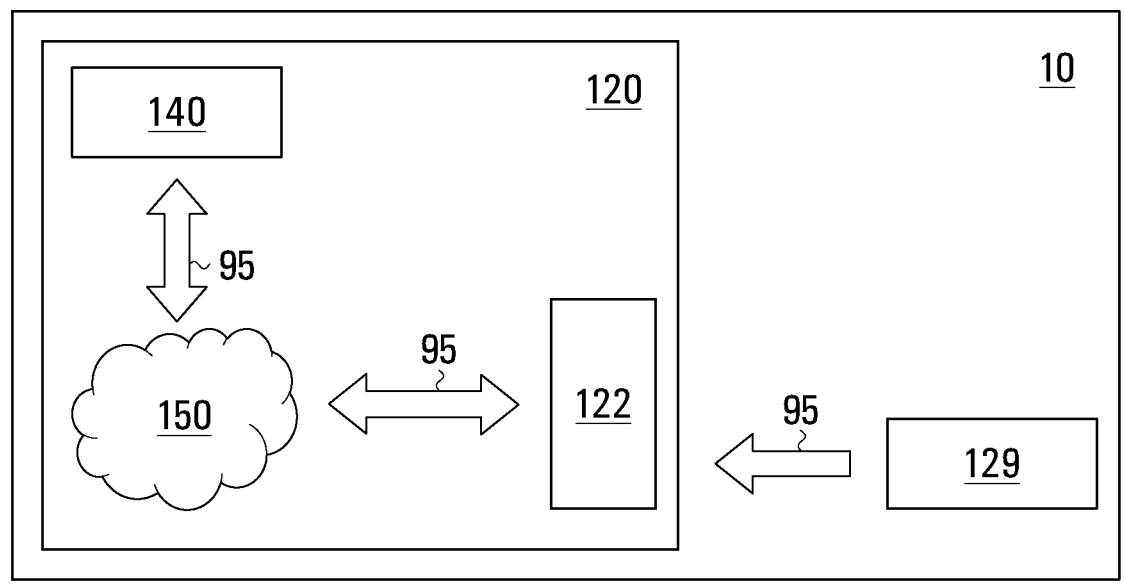
FIG. 27 is a block diagram of the monitoring system comprising a vehicle sensor and a processing apparatus in accordance with another embodiment.
Figure 28:
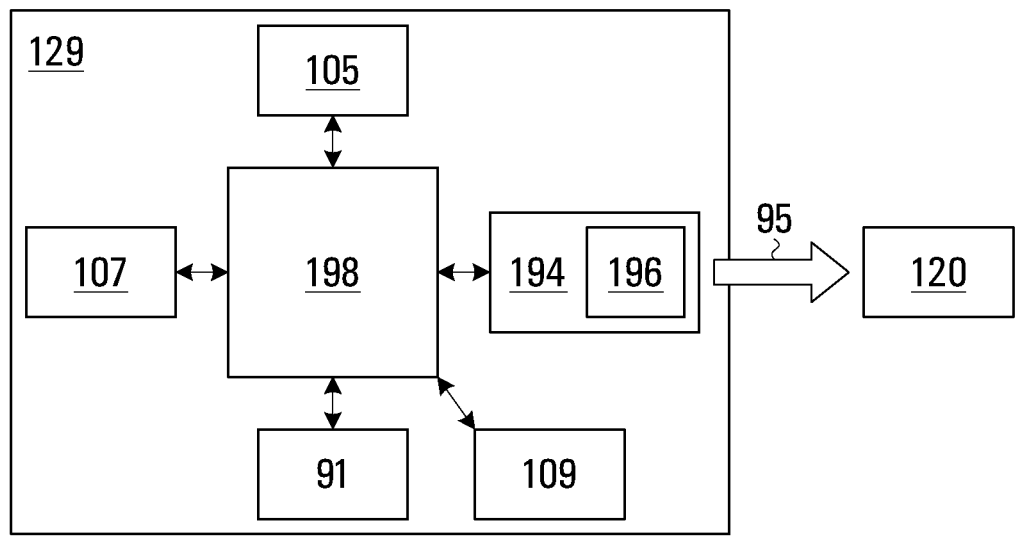
FIG. 28 is a block diagram of the vehicle sensor of FIG. 27 in accordance with an embodiment.

For example, with further reference to FIG. 27 there is shown an embodiment of the monitoring system 10 comprising the vehicle sensor 129 for interacting (e.g., communicating) with the processing apparatus 120. With further reference to FIG. 28, a block diagram of the vehicle sensor 129 is shown in accordance with an embodiment. The vehicle sensor 129 is configured to sense a physical aspect relating to the vehicle 12 comprising the wheel assembly 20 and to transmit a signal conveying the vehicle information 95. To this end, the vehicle sensor 129 comprises a sensing device 91 and an interface 194 that are operatively coupled to a controller 198. The controller 198 is also computer-based and as such may comprise the processing entity 2500 as described in connection with FIG. 26. The controller 198 may also be operatively coupled to a flash memory 105 which stores the vehicle information 95, as further described below. While in some examples the vehicle sensor 129 may also comprise at least one battery 107 which is configured to provide electrical energy to the vehicle sensor 129, that is, at least to the sensing device 91, the interface 194, the controller 198 and the flash memory 105 of the vehicle sensor 129, in other examples the vehicle sensor 129 may be powered by being connected to the electrical system of the vehicle 12.

The vehicle sensor 129 may also comprise an inertial measurement unit (IMU) 109. In some embodiments, the sensing device 91 of the vehicle sensor 129 may comprise the IMU 109. In one embodiment the vehicle sensor 129 comprising the sensing device 91/IMU 109 may be discrete, that is it may be distinct from the vehicle 12, or it may be integral with (i.e., a part of) the vehicle 12 in another embodiment, in which case the vehicle sensor 129 comprising the sensing device 91/IMU 109 may be an "on-board" sensor of the vehicle 12. It will be readily appreciated that data acquired by the sensing device 91 may be communicated via a wired or wireless connection.

Figure 29A:
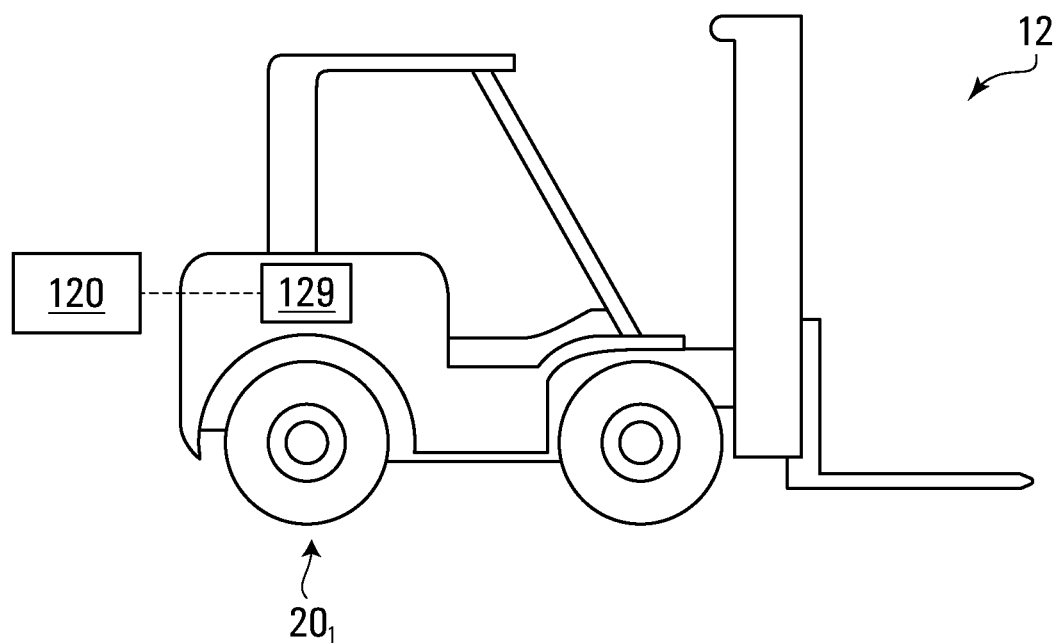
FIG. 29A is a block diagram of a mode of implementation of the vehicle sensor of FIG. 28 in accordance with an embodiment.
Figure 29B:
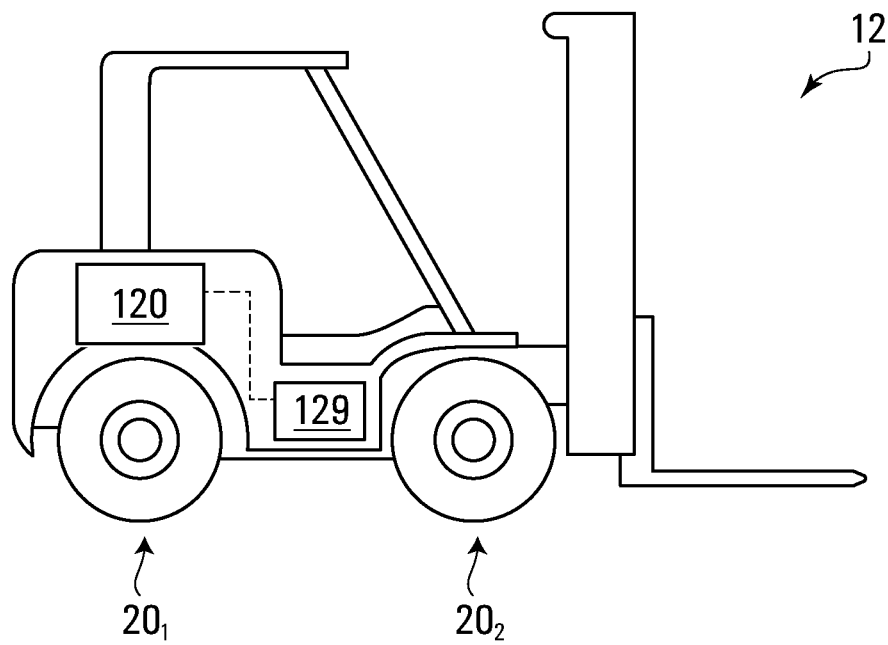
FIG. 29B is a block diagram of a mode of implementation of the vehicle sensor of FIG. 28 in accordance with another embodiment.

In the instances in which the vehicle sensor 129 is configured to sense an acceleration $a_v$ of the vehicle 12 and comprises at least an accelerometer, the IMU 109 is generally configured to combine the output from at least the accelerometer and the gyroscope to derive the vehicle information 95. It will be readily appreciated that various algorithms can be used by the IMU 109 to perform such combination, such as but not limited to the Kalman filter, the compensation method and the likes. The communication device 122 of the processing apparatus 120 is configured to wirelessly communicate with the vehicle sensor 129. More particularly, with further reference to FIG. 29A, in some examples the processing apparatus 120 may be remote from the vehicle 12, for example in the instances where the communication device 122 is a device carried by a user, such as the operator of the vehicle 12. In other examples, and with further reference to FIG. 29B, instead of being carried by the user such as the operator of the vehicle 12 the processing apparatus 120 may be associated with (i.e., mounted to), or be part of, the vehicle 12 and configured to communicate (e.g., wireless or wired communication) locally with the vehicle sensor 129. The monitoring system 10 may be implemented in various other ways in other embodiments.

Figure 30:
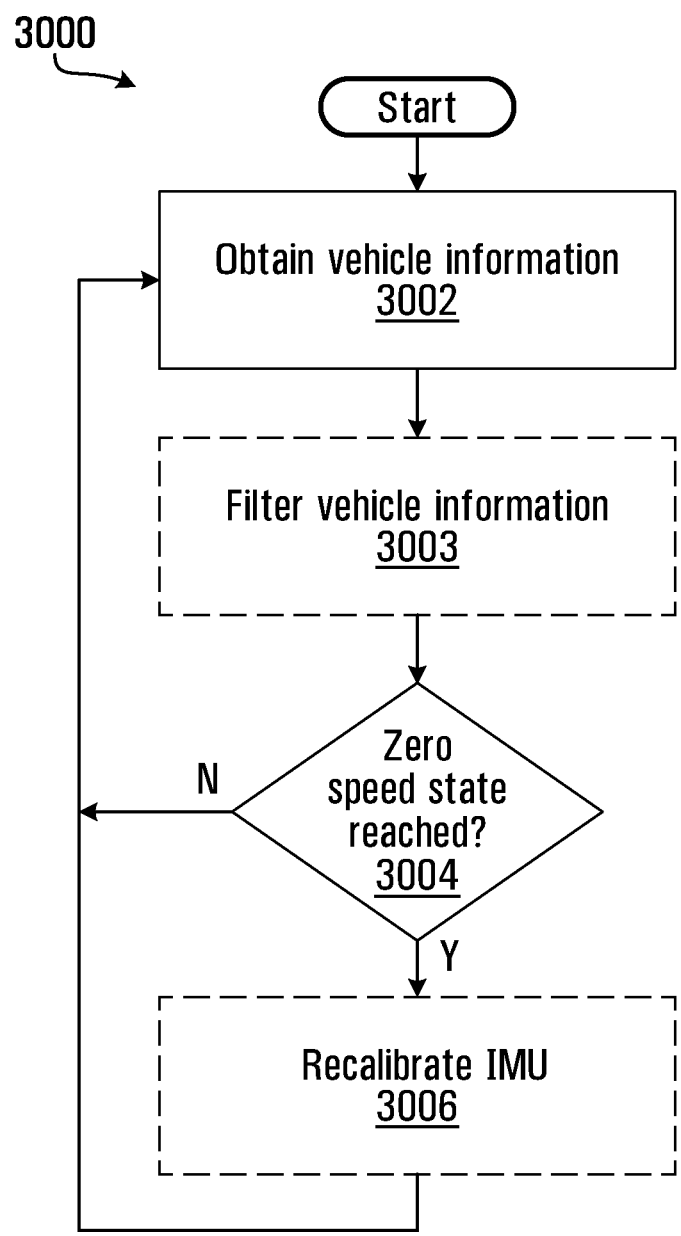
FIG. 30 is a process for deriving vehicle information from information from the vehicle sensor of FIG. 28 in accordance with an embodiment.

An embodiment of a process 3000 for filtering the vehicle information 95 obtained from the vehicle sensor 129 is described with further reference to FIG. 30. In a first step 3002, the monitoring system 10, specifically the processing apparatus 120, obtains the vehicle information 95. In some examples, the vehicle information 95 obtained may be the acceleration $a_v$ of the vehicle 12 in the longitudinal, lateral and vertical directions of the vehicle 12. In one example, the first step 3002 is repeated by the processing apparatus 120 at various time intervals, such as but not limited to no more than about every 10 seconds, in some cases no more than about every 9 seconds, in some cases no more than about every 8 seconds, in some cases no more than about every 7 seconds, in some cases no more than about every 6 seconds, in some cases no more than about every 5 seconds, in some cases no more than about every 4 seconds and in some cases even less. In another example, the vehicle information 95 is continuously obtained by the processing apparatus 120 at step 3002, in which case the vehicle information 95 obtained is subsequently filtered by the processing apparatus 120, as further described below.

It will be readily appreciated that, a time interval that is too short will include some noise in the vehicle information 95 obtained, while a time interval that is too long will include unwanted vehicle information 95 (for example, unwanted acceleration data that is unrelated to the true acceleration $a_v$ of the vehicle 12, data pertaining to turns and other events occurring during the use of the vehicle 12, etc.). A time interval that is too short may also lead to the identification of "false" acceleration events, for example when the vehicle 12 is decelerating rather than accelerating. As such, by setting a suitable time interval at step 3002, noise in the vehicle information 95 obtained is avoided while at the same time ensuring that changes in the vehicle information 95 obtained (and measured) are representative of an actual change in the state (e.g., motion) of the vehicle 12. In some examples, by using a suitable time interval minute variations in the acceleration $a_v$ of the vehicle that can be observed when the vehicle 12 is operated at a constant speed $v_v$ (i.e., when there is no true acceleration $a_v$ of the vehicle 12—which in other words constitutes noise in the acceleration data) will not be considered and "filtered out" by the processing apparatus 120.

It will also be readily appreciated that what a suitable time interval is may very well vary according to the type and usage of the vehicle 12 and as such the values provided above are in no way limiting and any other suitable time interval may be used in other examples. In other examples, the vehicle information 95 may be obtained at step 3002 at a first time interval and the vehicle information 95 so obtained may optionally be filtered at step 3003 at a second time interval that is greater than the first time interval. In other words, this enables the monitoring system 10 to obtain vehicle information 95 of a high temporal granularity and then only after filter out unwanted data from the vehicle information 95 to reduce and/or eliminate any noise originally present in the vehicle information obtained at step 3002. It will be readily appreciated that when the vehicle information 95 is continuously obtained at step 3002, the vehicle information 95 is filtered at step 3003 at a suitable time interval to ensure that any noise in the acceleration data is not further considered.

In a second step 3004, the monitoring system 10 determines whether the vehicle 12 has reached a "zero-speed" state based on the vehicle information 95 obtained at step 3002. The "zero-speed" state can be defined in a number of ways. In one example, the "zero-speed" state can be defined as a state during which the acceleration of the vehicle 12 $a_v$ is below a pre-determined threshold in the longitudinal, lateral and vertical directions of the vehicle 12 for a pre-determined time period. In some examples, the pre-determined acceleration threshold in the longitudinal, lateral and vertical directions of the vehicle 12 may be no more than about 0.5 g, in some cases no more than about 0.25 g, in some cases no more than about 0.2 g, in some cases no more than about 0.1 g, in some cases no more than about 0.05 g, in some cases no more than about 0.025 g and in some cases even less. In some examples, the pre-determined time period may be no more than about 1 second, in some cases no more than about 500 ms, in some cases no more than about 250 ms, in some cases no more than about 200 ms, in some cases no more than about 100 ms, in some cases no more than about 50 ms, in some cases no more than about 25 ms, in some cases no more than about 20 ms, in some cases no more than about 10 ms, in some cases no more than about 5 ms, in some cases no more than about 4 ms, in some cases no more than about ms, in some cases no more than about 2 ms, in some cases no more than about 1 ms and in some cases even less. It will be readily appreciated that in this example the acceleration $a_v$ of the vehicle 12 must have been obtained over the course of a sufficient period of time at step 3002 for the monitoring system 10 to make a determination as to whether the pre-determined time period has been reached or not. The second step 3004 is also repeated at various time intervals, which may or may not be the same as the time intervals at which the vehicle information 95 is obtained at step 3002. The "zero-speed" state can be defined in any other suitable manner—in some examples, the "zero-speed" state can be defined as a state during which the acceleration of the vehicle 12 $a_v$ is below a pre-determined threshold in the longitudinal, lateral and vertical directions of the vehicle 12. In this example, the "zero-speed" state can therefore be reached irrespective of the length during which the acceleration of the vehicle 12 $a_v$ is below the pre-determined threshold in the longitudinal, lateral and vertical directions. In other examples, when the wheel sensor 90 and the vehicle sensor 129 comprising the IMU 109 are both integral with the vehicle 12, the data acquired by the wheel sensor 90 and the IMU 109 may be synchronized. In this case, the determination of whether the "zero-speed" state has been reached may be based at least in part upon information regarding the wheel assembly 20, specifically a rotation speed of the wheel assembly 20.

For as long as no determination is made at step 3004 to the effect that the "zero-speed" state has been reached by the vehicle 12, the process 3000 reverts to step 3002 and steps 3002 and 3004 are repeated. Once a determination is made by the monitoring system 10 at step 3004 that the "zero-speed" state has been reached, at step 3006 the IMU 109 is optionally recalibrated. Recalibration generally refers to the process of compensating for errors and/or noise in the acquisition/measure of the vehicle information 95 (e.g., the acceleration of the vehicle 12 $a_v$ by the accelerometer, the gyroscope and/or the magnetometer). This improves the accuracy of the vehicle information 95, specifically the accuracy of the acceleration $a_v$ of the vehicle 12 that is measured/acquired by the vehicle sensor 129, and ensures that the vehicle information 95 is as representative as possible of the "true" vehicle information (e.g., that the acceleration of the vehicle 12 $a_v$ acquired/measured by the vehicle sensor 129 is as close as possible to the "real" acceleration of the vehicle 12).

Operation of the System

In one embodiment, the monitoring system 10 is configured to monitor at least one physical aspect relating to the wheel assembly 20 via the wheel assembly sensor 90 and then communicate the wheel assembly sensor information 84 resulting therefrom to the processing apparatus 120 to derive vehicle information 95 regarding the vehicle 12, including information regarding the wheel assembly 20.

As described above, notably depending on the type of sensing element 92 implemented in the wheel assembly sensor 90, the wheel assembly sensor information 84 may include information related to the rotational speed of the wheel assembly 20, the rotational acceleration of the wheel assembly 20, the pressure in the wheel assembly 20 (specifically, the pressure at the interface between the rim 45 of the wheel assembly 20 and the tire 34), the temperature of the wheel assembly 20, the profile of the underlying surface 15 and the likes. In one example, the acquisition and communication of the wheel assembly sensor information 84 by the wheel assembly sensor 90 may include an "active" mode of acquisition and communication, i.e. the sensing element 92 may be configured to acquire and communicate the wheel assembly sensor information 84 without any reliance upon some external signal received by the sensing device 92 to initiate the acquisition and/or communication of the wheel assembly sensor information 84.

For example, the sensing device 92 may be configured to include "idle" and "recording" modes. In idle mode, the sensing device 92 assesses whether there is movement of the wheel assembly 20 (i.e., whether there is operation of the vehicle 12). This assessment may be performed by the sensing device 92 periodically at any suitable time interval, for example every 5 seconds, every 2.5 seconds, every second and in some cases even less and the assessment may be performed for any suitable time period, for example for 100 ms, for 50 ms, for 25 ms, for 10 ms and in some cases even less. Without movement of the wheel assembly 20, the sensing device 92 remains in idle mode and there is no acquisition of the wheel assembly sensor information 84. When movement of the wheel assembly 20 is detected by the sensing device 92, the sensing device 92 switches to recording mode and initiates the acquisition of the wheel assembly sensor information 84 for any suitable time period, for example for 5 s, for 4 s, for 3 s, for 2 s, for 1 s, for 500 ms, for 250 ms, for 100 ms, for 50 ms, for 25 ms, for 10 ms and in some cases even less, and then waits until the beginning of the following time interval for the assessment of the movement of the wheel assembly 20. The wheel assembly sensor information 84 acquired by the sensing device 92 may be time-stamped and stored in the flash memory 104 of the wheel assembly sensor 90 and may be communicated to the processing apparatus 120 at any suitable time interval, for example every hour, every 4 hours, every 8 hours, every 12 hours, every 24 hours and in some cases even more. Any other suitable mode of operation of the wheel assembly sensor 90 is possible in other examples.

The monitoring system 10 is also configured to communicate the tag information 86 to the processing apparatus 120, the tag information 86 notably comprising a serial number, a make, a model, a type, a manufacturing date/time, a distribution date/time, a disposal date/time and/or any other information identifying the component of the wheel assembly 20 (i.e., the wheel 32 or the tire 34) to allow identification of that component of the wheel assembly 20. Contrary to the wheel assembly sensor information 84, the communication of the tag information 86 by the tag 130 may include a "passive" mode of communication, i.e. the tag 130 may be configured to communicate the tag information 86 only when it receives an external signal (e.g., an interrogation signal) to initiate the communication of the tag information 86. In some examples, the external signal initiating the communication of the tag information 86 to the processing apparatus may be a signal generated by the RFID reader of the communication device 122. Any other suitable mode of operation of the tag 130 is possible in other examples.

The monitoring system 10 may be configured to assess the degree of wear of the wheel assembly 20 and/or the duty cycle of the wheel assembly 20 (and/or the vehicle 12) in a number of ways. For example, the wear of the wheel assembly 20 may refer to the reduction of the outer diameter $D_T$ of the tire 34 as a result of degradation of the elastomeric material of the tire 34 as the tire 34 rolls on the underlying surface 15. The duty cycle may refer any data related to intermittent operation of the vehicle 12, including that of the wheel assembly 20.

Figure 17:
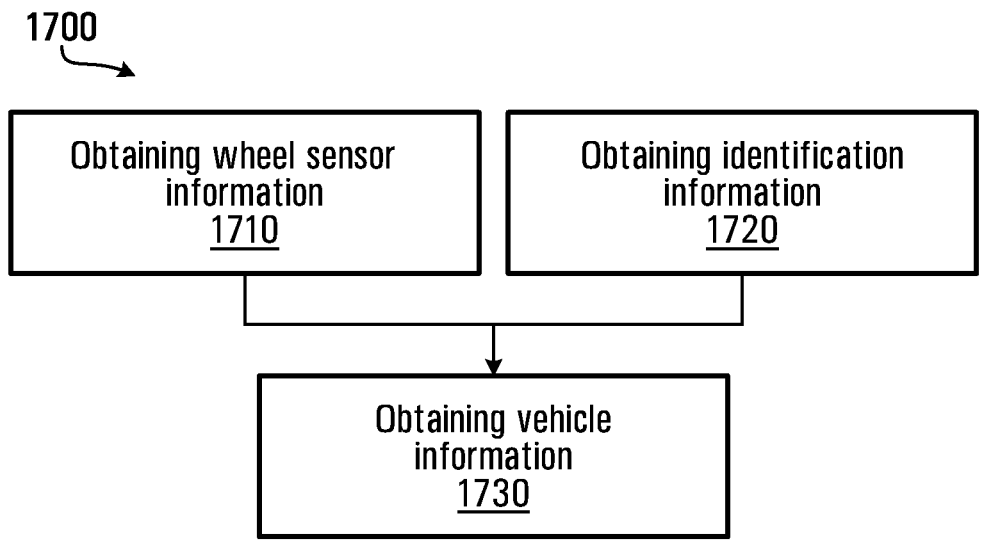
FIG. 17 is a process for deriving vehicle information from information from the sensor of FIG. 10 and the tag of FIG. 14 in accordance with an embodiment.

In some embodiments, with further reference to FIG. 17, the wheel assembly sensor information 84 and the identification information 86 may be obtained at steps 1710 and 1720, respectively, to obtain the following vehicle information 95 at step 1730, including information regarding the wheel assembly 20:

Date and/or time of installation of the wheel assembly 20, including of the wheel 32 and the tire 34;

Dimension of the wheel assembly 20, i.e. of the tire 34 (i.e., the outer diameter $D_T$ of the tire 34), including $D_T$ history data (i.e., $D_T$=f (time) data);

Idle status of the vehicle 12 (i.e., duty cycle of the vehicle 12), including idle/standstill time history data of the vehicle 12 (i.e., when the vehicle 12 is being operated/not operated, which notably relates to cooling off periods of the tire 34), for example in the form of histograms or in any other suitable format, and cumulative hours of operation of the vehicle 12;

Distance travelled by the vehicle 12, including cumulative distance travelled by the vehicle 12 and distance history data (i.e., vehicle distance travelled=f (time) data) for example in the form of histograms (e.g., distribution of distance travelled per run, etc.) or in any other suitable format;

Distance travelled by any one of the wheel assemblies 20, including cumulative distance travelled by the wheel assembly 20 and distance history data (i.e., wheel assembly distance travelled=f (time) data);

Speed of the vehicle 12, including cumulative speed of the vehicle 12 and speed history data of the vehicle 12 (i.e., vehicle speed=f (time) data) as well as zero-speed data (i.e., resting periods of the vehicle 12), for example in the form of histograms or in any other suitable format;

Speed and acceleration of any one of the wheel assembly 20 (including the wheel 32 and the tire 34), including speed and acceleration history data of the wheel assembly 20 (i.e., wheel assembly speed/acceleration=f (time) data);

Running hours of the wheel assembly 20, including cumulative running hours, cumulative run count and running hours history data (i.e., run count=f (time) data);

Temperature of the wheel assembly 20 and/or the tire 34, including temperature history data (i.e., temperature wheel assembly/tire=f (time) data);

Pressure at the interface between the wheel 32 and the tire 34, including pressure history data (i.e., pressure=f (time) data);

Load on the wheel assembly 20, i.e. on the tire 34, including load history data of the wheel assembly 20, for example in the form of histograms or in any other suitable format;

a vibration of the wheel assembly 20, including vibration history data (i.e., vibration=f (time) data);

Distribution date/time of the wheel assembly 20;

Disposal date/time of the wheel assembly 20; and

Intensity data of the wheel assembly 20, which is representative of how the wheel assembly 20 (i.e., the tire 34) responds and/or reacts to the particular application of the vehicle 12, the intensity data being derived at least in part based on the speed history data of the wheel assembly 20 and the idle/standstill time history data of the vehicle 12. In other examples, the intensity data may be further derived at least in part based on the load history data of the wheel assembly 20.

The vehicle information 95 may be linked to a particular wheel assembly 20 and/or tire 34 via the identification information 86 obtained at step 1730. However, in some examples the obtaining of identification information at step 1720 may be optional—that is, in these examples, the deriving of the vehicle information 95 at step 1730 may be performed solely on the basis of the sensor information obtained at step 1710.

In one example, the vehicle information 95 as described above may be stored in a database at the level of the wheel assembly sensor 90, at the level of the communication device 122 or at level of the remote computer 140. To this end, when the vehicle information 95 is derived at the level of the wheel assembly sensor 90 (rather than the communication device 122), the vehicle information 95 may be stored directly at the level of the wheel assembly sensor 90 or it may be communicated to the communication device 122 at any suitable time interval, for example once a week, once every two days, once a day and in some cases even less. Similarly, when the vehicle information 95 is derived at the level of the communication device 122 (rather than the remote computer 140), the vehicle information 95 may be stored directly at the level of the communication device 122 or it may be communicated to the remote computer 140 periodically at any suitable time interval, for example once a week, once every two days, once a day and in some cases even less via the communication link 128 and the network 150. The vehicle information 95 may be readily accessed, notably via the communication device 122, to be presented to a user via any suitable display device such as but not limited to the display device 160 and in any suitable manner.

It will be readily appreciated that the informational content of the vehicle information 95 may be optimized to facilitate its transfer and/or storage at the level of either one of the wheel assembly sensor 90, the communication device 122 or the remote computer 140. For example, the generation of histograms representative of the standstill time history data of the vehicle 12, the speed history data of the vehicle 12, the distance history of the vehicle 12, the load history data of the wheel assembly 20 and the likes may enable a reduction in the overall size of the data to be transferred, for example from the wheel assembly sensor 90 to the communication device 122, or from the communication device 122 to the remote computer 140, such that any transfer of data does not involve a full data set of "raw" data as acquired by the wheel assembly sensor 90. As such, once the histograms above have been generated the "raw" data may be deleted, either at the level of the wheel assembly sensor 90, the communication device 122 or the remote computer 140. The reduction in the overall size of the data to be transferred in turns minimizes risks of interruption of the transfer and/or corruption of any subset of the data during transfer. Similarly, the reduction in the overall size of the data also facilitate its storage, either at the level of the wheel assembly sensor 90, of the communication device 122 or of the remote computer 140 as well as the power management of either one of the wheel assembly sensor 90, the communication device 122 and the remote computer 140.

In one example, the app installed on the communication device 122 may be configured to generate an interactive graphical user interface (i.e., "GUI") on the display device that enables the user to access the vehicle data 95, and present the vehicle data 95 via the display device 160, in any suitable manner. Because the vehicle information 95 may be stored in the database, the user may have access via the app to historical data regarding the wheel assembly 20, that is any vehicle information 95 that has been acquired and obtained by the communication device 122 since the installation of the wheel assembly 20 on the vehicle 12 and the acquisition of wheel assembly sensor information 84 and optionally tag information 86 by the wheel assembly sensor 90 and the tag 130, respectively.

The presentation of the vehicle information 95 to the user via the display device 160 (e.g., at the level of the communication device 122) may be indicative of how the vehicle 12 including the wheel assembly 20 is used (e.g., the duty cycle of the vehicle 12 and/or the wheel assembly 20), the state (e.g., the degree of wear) of the wheel assembly 20, loading and shocks on the wheel assembly 20, and/or the state of the environment (e.g., the environmental temperature, the profile, compliance, or other condition of the underlying surface beneath the wheel assembly 20), and which may be, for example, conveyed to a user (e.g., the operator of the vehicle), transmitted to a remote party (e.g., a provider such as a manufacturer or distributor of the wheel assembly 20 and/or of the vehicle 12), and/or used to control the vehicle 12 (e.g., the speed of the vehicle 12). This may improve use, maintenance, safety and/or other aspects of the vehicle 12, including the wheel assemblies 20.

Wear of the Wheel Assembly 20 (e.g., the Tire 34)

Figure 18:
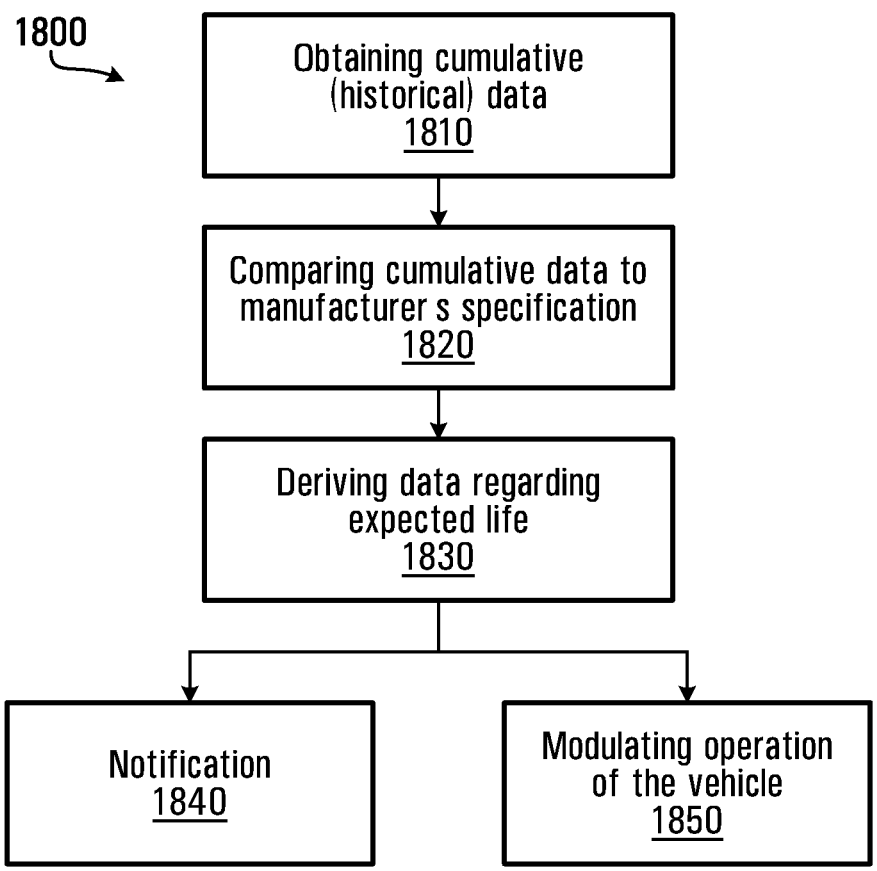
FIG. 18 is a process for determining wear of the wheel assembly based on a historical data regarding the wheel assembly in accordance with an embodiment.

The wear of the wheel assembly 20, specifically the wear of the tire 34 may be assessed in a number of ways. In one embodiment, with further reference to FIG. 18, the wear of the tire 34 may be assessed by obtaining vehicle data 95 relating to cumulative distance travelled by the wheel assembly 20 at step 1810, i.e. by the tire 34, comparing the cumulative distance travelled by the wheel assembly 20 with an expected total distance that can be travelled by the wheel assembly 20 (for example, according to specifications from the manufacturer of the tire 34) at step 1820 and then using a difference between the cumulative distance travelled by the wheel assembly 20 and the expected total distance that can be travelled by the wheel assembly 20 at step 1830 to derive an expected remaining distance to be travelled by the wheel assembly 20 (for example, based on the manufacturer's specifications of the tire 34), after which the tire 34 may be changed (e.g., by substituting the worn tire 34 for a new tire 34) to ensure safety during operation of the vehicle 12. It will be readily appreciated that, in this example, further additional information may be needed to derive the expected remaining distance to be travelled by the wheel assembly 20, such as but not limited to the load of the wheel assembly 20, the condition of the underlying surface 15, variations in terms of an average distance travelled per day and the likes. In this example, this information derived at step 1830 may be provided to the user via the display device 160 at step 1840 and may be used by the user to schedule and/or plan, for example, maintenance operations for the wheel assembly 20. When the cumulative distance travelled by the wheel assembly 20 has exceeded the expected total distance that can be travelled by the wheel assembly 20, a notification may also be sent to the user at step 1840, for example via the display device 160, to the effect that the tire 34 may be changed and substituted for a new tire 34. This information may also be provided to a manufacturer and/or a distributor of the tire 34, for example to assess whether the tire 34 operates according to pre-determined specifications.

Based on the expected remaining distance to be travelled by the wheel assembly 20 derived as described above, in other examples, additional information may be provided to the user, still at step 1840, via the display device 160 regarding a mode of operation of the vehicle 12 that could extend or otherwise improve the expected remaining distance to be travelled by the wheel assembly 20. For example, based on the speed and acceleration history data of the wheel assembly 20 and/or the vehicle 12, it may be determined that operating the vehicle 12 such that the speed and/or acceleration of the wheel assembly 20 and/or the vehicle 12 does not exceed a prescribed threshold will increase the expected remaining distance to be travelled by the wheel assembly 20. As such, a notification may be sent to the user, at step 1840, to the effect that the vehicle 12 may not be operated above the prescribed threshold of speed and/or acceleration and/or load. Alternatively, in embodiments where the processing apparatus 120 is connected to a control system (e.g., an ECU or other controller of the powertrain) of the vehicle 12, the processing apparatus 120 may also generate control signals that are communicated to the prime mover to modulate the operation of the vehicle 12 at step 1850, for example via a limit in terms of the speed and/or acceleration of the wheel assembly 20 and/or the vehicle 12, such that the expected remaining distance to be travelled by the wheel assembly 20 may be improved or increased. Any other suitable way of estimating the wear of the wheel assembly 20, as well as monitor and/or control the maintenance and/or the use of the vehicle 12 on the basis of the vehicle information 95 derived at step 1730 may be possible in other examples. That is, while in the example above the cumulative distance travelled by the wheel assembly 20 was used, any other subset of the vehicle information 95 may be used, separately or concurrently, in other examples (e.g. date/time of installation of the wheel assembly 20, cumulative running hours of the wheel assembly 20, acceleration history data of the wheel assembly 20, etc.).

Figure 19:
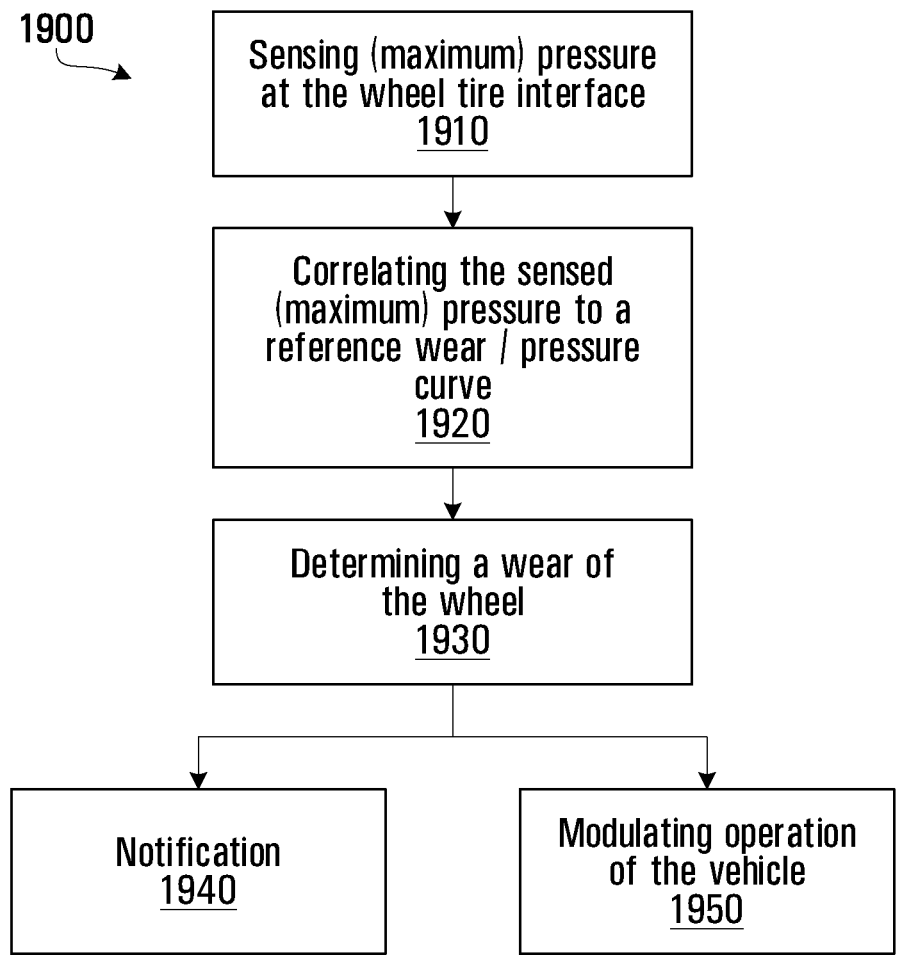
FIG. 19 is a process for determining wear of the wheel assembly based on a pressure at a wheel/tire interface in accordance with an embodiment.
Figure 20A:
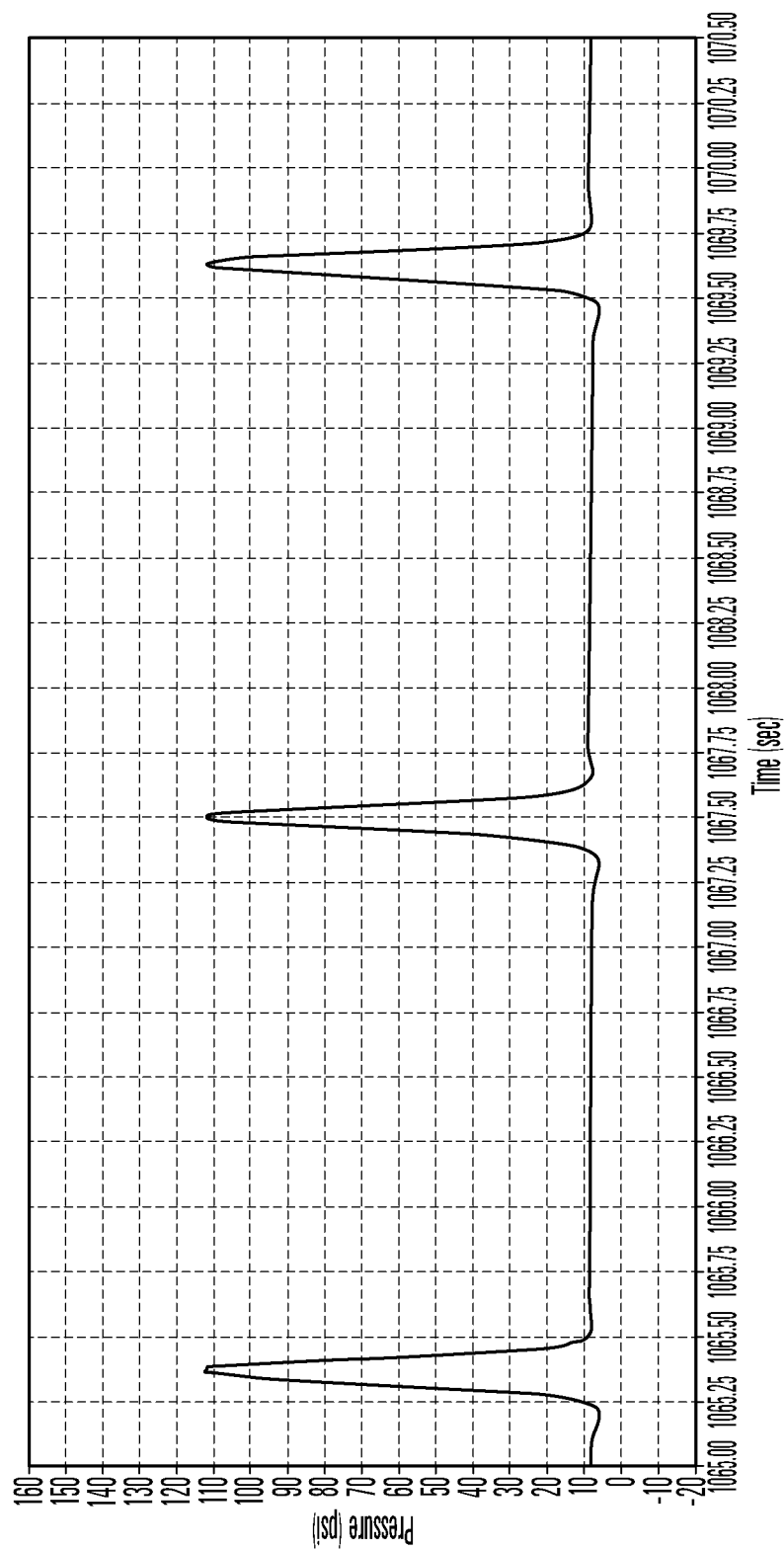
FIG. 20a is a plot of pressure=f (time) as measured by the sensor of FIG. 10 in the process of FIG. 19.

With further reference to FIG. 19, another embodiment of a process 1900 for deriving and/or estimating wear of the wheel assembly 20 (i.e., of the tire 34) is shown. Without wishing to be bound by theory, as the tire 34 wears, there is less elastomeric material of the tire 34 to deform under load from the vehicle 12, such that the pressure at the interface between the wheel body 32 and the tire 34 increases as the amount of elastomeric material of the tire 34 decreases. It is therefore possible to correlate the pressure measured at the interface between the wheel 32 and the tire 34 to the outer diameter $D_T$ of the tire, and ultimately to the wear of the tire 34. As such, in a first step 1910, the pressure at the interface between the wheel 32 and the tire 34 is measured, with an exemplary graph of pressure=f (time) shown in FIG. 20a. It will be readily appreciated that, since the pressure exerted onto the tire 34, specifically onto the outer surface 37/tread 40 of the tire 34, is detected as it is exerted substantially along the radial direction corresponding to that of the pressure transducer (or other type of sensing device capable of sensing pressure), as described above, the detection of the pressure by the pressure transducer is periodic as the tire 34 rolls on the underlying surface 15, as shown in FIG. 20a, the period being correlated to the speed of the wheel assembly 20 and/or the vehicle 12. Also, the pressure measured during each period exhibits a pressure peak, as shown in FIG. 20a, that corresponds to an angle of about 0° between the radial direction corresponding to that of the pressure transducer at the interface between the rim 45 and the tire 34 and the normal of the force exerted onto the outer surface 37/tread 40 of the tire 34.

Figure 20B:
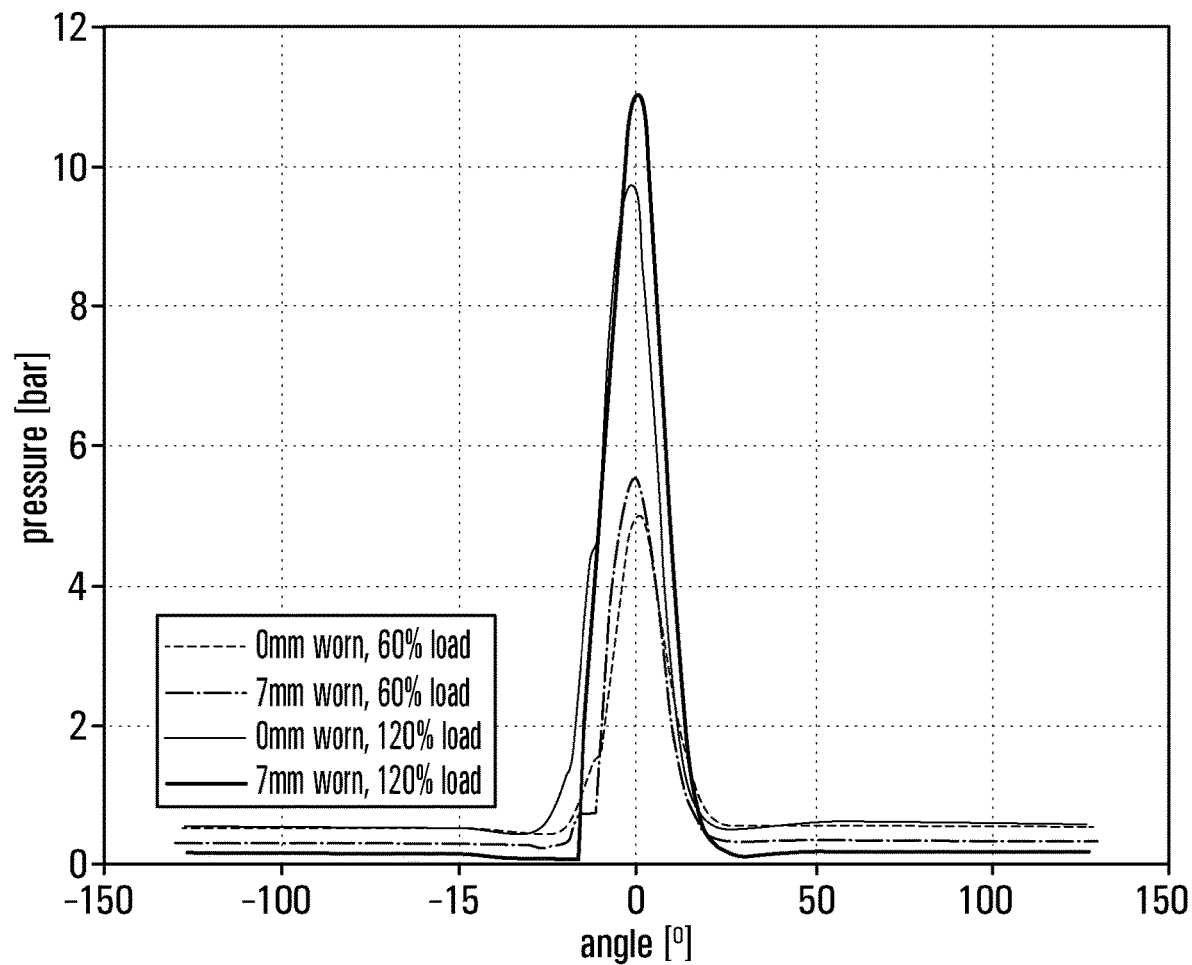
FIG. 20b is a plot of pressure=f (angle between radial direction of the pressure transducer and normal of the force exerted onto the tire) as measured by the sensor of FIG. 10 in the process of FIG. 19.

At step 1920, the pressure measured by the pressure transducer is correlated to a reference pressure. For example, it may be known that when the tire 34 shows no wear (i.e., is new), the maximum pressure at the interface between the rim 45 and the tire 34 using the vehicle 12 at a prescribed load may be a maximum pressure $P_0$. The deviation between $P_0$ and the (maximum) pressure measured at step 1910 may then be used to determine the wear of the wheel assembly 20 at step 1930 (with the vehicle 12 at the same prescribed load). For example, with further reference to FIG. 20b, it can be shown that a new tire 34 (i.e., exhibiting no wear, i.e. no loss of elastomeric material) experiences a maximum pressure $P_{0a}$ at a first load of 60% and a maximum pressure $P_{0b}$ at a load of 120%, while the maximum pressure at the two loads is in each case higher when the tire exhibits wear. In the example of FIG. 20b, a wear of 7 mm (i.e., a loss of elastomeric material corresponding to a decrease of about 7 mm in the outer diameter $D_T$ of the tire) translates into an increase in the measured maximum pressure of about 10% at 60% load and of about 10% at 120% load when compared to the maximum pressure $P_{0a}$ and $P_{0b}$ at the prescribed load. Using this information, it may therefore be possible to derive a specific decrease of the outer diameter $D_T$ of the tire 34 based on the maximum pressure measured at step 1910— assuming a linear relationship between the increase of the measured maximum pressure and the decrease of the outer diameter $D_T$ of the tire 34, in the example above an increase in the measured maximum pressure of about 5% would translate in an estimated wear of the wheel assembly 20 of about 3.5 mm (i.e., about 50% of the wear observed with the increase in the measured maximum pressure of about 10%). However, the relationship between the increase of the measured maximum pressure and the decrease of the outer diameter $D_T$ of the tire 34 may not be linear, for example depending on a tread pattern of the tread 40, the elastomeric material that constitutes the tire 34 and the likes. Much like in the example of FIG. 18, the user may then be notified at step 1940 or the operation of the vehicle 12 may be modulated at step 1950 (for example, based on the wheel assembly 20 and/or vehicle 12 speed/acceleration data) such that the wear of the wheel assembly 20 may be limited after the implementation of the modulation. While in the example above the (maximum) pressure is measured at step 1910 and then used at step 1920 to determine a wear of the tire at step 1930, any other suitable pressure-derived data may be used in other examples to derive a wear of the wheel assembly 20 at step 1930. For example, a width of a pressure peak as shown in FIGS. 20A and B, as well as the surface area under the pressure peak may be used. In yet further examples, an entire data set of pressure data (i.e., comprising all data acquired by the sensing device 92, i.e. within a pressure peak and outside the pressure peak) may be used to derive a wear of the wheel assembly 20 at step 1930.

In yet further examples, the wear of the wheel assembly 20 may be assessed on the basis of the pressure history data (at a prescribed load) at the interface between the wheel 32 and the tire 34. In the context of the vehicle 12 being operated in a warehouse, the average distance travelled by the wheel assembly 20 over the course of a prescribed unit time period (e.g., 12 hours, 1 day, 7 days, etc.) may be identical, or substantially identical, over the entire cumulative distance travelled by the wheel assembly 20. Yet, as the wear of the wheel assembly 20 increases (i.e., as the elastomeric material of the tire 34 deteriorates), the pressure at the interface between the wheel 32 and the tire 34 increases (at the prescribed load). Similarly, as the wear of the wheel assembly 20 increases (i.e., as the elastomeric material of the tire 34 deteriorates), the number of revolutions of the wheel assembly 20 to cover a unit distance increases. The generation of histograms representative of the pressure history data and/or the distance history data over the course of the prescribed unit time periods may therefore be used to determine the wear of the wheel assembly 20, i.e. of the tire 34.

Figure 21:
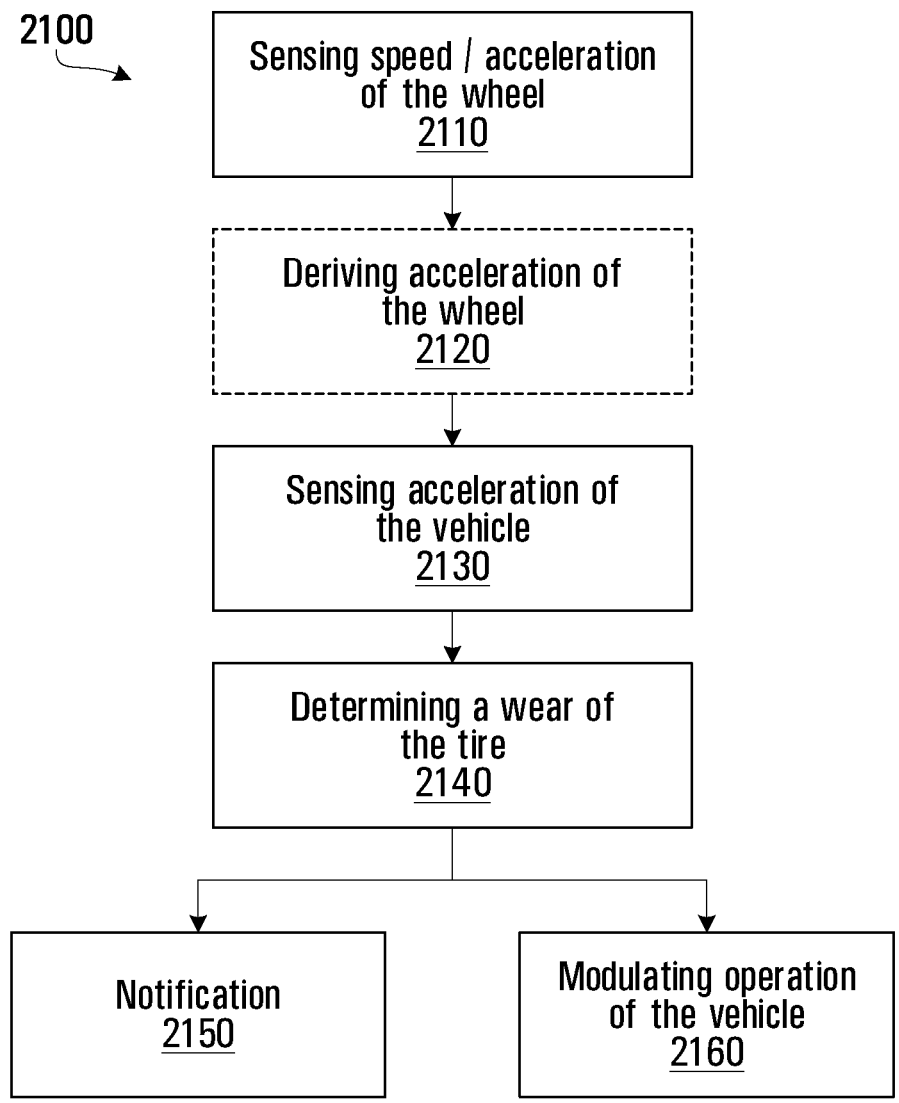
FIG. 21 is a process for determining wear of the tire based on a comparison between an acceleration of the wheel assembly and an acceleration of the vehicle in accordance with an embodiment.

With further reference to FIG. 21, another embodiment of a process 2100 for assessing the wear of the wheel assembly 20 is shown. In this embodiment, the monitoring system 10 assesses the wear of the wheel assembly 20 at least in part based on the vehicle information 95 that is acquired by the sensing device 91 of the vehicle sensor 129, for example the speed and/or acceleration of the vehicle 12, as further described below. Without wishing to be bound by theory, as the outer diameter $D_T$ of the tire 34 decreases when the tire 34 experiences wear as it rolls on the underlying surface 15 (i.e., there is degradation of the elastomeric material of the tire 34), the rotational (or angular) speed of the tire 34 $v_t$ increases even though the velocity of the vehicle $v_v$ remains the same (i.e., the tire 34 has to undergo more rotations for the vehicle 12 to travel a pre-determined distance). The corollary is that the acceleration of the vehicle $a_v$ remains the same, however the acceleration of the wheel assembly 20 $a_w$ increases. As such, it is possible to correlate a decrease in the acceleration of the vehicle 12 $a_v$ relative to the acceleration of the wheel assembly 20 $a_w$ with an increase in the wear of the wheel assembly 20. The ratio of the acceleration of the vehicle $a_v$ to the acceleration of the wheel assembly 20 $a_w$ is therefore a function of the wear of the wheel assembly 20. Without wishing to be bound by theory, as the acceleration $a_v$ of the vehicle 12 is generally independent from the outer diameter $D_T$ of the tire 34, this means that to maintain the same acceleration $a_v$ of the vehicle 12 the acceleration of the wheel assembly 20 $a_w$ should increase as the wear of the wheel assembly 20 increases.

As such, in a first step 2110, the rotational speed (and/or acceleration in other examples) of the wheel assembly 20 is measured by the sensing device 92. Where applicable, the rotational acceleration of the wheel assembly 20 is optionally derived at step 2120 (for example, when the sensing device 92 measures the rotational speed of the wheel assembly 20) and the vehicle information 95, specifically the acceleration of the vehicle 12, is then measured by the sensing device 91 at step 2130. At step 2140, the wear of the wheel assembly 20 is determined by correlating the acceleration of the wheel assembly 20 with that of the vehicle 12, with an increase in the acceleration of the wheel assembly 20 relative to the acceleration of the vehicle $a_v$ being correlatable with an increase in the wear of the wheel assembly 20. The determination of the wear of the wheel assembly 20 may be performed directly at the level of the processing apparatus 120, however it may also be performed at the level of the remote computer 140 in other examples. Much like in the example of FIGS. 18 and 19, the user may then be notified at step 2150 or the operation of the vehicle 12 may be modulated at step 2160 such that the wear of the wheel assembly 20 may be limited after the implementation of the modulation.

In yet further examples, the wear of the wheel assembly 20 may be assessed on the basis of the rotational acceleration history data and/or the distance history data of the wheel assembly 20. In the context of the vehicle 12 being operated in a warehouse, the average distance travelled by the wheel assembly 20 over the course of a prescribed unit time period (e.g., 12 hours, 1 day, 7 days, etc.) may be identical, or substantially identical, over the entire cumulative distance travelled by the wheel assembly 20. Yet, as the wear of the wheel assembly 20 increases (i.e., as the elastomeric material of the tire 34 deteriorates), the rotational acceleration of the wheel assembly 20 increases. Similarly, as the wear of the wheel assembly 20 increases (i.e., as the elastomeric material of the tire 34 deteriorates), the number of revolutions of the wheel assembly 20 to cover a unit distance increases. The generation of histograms representative of the rotational acceleration history data over the course of the prescribed unit time periods may therefore be used to determine the wear of the wheel assembly 20.

In yet further examples, the wear of the wheel assembly 20 may be assessed by computing a ratio of the revolution speed of the wheel assembly 20 to that of another one of the wheel assembly 20 of the vehicle 12. In the instance in which the vehicle 12 comprises at least a front wheel assembly and a rear wheel assembly, the front wheel assembly being a driving wheel assembly and the rear wheel assembly being a free-rolling wheel assembly, the wear of the rear free-rolling wheel assembly may be estimated by computing the ratio of the revolution speed of the front and rear wheel assemblies. In some cases, the revolution speed of the front and rear wheel assemblies is a maximum revolution speed of the front and rear wheel assemblies. In other cases, the revolution speed of the front and rear wheel assemblies is a first percentile of revolution speed of the front and rear wheel assemblies, the first percentile being in some cases a $50^{th}$ percentile, in some cases a $55^{th}$ percentile, in some cases a $60^{th}$ percentile, in some cases a $65^{th}$ percentile, in some cases a $70^{th}$ percentile, in some cases a $75^{th}$ percentile, in some cases a $80^{th}$ percentile, in some cases a $85^{th}$ percentile, in some cases a $90^{th}$ percentile, in some cases a $95^{th}$ percentile and in some cases even more.

In yet further examples, the wear of the wheel assembly 20 may be assessed on the basis of the acceleration $a_v$ of the vehicle 12 that is acquired via the vehicle sensor 129. Without wishing to be bound by theory, as the tire 34 wears down both the speed $v_v$ and the acceleration $a_v$ of the vehicle 12 decrease in a manner that is proportional to a reduction of the circumference of the tire 34. In other words, a vehicle with "new" tires 34 exhibits higher speed and acceleration compared to a vehicle with "worn" tires 34.

Figure 31A:
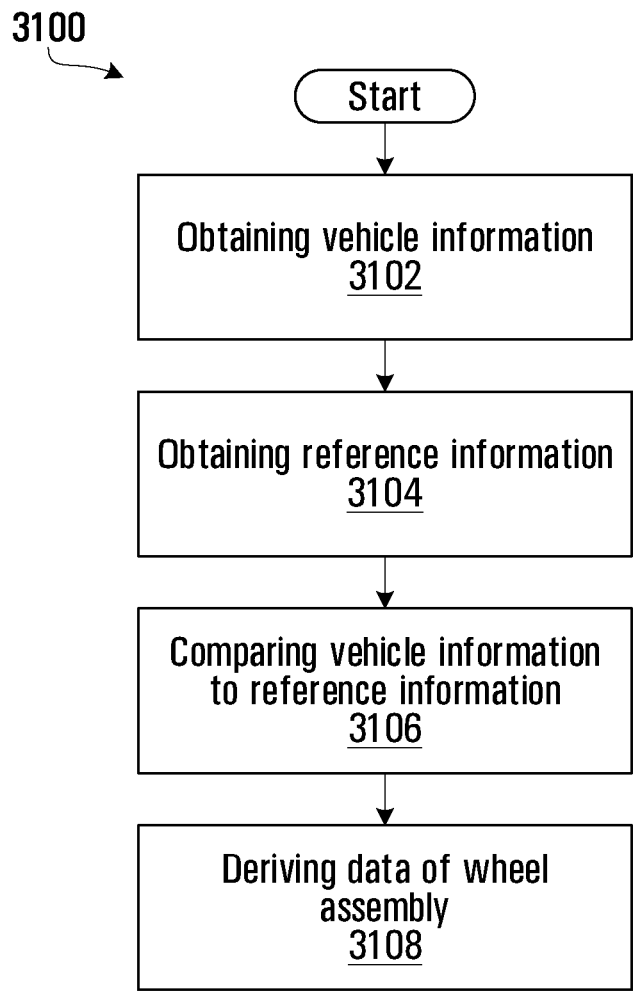
FIG. 31A is a process for determining wear of a wheel assembly in accordance with an embodiment.

An embodiment of a process 3100 for measuring wear of the wheel assembly 20 (e.g., the tire 34) using the acceleration $a_v$ of the vehicle 12 is shown in FIG. 31A. In a first step 3102, the monitoring system 10, specifically the processing apparatus 120, obtains the vehicle information 95. In some examples, the vehicle information 95 obtained may be the acceleration $a_v$ of the vehicle 12 and the vehicle information 95 may have been obtained at a suitable time interval, for example as described above in relation to the process 3000.

In a second step 3104, reference information is obtained. Reference information refers to a type of vehicle information 95 in which the vehicle 12 is the same as the vehicle 12 for which the vehicle information 95 is obtained at step 3102. The reference information also refers to vehicle information 95 regarding a vehicle similar to the one for which the vehicle information 95 is being obtained (e.g., a forklift), with new, i.e. unworn, wheel assemblies 20 (e.g., new, unworn tires 34) and that is operated in a manner that is generally similar to that of the vehicle for which the vehicle information 95 is being obtained at step 3102, as further described below. In some examples, where the vehicle 12 is a forklift used to move equipment between two locations of a warehouse along a generally linear path, the reference information may preferably refer to vehicle information 95 for a forklift with new, i.e. unworn wheel assemblies and that is also generally used to carry similar equipment along a generally linear path.

The reference information 95 for the vehicle 12 may be generated in a number of ways. In one example, the acceleration $a_v$ of the vehicle 12 may be acquired in the driving direction of the vehicle 12, and a threshold may be set such that the acceleration $a_v$ of the vehicle is recorded only when the measured acceleration $a_v$ remains above a pre-determined threshold for a prescribed amount of time, for example at least about 0.3 s, in some cases at least about 0.4 s, in some cases at least about 0.5 s, in some cases at least about 0.6 s, in some cases at least about 0.7 s, in some cases at least about 0.8 s, in some cases at least about 0.9 s, in some cases at least about 1 s, in some cases at least about 2 s, in some cases at least about 3 s, in some cases at least about 4 s, in some cases at least about 5 s and in some cases even more. This ensures for example that fluctuations in the acceleration $a_v$ of the vehicle are not recorded. Another threshold may also be set such that the acceleration $a_v$ of the vehicle 12 is recorded only when the measured acceleration $a_v$ occurs at a prescribed amount of time from an event, for example at least about 0.3 s from the event, in some cases at least about 0.4 s from the event, in some cases at least about 0.5 s from the event, in some cases at least about 0.6 s from the event, in some cases at least about 0.7 s from the event, in some cases at least about 0.8 s from the event, in some cases at least about 0.9 s from the event, in some cases at least about 1 s from the event and in some cases even more. This ensures for example that "false" acceleration periods (which are too close temporally from the event) are not considered. The acceleration $a_v$ recorded in this manner is recorded in a reference database, for example on the remote computer 140, and constitutes the reference information that is associated to the vehicle 12. In other words, at least some of the data acquired by the vehicle sensor 129 is gradually saved in the reference database as the reference information, for as long as it meets the thresholding criteria defined above and the additional criteria further described below. The reference database may also include, for a set of vehicle acceleration data, information regarding the usage of the vehicle 12 for which the vehicle acceleration $a_v$ has been measured, such as but not limited to the type of vehicle, the load (if applicable), etc. In some examples, the size of the reference database may also be managed so as to ensure a suitable calculation speed at step 3106, as further discussed below.

As further acceleration data is acquired by the vehicle sensor 129 over time and meets the thresholding criteria defined above, the reference database may be complemented with this further acceleration data, at which point a decision needs to be made as to whether the further acceleration data is to complement and/or refine the reference information. To this end, in one embodiment the further acceleration data measured can be normalized and integrated and the resulting speed increase correlated against the acceleration and speed increase data from the reference database (i.e., the reference information). When the correlation is lower than a prescribed threshold value, the further acceleration data may be added to the reference information in the reference database. In other embodiments, the average acceleration over a prescribed time period or machine learning and support vector machines may be used to determine whether the further acceleration data may be added to the reference information. It will be readily appreciated that acceleration data representative of events appearing more frequently (for example when the vehicle 12 repeats the same pattern over time) may be prioritized in the reference database. This also ensures that as the usage of the vehicle 12 is modified and/or evolves over time, and consequently as the nature and type of events appearing during the usage of the vehicle 12 more frequently changes, the reference information will be modified and/or updated accordingly.

For example, as a change in the load of the vehicle 12 may influence the acceleration $a_v$ of the vehicle 12, the reference information may need to be re-assessed on a regular basis. To this end, the reference information stored in the reference database may include distinct subsets of reference information, for example an "older" relating to the usage of the vehicle 12 with a first load, and another "more recent" subset relating to the usage of the vehicle 12 with a second load. It will be readily appreciated that in this example the second subset of the reference information may be preferred at step 3106 when the vehicle information 95 is compared to the reference information as it may be more representative of the current usage of the vehicle 12. As the size and the variety of the reference information increases over time, the reliability of the reference information is not compromised even as the application/use of the vehicle 12 or the driver of the vehicle 12 changes.

In another example, the acceleration data acquired by the vehicle sensing device 129 may exhibit a profile substantially similar to that of the reference information, however the magnitude of the acceleration data between both may be different. In this example, it may be useful (a) to consider the largest acceleration values within the shortest time scale and (b) to include in the reference information a prescribed time period of acceleration data before and after the largest acceleration values. Without wishing to be bound by theory, given that it is more difficult to maintain a constant speed after the vehicle 12 has performed an acceleration to half its maximum speed compared to maintaining a constant (maximum) speed after the vehicle 12 has performed a full acceleration to its maximum speed, using this additional acceleration data before and after the largest acceleration values a difference may be made by the monitoring system 10 between profiles that are substantially similar but with distinct magnitudes of the acceleration data.

Figure 31B:
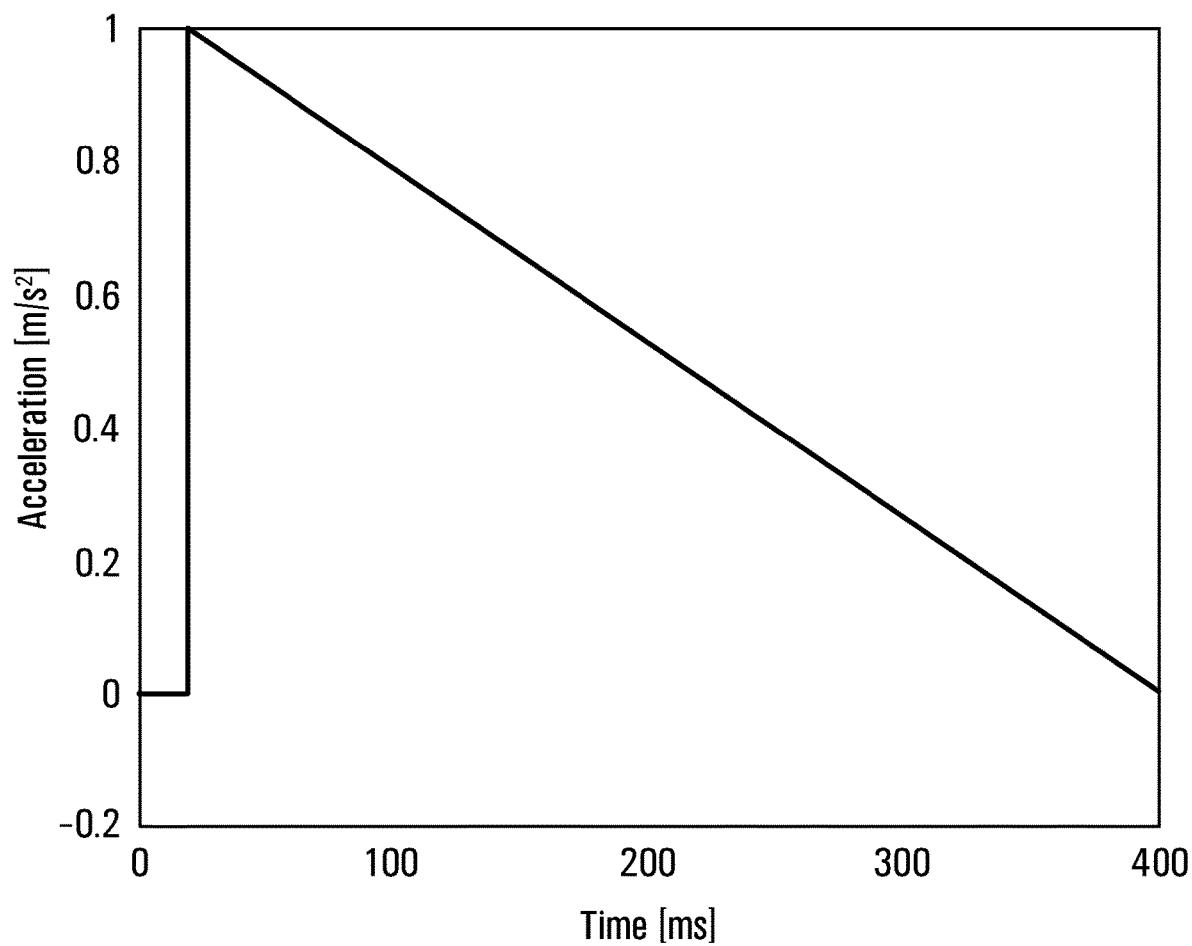
FIG. 31B is a plot of acceleration=f (time) for an acceleration event in accordance with an embodiment.

In yet another example, the reference information 95 may be generated without relying on any data acquired by the monitoring system 10. With further reference to FIG. 31B there is shown an exemplary plot of acceleration=f (time) that is generally representative of a "true" acceleration event and that can be used as the reference information 95 at step 3104. It will be readily appreciated that a variety of other suitable plots may be generated and used as reference information 95 in the process 3100 depending on the type of vehicle 12, the operation and usage of the vehicle 12 and the likes.

The acceleration data of the vehicle acquired by the vehicle sensor 129 is compared to the reference information at step 3106, as further described below.

At step 3106, the vehicle information 95 obtained at step 3102 and the reference information obtained at step 3104 are compared. The comparison can be done in a number of ways. For example, assuming the vehicle information 95 contains a first data set and that the reference information contains a second data set, a reference timeframe may first be identified between the first and the second data sets. This would ensure, for example, that the comparison between the first and the second data sets is done over a substantially identical time period and that the comparison begins with the same event (e.g., the vehicle 12 being set in motion). At step 3108, the wear of the wheel assembly 20 (e.g., the tire 34) may be derived by calculating a ratio (called an acceleration ratio) between the first and the second data sets which is generally representative of the wear of the wheel assembly 20. For example, the acceleration ratio may be calculated by performing a linear regression of the first data set versus the second data set. The closer the ratio is to 1, the closer is the data from the first data set to the data from the second data set and therefore the closer is the wheel assembly 20 to a new, unworn wheel assembly. As the acceleration ratio deviates from 1, and assuming a linear relationship between the decrease of the diameter of the tire 34 and the acceleration $a_v$ of the vehicle 12, the wear of the wheel assembly can be estimated. For example, an acceleration ratio of about 0.9 means that the wheel assembly 20 has experienced a wear of about 10% of its diameter compared to a new, unworn wear assembly. It will be readily appreciated that the acceleration data that is being compared at step 3106 can include an average of acceleration data over a prescribed period of time, as well as an integral of the acceleration data over time. The wear of the wheel assembly 20 (e.g., the tire 34) may also be derived in any suitable other suitable manner at step 3108, for example by comparing the acceleration data between the reference information and the vehicle information over a prescribed period of time.

Figure 32A:
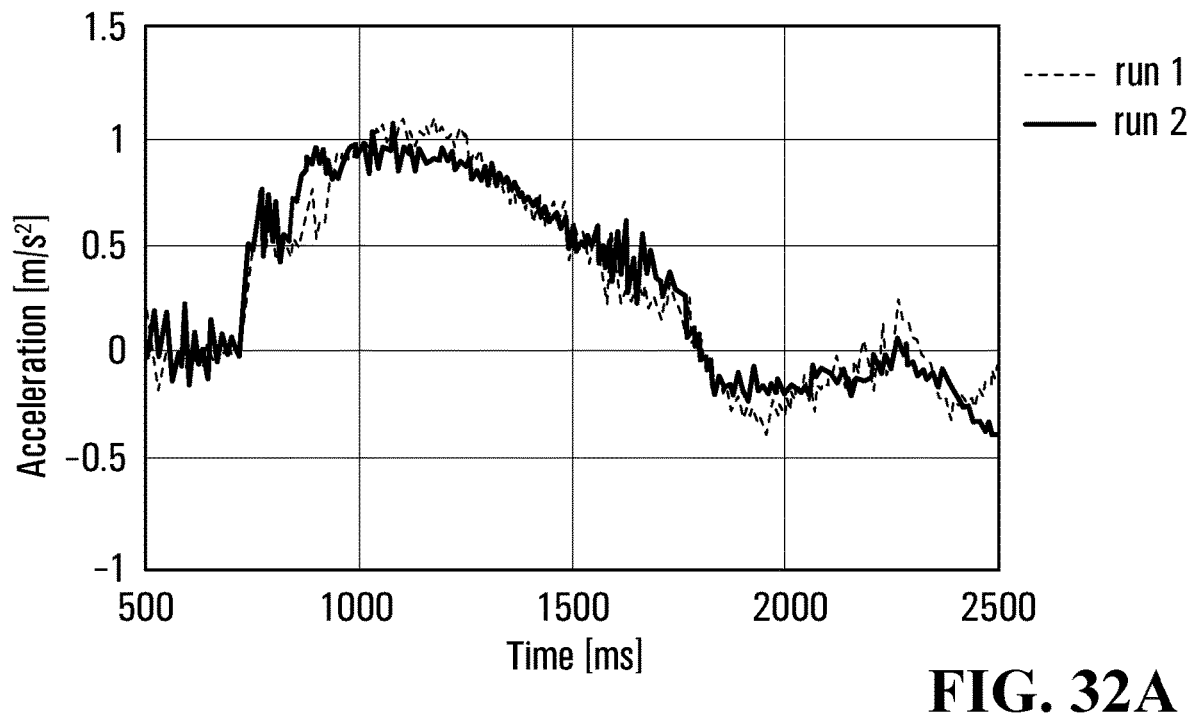
FIG. 32a is a plot of acceleration=f (time) for two runs as measured at a first time interval by the vehicle sensor of FIG. 28.
Figure 32B:
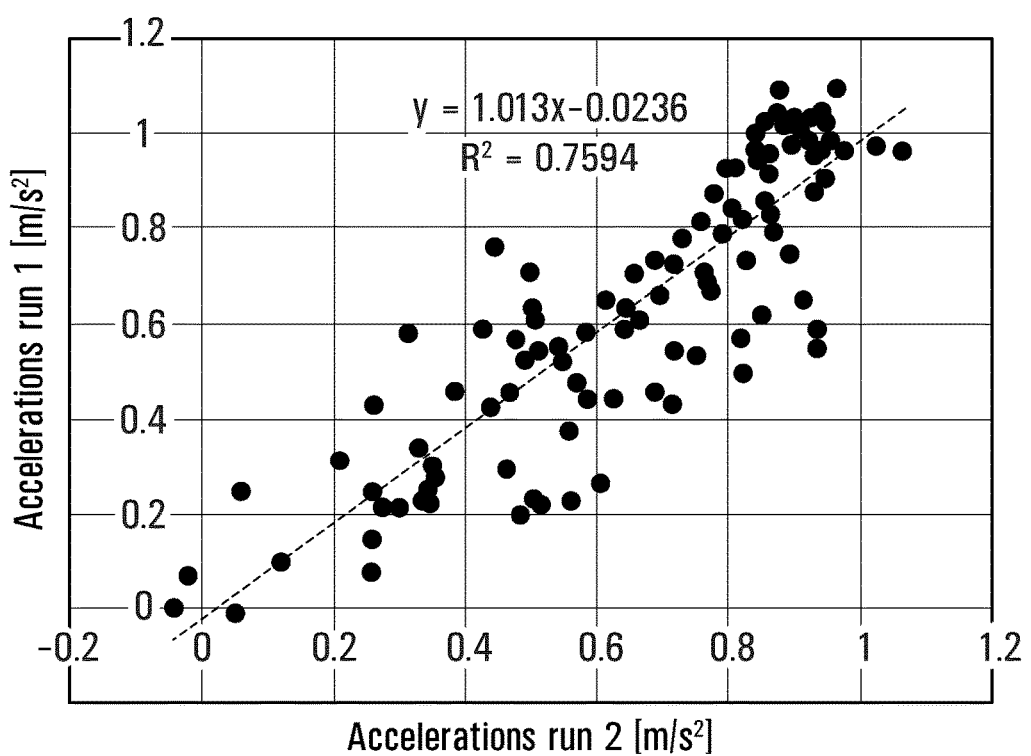
Figure 33A:
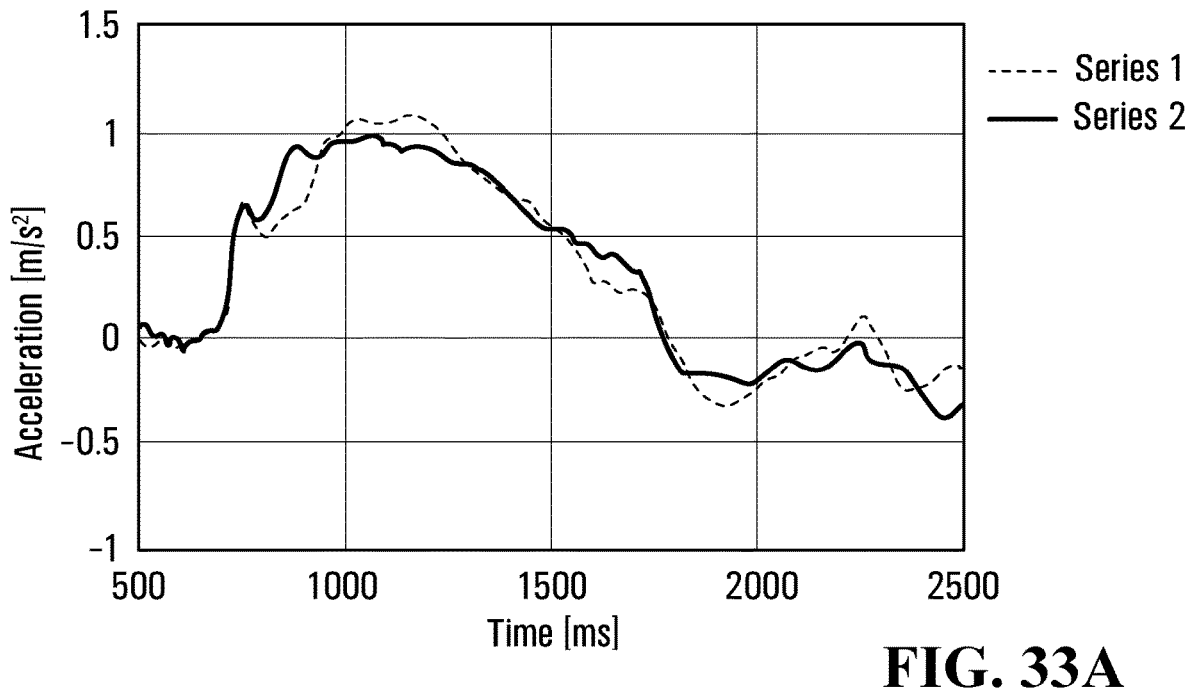
FIG. 33a is a plot of acceleration=f (time) for the two runs of FIG. 32a filtered at a second time interval.
Figure 33B:
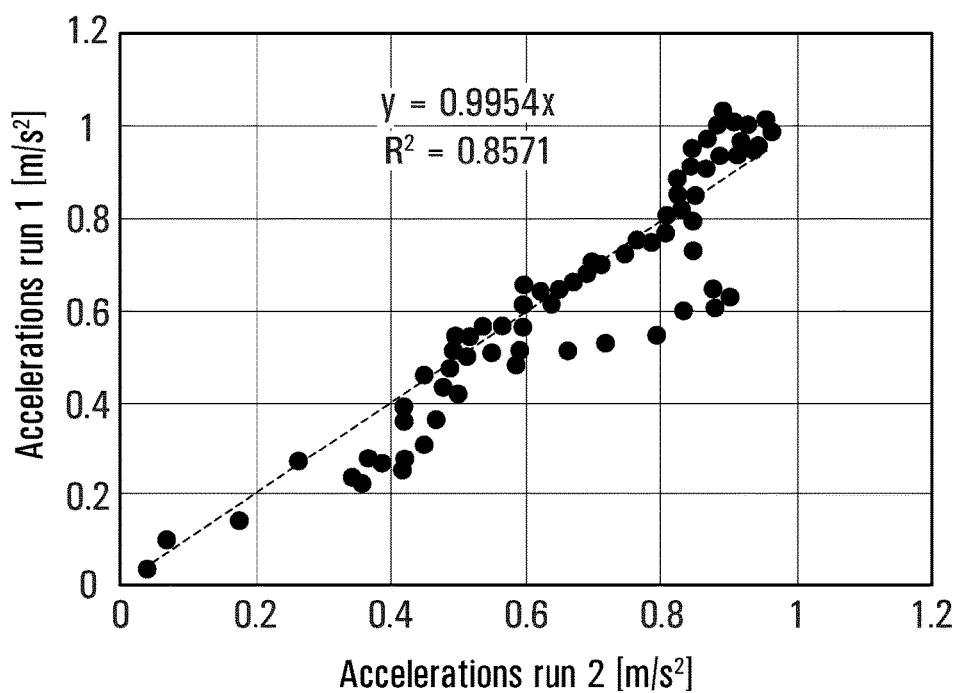

In one example, the acceleration of a vehicle was measured during the initial acceleration of the vehicle over two separate runs and the results are shown in FIG. 32A. The acceleration of the vehicle was measured at a time interval of about 10 ms—due to the granularity of the acceleration measurements this data set is considered "unfiltered" and therefore includes some noise. FIG. 32A shows that the vehicle begins to accelerate at about 700 ms and reaches a constant speed (i.e., the acceleration becomes generally null) at about 1700 ms—in other words, the vehicle reaches a constant speed over the course of about 1000 ms. A comparison of the acceleration data obtained for both runs between 700 ms and 1800 ms is shown in FIG. 32B. A good correlation is found between the acceleration data of the 2 runs (acceleration ratio of 1.013). A comparison of the filtered acceleration data obtained for both runs between 700 ms and 1800 ms is shown in FIG. 33B. The correlation found with the filtered acceleration data is better (acceleration ratio of 0.995) that with the unfiltered data.

It will be readily appreciated that the acceleration ratio may be used to assess the wear of driving wheel assemblies 20. In a hypothetical case in which the vehicle 12 comprises both driving (for example the front) and free-rolling (for example the rear) wheel assemblies and in which the driving wheel assembly experiences no substantial wear, the acceleration ratio may remain around 1, however the ratio of the maximum revolution speed of the driving and "free-rolling" wheel assemblies may change as the "free-rolling" wheel assembly experiences wear. In another hypothetical example in which the driving wheel assembly experiences substantial wear while the "free-rolling" wheel assembly experiences no substantial wear, the acceleration ratio may be substantially identical to the ratio of the maximum revolution speed of the front and rear wheel assemblies.

In another embodiment, the monitoring system 10 assesses the wear of the wheel assembly 20, specifically assesses the comparative wear of at least one front vs. at least one rear wheel assembly 20, at least in part based on the vehicle information 95 pertaining to the speed $v_v$ of the vehicle 12. A frequency analysis is performed on the subset of the speed data of the vehicle 12 that corresponds to temporal regions associated with constant speeds of the vehicle 12. A constant speed $v_v$ of the vehicle 12 may be defined in any suitable manner, for example the speed $v_v$ of the vehicle 12 may be constant when it does not change by more than about 0.1%, in some cases more than about 0.5%, in some cases more than about 1%, in some cases more than about 1.5%, in some cases more than about 2%, in some cases more than about 2.5%, in some cases more than about 5% and in some cases even more over a prescribed period of time. In the context of the vehicle 12 having at least one front and at least one rear wheel assembly 20, a deviation in the frequency analysis of the constant speeds performed over time (that is, performed over multiple instances of the vehicle 12 reaching a constant speed $v_v$) indicates that one of the at least one front and at least one rear wheel assembly 20 experiences more wear than the other. In this case, the deviation in the frequency analysis of the constant speeds can also be indicative of a reduction in the speed of the vehicle 12 $v_v$. When the vehicle 12 has front and rear wheel assemblies 20 having a tire 34 with a tread 40 of a known tread profile (e.g., number of blocks, etc.), the speed of the vehicle 12 can also be derived from the frequency analysis of the constant speeds of the vehicle 12.

In another embodiment, the monitoring system 10 may be used to assess a wear of the wheel assembly 20 through an assessment of a tilting of the vehicle 12 relative to the underlying surface 15. In this embodiment, the monitoring system acquires acceleration data during a "zero-speed" state of the vehicle 12, the "zero-speed" state being defined as a state during which the speed of the vehicle 12 $v_v$ is below a pre-determined threshold in the longitudinal, lateral and vertical directions of the vehicle 12 for a pre-determined time period. In other words, the "zero-speed" state corresponds to a state of "standstill" of the vehicle 12 and any acceleration measured during such state is representative of a tilting of the vehicle 12 relative to the underlying surface 15, specifically of an angle of the vehicle 12 relative to a horizontal plane (assuming that the underlying surface is generally horizontal). Without wishing to be bound by theory, it is believed that the angle of the vehicle 12 relative to the horizontal plane is a function of the slope of the underlying surface 15, the load of the vehicle 12 as well as the wear of the wheel assembly 20 (i.e., the wear of the tire 34). Over time, changes in the slope of the underlying surface 15 or the load of the vehicle 12, as the vehicle 12 is being used, are randomized (i.e., they may result in tilting of the vehicle 12 at various time points, however the tilting will not be constant over time and will not be in a single specific direction, but rather in a plurality of directions). Changes in the wear of the wheel assembly 20 over time will result in a tilting of the vehicle 12 in one specific direction, and therefore in an increase in the acceleration of the vehicle 12 in that specific direction over time during the "zero-speed" state. In this embodiment, the monitoring system 10 can derive a wear of the wheel assembly 20 based on the acceleration data acquired during the "zero-speed" state of the vehicle 12. In one example, the monitoring system 10 can derive a wear of the wheel assembly based on data representative of the tilting of the vehicle 12 in one specific direction, including data representative of an increase in the tilting of the vehicle 12 in one specific direction over time.

Load on the Wheel Assembly 20

In another embodiment, the monitoring system 10 may be used to assess a load on the wheel assembly 20. That is, in this example, instead of measuring and/or comparing pressure at the interface between the wheel 32 and the tire 34 at a prescribed load to assess wear, the pressure at the interface between the wheel 32 and the tire 34 may be measured and/or compared at a prescribed wear to assess load. As such, in this example, differences in measured pressure is representative of distinct loads on the wheel assembly 20.

Generally, variations in the wear of the wheel assembly 20 occur over extended periods of time (e.g., over several days, several weeks, several months, etc.), while variations in the load on the wheel assembly 20 occur over shorter periods of time (e.g., as the vehicle 12 is loaded/unloaded during use—over several minutes, several hours, etc.). As such, as the pressure data is acquired by the sensing device 92, the load on the wheel assembly 20 may be assessed on a first time scale during which the wear of the wheel assembly 20, i.e. the tire 34, does not change or does not substantially change, and the wear of the tire may be assessed on a second time scale which is greater than the first time scale and during which the wear of the wheel assembly 20, i.e. the tire 34, changes, while relying on the same pressure data being acquired over time. In other examples, instead of relying on pressure data, the load on the wheel device 20 may also be assessed based on deflection data acquired by an optical sensor, the deflection experienced by the wheel assembly 20, i.e. the tire 34, being correlatable to the load on the wheel assembly 20.

In another embodiment, the acceleration $a_v$ of the vehicle 12 may also be used by the monitoring system 10 to estimate the load on the wheel assembly 20 during operation of the vehicle 12. Without wishing to be bound by theory, the vehicle 12 (such as a forklift) shows Eigenfrequencies when excited dynamically, which is notably the case as the vehicle 12 is being driven. Those Eigenfrequencies are depending on the spring, damping and mass characteristics and as such a first shift in Eigenfrequencies over a prescribed period of time may be used to estimate the wear of the wheel assembly 20 (i.e., the tire 34), while a second shift may also be used to indicate the modification of the load of the vehicle 12 (i.e., the load on the wheel assembly 20). In one non-limiting example, the first shift may be observed at a frequency peak that is greater than a frequency peak at which the second shift is observed. It will be readily appreciated that, using Eigenfrequencies, the wear of the wheel assembly 20 and the load on the wheel assembly 20 can be estimated separately or concurrently. The Eigenfrequency is represented by the following formula:

$$f = \frac{1}{2\pi}\sqrt{\frac{k}{m}}$$

with k being the stiffness and m the mass. As an example, if the total mass of the vehicle 12 is increased by 25% as a result of an increase in the load transported by the vehicle 12, a shift of −10.5% in Eigenfrequencies may be expected in the short term.

Detecting Floor Conditions

In yet further embodiments, floor conditions may be assessed by the monitoring system 10. For example, the shocks and/or impacts experienced by the wheel assembly 20, as they could be measured by the pressure transducer in some examples, may also be used to derive data representative of the environment of the wheel assembly 20, specifically of the underlying surface 15. Alternatively, the shocks and/or impacts may be assessed based on acceleration data measured in the vertical direction by an accelerometer positioned on the wheel assembly 20 and/or on vehicle 12. It may be known that for a particular state of wear of the wheel assembly 20, a vertical shock experienced by the wheel assembly 20 (for example, an impact experienced by the wheel assembly 20 as the wheel assembly 20 encounters a rock or any other type of debris as it rolls on the underlying surface 15) of a prescribed magnitude may result in a 50% chance of crack failure of the wheel assembly 20, specifically of the tire 34. As such, the user may be notified by the monitoring system 10 when such shocks are encountered that a risk of crack failure of the wheel assembly 20 exists. In other examples, data related to vertical shocks experienced by the wheel assembly 20 may be used to derive information about the environment of the wheel assembly 20, for example the underlying surface 15 on which the wheel assembly rolls 20 (e.g., whether the vehicle 12 is operated indoor, outdoor, etc.).

Comfort Determination

In yet further embodiments, the monitoring system 10 may be used to estimate a comfort level experienced by the driver of the vehicle 12. Using the acceleration $a_v$ of the vehicle 12 acquired by the vehicle sensor 129, the ISO2631 filtering (or any other filtering suitable for comfort determination) may be implemented to estimate a vibration experienced by the vehicle 12 as well as monitor the influence of the wear of the wheel assembly 20 on the vibrations of the vehicle 12. Using the acceleration data, corrective actions may be taken when the wear assembly 20. For wheel assemblies 20 have a tire 34 with a clear tread profile, the initial appearance and later disappearance of tread pattern induced vibrations (at frequencies dictated by the tread pitch, with one frequency peak for the front tires and another frequency peak for the rear tires) may also be further used to confirm the wear level of the wheel assembly 20, specifically the tire 34.

Complete Indoor Tracking

In yet further embodiments, the monitoring system 10 comprising the IMU 109 may also be used as an indoor navigation system, in which case the trajectories and maneuvers of the vehicle 12 may be estimated via the IMU 109. The reliance on the data acquired by the IMU may also translate into less reliance on the data acquired by the wheel assembly sensor 90, and as such the wheel assembly sensor 90 may be reduced in both size and battery requirements. The IMU 09 may be used to estimate the trajectories and maneuvers of the vehicle 12 in a number of ways. In some examples, various machine learning algorithms may be used, such as but not limited to robust IMU double integration (RIDI), Robust Neural Inertial Navigation and the likes. Data gathered by the IMU 109 may also be used to estimate, for example, the curvature of the trajectories and the number of turns of the vehicle 12.

While in the embodiments considered above the vehicle 12 is a forklift, the monitoring system 10 may be used in respect of any other type of vehicle in other embodiments.

Figure 22:
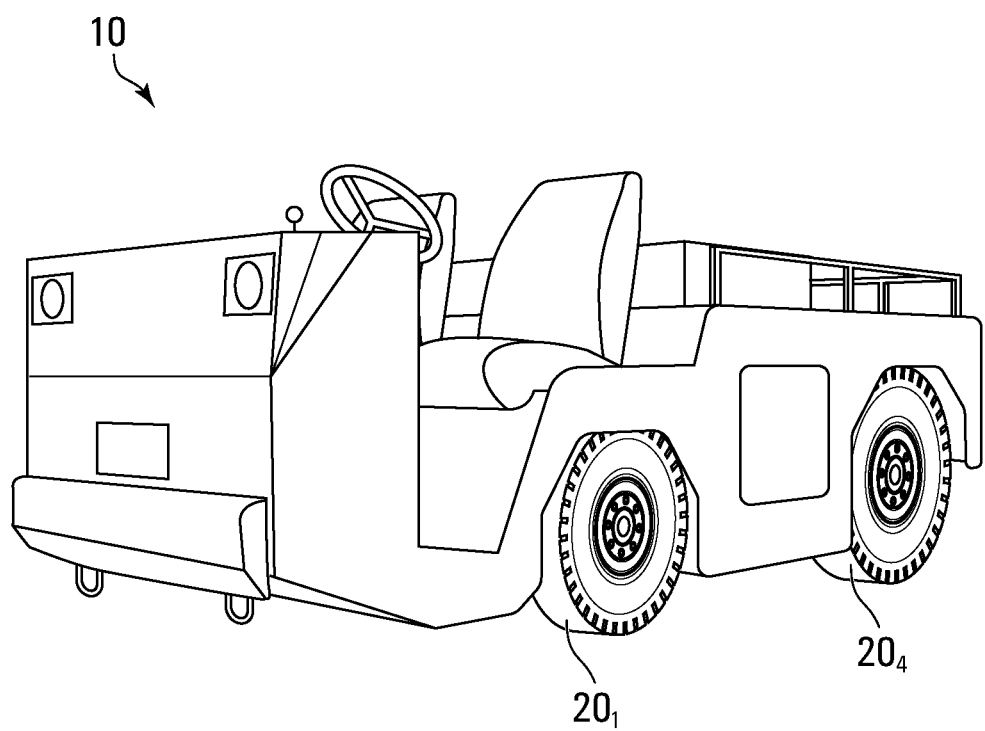
FIGS. 22-25 show vehicles comprising wheel assemblies in accordance with other embodiments.
Figure 23:
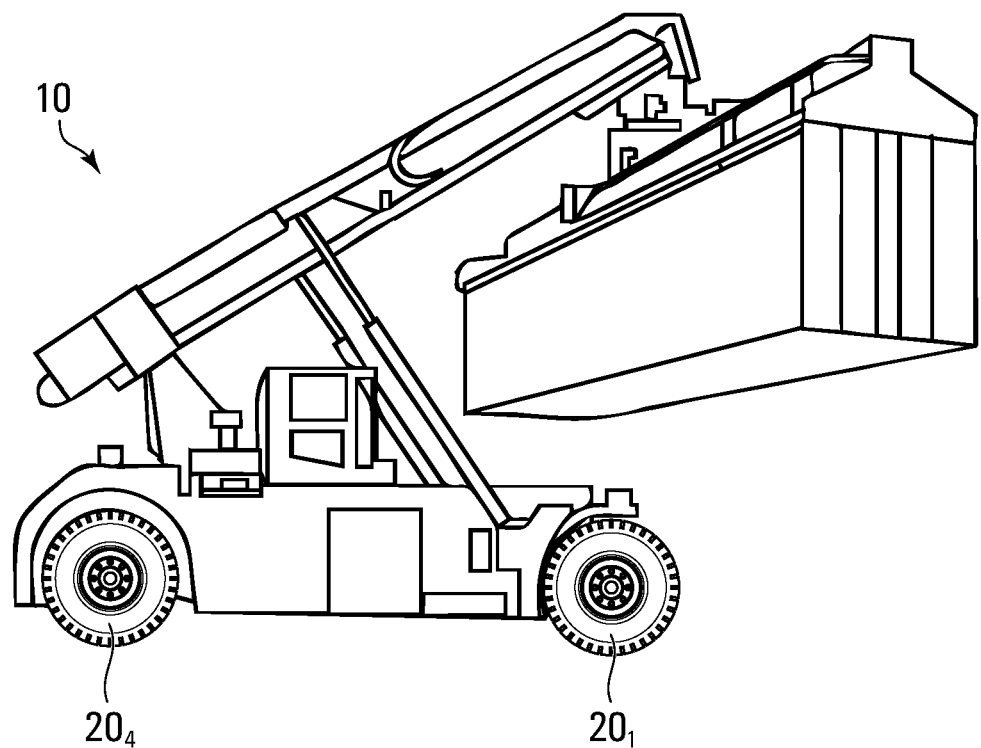
Figure 24:
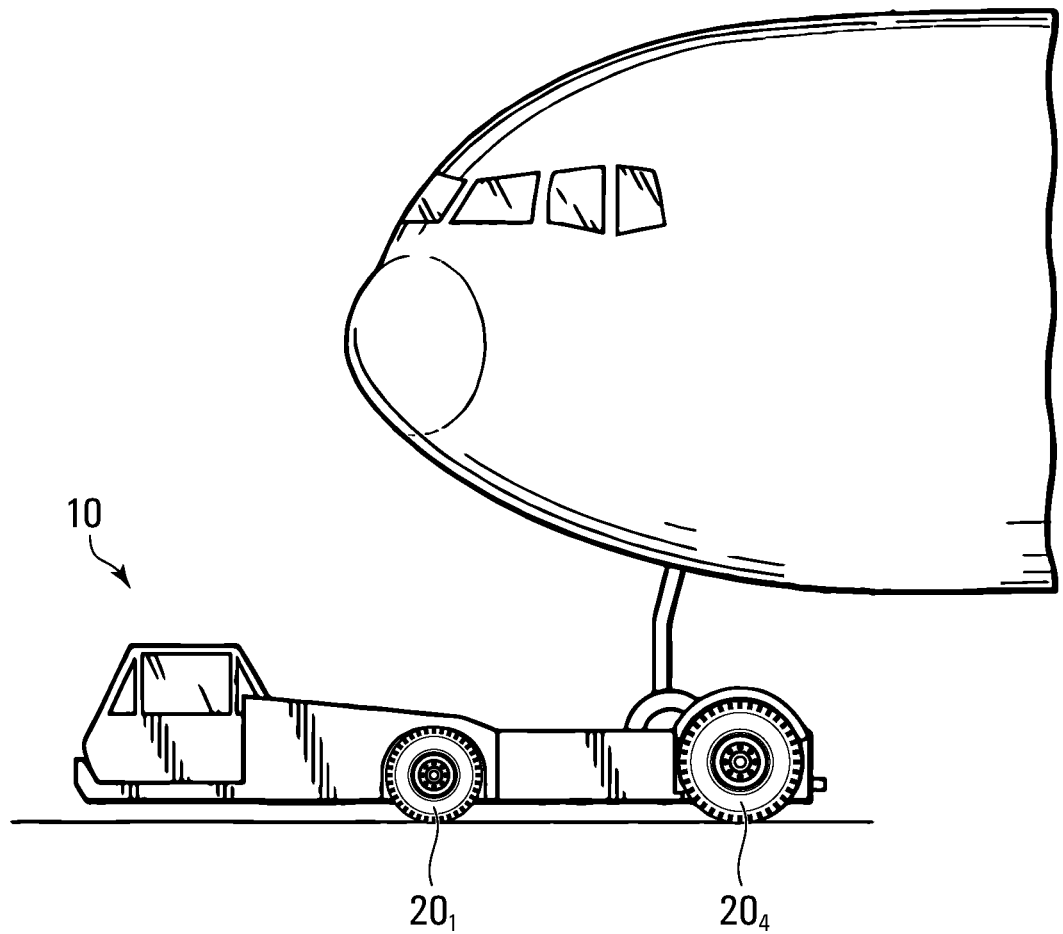
Figure 25:
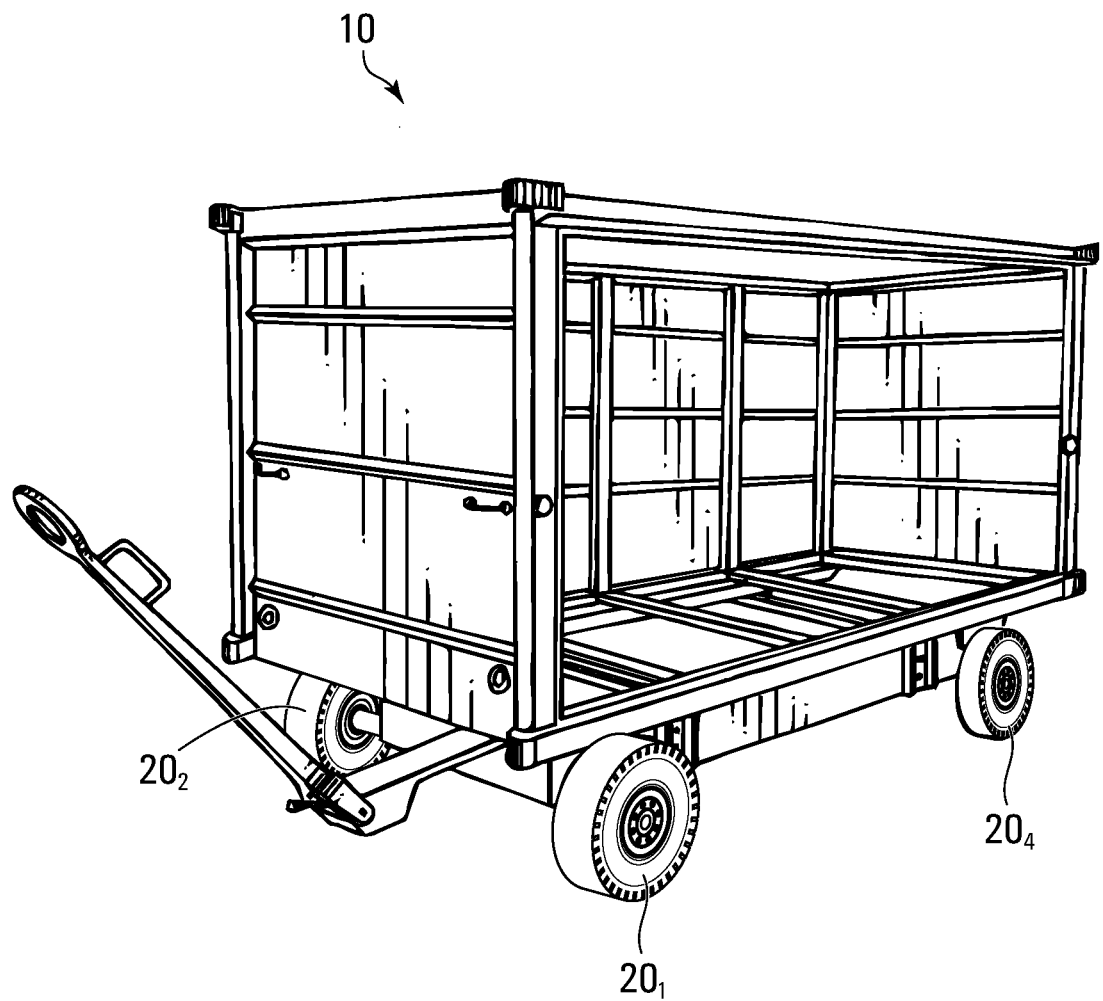

For example, in other embodiments, as shown in FIGS. 22-25, the material-handling vehicle 12 may be a baggage tractor for transporting baggage (as shown in FIG. 21), a reach stacker for moving containers (as shown in FIG. 22) or a pushback tractor for moving aircraft (as shown in FIG. 23). The material-handling vehicle 12 may also be a non-motorized vehicle in some embodiments, such as a baggage cart as shown in FIG. 24.

As another example, in other embodiments, the vehicle 12 may be another type of industrial vehicle that is not a material-handling vehicle. For instance, in some examples, the vehicle 12 may be a construction vehicle such as an articulated dump truck, a backhoe loader, a compact wheel loader, a telehandler, a wheel loader, an aerial work platform, compaction equipment, a multi-purpose truck, a skid steer loader or a wheel excavator.

In various embodiments, with further reference to FIG. 26, a given component mentioned herein (e.g., the wheel assembly sensor 90, the communication device 122, and/or the remote computer 140, etc.) may comprise a processing entity 2500 comprising suitable hardware and/or software (e.g., firmware) configured to implement functionality of that given component. The processing entity 2500 comprises an interface 2510, a processor 2520, and a memory 2530.

The interface 2510 comprises one or more inputs and outputs allowing the processing entity 2500 to receive signals from and send signals to other components to which the computing entity 2500 is connected (i.e., directly or indirectly connected).

The processor 2520 comprises one or more processing devices for performing processing operations that implement functionality of the processing entity 2500. A processing device of the processor 2520 may be a general-purpose processor executing program code stored in the memory 2530. Alternatively, a processing device of the processor 2520 may be a specific-purpose processor comprising one or more preprogrammed hardware or firmware elements (e.g., application-specific integrated circuits (ASICs), electrically erasable programmable read-only memories (EEPROMs), etc.) or other related elements.

The memory 2530 comprises one or more memory elements for storing program code executed by the processor 2520 and/or data used during operation of the processor 2520. A memory element of the memory portion 2530 may be a semiconductor medium (including, e.g., a solid state memory), a magnetic storage medium, an optical storage medium, and/or any other suitable type of memory element. A memory element of the memory portion 2530 may be read-only memory (ROM) and/or random-access memory (RAM), for example.

In some embodiments, two or more elements of the processing entity 2500 may be implemented by devices that are physically distinct from one another (e.g., located in a common site or in remote sites) and may be connected to one another via a bus (e.g., one or more electrical conductors or any other suitable bus) or via a communication link which may be wired, wireless, or both and which may traverse one or more networks (e.g., the Internet or any other computer network such as a local-area network (LAN) or wide-area network (WAN), a cellular network, etc.). In other embodiments, two or more elements of the processing entity 2500 may be implemented by a single device.

Certain additional elements that may be needed for operation of some embodiments have not been described or illustrated as they are assumed to be within the purview of those of ordinary skill in the art. Moreover, certain embodiments may be free of, may lack and/or may function without any element that is not specifically disclosed herein.

Any feature of any embodiment discussed herein may be combined with any feature of any other embodiment discussed herein in some examples of implementation.

In case of any discrepancy, inconsistency, or other difference between terms used herein and terms used in any document incorporated by reference herein, meanings of the terms used herein are to prevail and be used.

Although various embodiments and examples have been presented, this was for purposes of description, but should not be limiting. Various modifications and enhancements will become apparent to those of ordinary skill in the art.

The invention claimed is:

1. A wheel assembly for a vehicle, the wheel assembly comprising:
a wheel configured to connect the wheel assembly to an axle of the vehicle;
a non-pneumatic tire disposed around the wheel; and
a sensor mounted to the wheel;
wherein the sensor is configured to wirelessly transmit information regarding the wheel assembly to a processing apparatus external to the wheel assembly, the processing apparatus being configured to obtain information indicative of a duty cycle of at least one of the wheel assembly and the vehicle based on the information regarding the wheel assembly.

2. The wheel assembly of claim 1, wherein the information indicative of the duty cycle of at least one of the wheel assembly and the vehicle comprises information indicative of variation in time of a speed of at least one of the wheel assembly and the vehicle.

3. The wheel assembly of claim 1, wherein the information indicative of the duty cycle of at least one of the wheel assembly and the vehicle comprises information indicative of a distance travelled by at least one of the wheel assembly and the vehicle.

4. The wheel assembly of claim 1, wherein the processing apparatus is configured to obtain information indicative of a degree of wear of the non-pneumatic tire based on the information regarding the wheel assembly.

5. The wheel assembly of claim 1, wherein the processing apparatus is configured to obtain information indicative of loading on the wheel assembly based on the information regarding the wheel assembly.

6. The wheel assembly of claim 1, wherein the processing apparatus is configured to obtain information indicative of a condition of an underlying surface on which the vehicle travels based on the information regarding the wheel assembly.

7. The wheel assembly of claim 1, wherein the sensor comprises an accelerometer.

8. The wheel assembly of claim 1, wherein the sensor comprises a sensing device disposed between the wheel and the non-pneumatic tire and configured to sense a load between the wheel and the non-pneumatic tire.

9. The wheel assembly of claim 1, wherein the processing apparatus is configured to cause transmission of a control signal for controlling the vehicle based on the information regarding the wheel assembly.

10. A vehicle comprising the wheel assembly of claim 1.

11. A wheel assembly for a vehicle, the wheel assembly comprising:
- a wheel configured to connect the wheel assembly to an axle of the vehicle;
- a non-pneumatic tire disposed around the wheel; and
- a sensor mounted to the wheel;
- wherein the sensor is configured to wirelessly transmit first information regarding the wheel assembly to a processing apparatus external to the wheel assembly, the wheel assembly further comprising a tag spaced apart from the sensor and configured to transmit second information regarding the non-pneumatic tire; wherein the first information of the sensor and the second information of the tag provide information regarding the wheel and non-pneumatic tire to indicate at least one of: how the vehicle is used, and the state of the wheel, wherein the first and second information are different.

12. The wheel assembly of claim 11, wherein the tag is mounted to the non-pneumatic tire.

13. The wheel assembly of claim 12, wherein the tag is mounted inside the non-pneumatic tire.

14. The wheel assembly of claim 13, wherein the tag is embedded beneath an elastomeric portion of the non-pneumatic tire adjacent to a lateral surface of the non-pneumatic tire.

* * * * *